United States Patent
Inaba et al.

(10) Patent No.: US 11,265,525 B2
(45) Date of Patent: Mar. 1, 2022

(54) IMAGE INFORMATION PROCESSING METHOD, APPARATUS, AND PROGRAM UTILIZING A POSITION SEQUENCE

(71) Applicant: Sony Group Corporation, Tokyo (JP)

(72) Inventors: Seijiro Inaba, Kanagawa (JP); Ryota Kosakai, Tokyo (JP)

(73) Assignee: Sony Group Corporation, Tokyo (JP)

( * ) Notice: Subject to any disclaimer, the term of this patent is extended or adjusted under 35 U.S.C. 154(b) by 696 days.

(21) Appl. No.: 14/901,770

(22) PCT Filed: Sep. 1, 2014

(86) PCT No.: PCT/JP2014/004472
§ 371 (c)(1),
(2) Date: Dec. 29, 2015

(87) PCT Pub. No.: WO2015/033546
PCT Pub. Date: Mar. 12, 2015

(65) Prior Publication Data
US 2016/0381339 A1    Dec. 29, 2016

(30) Foreign Application Priority Data
Sep. 9, 2013    (JP) .............................. JP2013-186305

(51) Int. Cl.
*H04N 9/82* (2006.01)
*G11B 27/031* (2006.01)
(Continued)

(52) U.S. Cl.
CPC ............. *H04N 9/8227* (2013.01); *G06T 7/20* (2013.01); *G06T 7/292* (2017.01); *G06T 7/70* (2017.01);
(Continued)

(58) Field of Classification Search
CPC . G06T 2207/30244; G06T 7/292; G06T 7/70; H04N 5/247; H04N 9/09; H04N 9/8227; H04N 9/87
See application file for complete search history.

(56) References Cited

U.S. PATENT DOCUMENTS

| 4,089,597 A * | 5/1978 | Collender ............ G03B 35/00 352/133 |
| 4,158,487 A * | 6/1979 | Collender ............ G03B 37/00 352/38 |

(Continued)

FOREIGN PATENT DOCUMENTS

| CN | 102456379 A * | 5/2012 | .......... G06F 16/743 |
| EP | 1 489 847 A2 | 12/2004 | |

(Continued)

OTHER PUBLICATIONS

R. Jain and K. Wakimoto, "Multiple perspective interactive video," Proceedings of the International Conference on Multimedia Computing and Systems, Washington, DC, USA, 1995, pp. 202-211 (Year: 1995).*

(Continued)

*Primary Examiner* — Stefan Gadomski
(74) *Attorney, Agent, or Firm* — Michael Best & Friedrich LLP

(57) ABSTRACT

A method for processing image information has accessing position information associated with images, identifying a position sequence that provides a series of locations along a pathway corresponding to a subject, and displaying the images in an order of the position sequence. The position sequence is adjusted based on movement of the subject.

22 Claims, 30 Drawing Sheets

(51) Int. Cl.
*G11B 27/34* (2006.01)
*H04N 5/262* (2006.01)
*G06T 7/70* (2017.01)
*G06T 7/292* (2017.01)
*G06T 7/20* (2017.01)
*H04N 9/87* (2006.01)
*H04N 5/247* (2006.01)
*H04N 9/09* (2006.01)

(52) U.S. Cl.
CPC ............ *G11B 27/031* (2013.01); *G11B 27/34* (2013.01); *H04N 5/262* (2013.01); *H04N 5/2627* (2013.01); *H04N 9/87* (2013.01); *G06T 2207/30244* (2013.01); *H04N 5/247* (2013.01); *H04N 9/09* (2013.01)

(56) References Cited

U.S. PATENT DOCUMENTS

| | | | | | |
|---|---|---|---|---|---|
| 4,321,625 | A | * | 3/1982 | Smith | H04N 5/23203 348/211.11 |
| 4,589,140 | A | * | 5/1986 | Bishop | G01R 31/308 348/130 |
| 4,698,682 | A | * | 10/1987 | Astle | H04N 5/265 348/584 |
| 5,184,732 | A | * | 2/1993 | Ditchburn | B07C 5/10 209/576 |
| 5,258,837 | A | * | 11/1993 | Gormley | G08B 13/19645 348/441 |
| 5,353,392 | A | * | 10/1994 | Luquet | G06T 5/006 345/427 |
| 5,448,291 | A | * | 9/1995 | Wickline | H04N 7/181 348/159 |
| 5,613,048 | A | * | 3/1997 | Chen | G06T 15/205 345/419 |
| 5,729,471 | A | * | 3/1998 | Jain | H04N 13/139 725/131 |
| 5,745,126 | A | * | 4/1998 | Jain | H04N 13/139 382/154 |
| 6,538,698 | B1 | * | 3/2003 | Anderson | H04N 5/772 348/231.2 |
| 6,707,487 | B1 | * | 3/2004 | Aman | A63B 24/0003 348/169 |
| 6,710,713 | B1 | * | 3/2004 | Russo | A63B 24/0021 340/573.1 |
| 7,015,954 | B1 | * | 3/2006 | Foote | G06T 3/4038 348/218.1 |
| 7,540,011 | B2 | | 5/2009 | Wixson | H04N 7/17318 348/590 |
| 8,289,408 | B2 | * | 10/2012 | Sako | H04N 1/00339 348/211.2 |
| 8,432,463 | B2 | * | 4/2013 | Conley | H04N 5/262 348/239 |
| 8,730,335 | B2 | * | 5/2014 | Yumiki | H04N 5/23203 348/207.11 |
| 9,087,386 | B2 | * | 7/2015 | Morris | G08B 13/19608 |
| 9,118,843 | B2 | * | 8/2015 | Ioffe | H04N 5/262 |
| 9,479,768 | B2 | * | 10/2016 | Yukich | H04N 5/247 |
| 2002/0049979 | A1 | | 4/2002 | White et al. | |
| 2003/0133018 | A1 | * | 7/2003 | Ziemkowski | H04N 5/2256 348/211.2 |
| 2003/0197785 | A1 | * | 10/2003 | White | G11B 27/034 348/207.99 |
| 2005/0286759 | A1 | * | 12/2005 | Zitnick, III | G06T 7/596 382/154 |
| 2006/0007300 | A1 | * | 1/2006 | Gafsou | H04N 5/222 348/38 |
| 2006/0055792 | A1 | * | 3/2006 | Otsuka | G01S 3/7864 348/211.4 |
| 2007/0070210 | A1 | | 3/2007 | Piccionelli et al. | |
| 2007/0206094 | A1 | * | 9/2007 | Demizu | G06K 9/00624 348/143 |
| 2007/0220569 | A1 | * | 9/2007 | Ishii | G08B 13/19682 725/105 |
| 2007/0279494 | A1 | * | 12/2007 | Aman | G01S 3/7864 348/169 |
| 2008/0088706 | A1 | * | 4/2008 | Girgensohn | H04N 7/181 348/207.99 |
| 2008/0117287 | A1 | * | 5/2008 | Park | G06T 7/30 348/36 |
| 2008/0152297 | A1 | * | 6/2008 | Ubillos | G11B 27/034 386/333 |
| 2008/0204569 | A1 | * | 8/2008 | Miller | G06K 9/00711 348/222.1 |
| 2008/0303910 | A1 | * | 12/2008 | Nishida | H04N 5/23203 348/211.11 |
| 2009/0109199 | A1 | * | 4/2009 | Kitagawa | H04N 21/44004 345/204 |
| 2009/0113505 | A1 | * | 4/2009 | Yu | H04N 7/17318 725/114 |
| 2009/0222730 | A1 | * | 9/2009 | Wixson | H04N 7/17318 715/723 |
| 2009/0262193 | A1 | * | 10/2009 | Anderson | H04N 5/247 348/157 |
| 2009/0268033 | A1 | * | 10/2009 | Ukita | H04N 7/181 348/169 |
| 2010/0027965 | A1 | * | 2/2010 | Fleming | H04N 7/181 386/248 |
| 2010/0097470 | A1 | * | 4/2010 | Yoshida | G08B 13/19641 348/159 |
| 2010/0115411 | A1 | * | 5/2010 | Sorokin | H04N 5/2627 715/723 |
| 2010/0192099 | A1 | * | 7/2010 | Takagi | G09G 3/2085 715/828 |
| 2010/0208941 | A1 | * | 8/2010 | Broaddus | G01S 3/7864 382/103 |
| 2011/0025711 | A1 | * | 2/2011 | Doi | H04N 1/00458 345/635 |
| 2011/0115944 | A1 | * | 5/2011 | Takagi | H04N 1/00458 348/231.99 |
| 2011/0141103 | A1 | * | 6/2011 | Cohen | G02B 21/367 345/419 |
| 2011/0149138 | A1 | * | 6/2011 | Watkins | G11B 27/34 348/333.02 |
| 2011/0157305 | A1 | * | 6/2011 | Kosakai | H04N 13/156 348/50 |
| 2011/0193941 | A1 | * | 8/2011 | Inaba | G03B 35/14 348/46 |
| 2011/0249861 | A1 | * | 10/2011 | Tokutake | G11B 27/10 382/103 |
| 2011/0292215 | A1 | * | 12/2011 | Conley | H04N 5/262 348/159 |
| 2012/0011464 | A1 | * | 1/2012 | Hayashi | H04N 1/00458 715/784 |
| 2012/0020518 | A1 | * | 1/2012 | Taguchi | G06T 7/292 382/103 |
| 2012/0042251 | A1 | * | 2/2012 | Rodriguez | G11B 27/034 715/723 |
| 2012/0110509 | A1 | * | 5/2012 | Isozu | H04N 7/18 715/830 |
| 2012/0120241 | A1 | * | 5/2012 | Lewis | G06T 7/2093 348/154 |
| 2012/0131463 | A1 | * | 5/2012 | Lefler | G06F 3/0483 715/730 |
| 2012/0166137 | A1 | * | 6/2012 | Grasser | G01C 15/00 702/150 |
| 2012/0169842 | A1 | * | 7/2012 | Chuang | G08B 13/19619 348/39 |
| 2012/0218303 | A1 | * | 8/2012 | Nakada | G02B 27/017 345/649 |
| 2012/0233000 | A1 | * | 9/2012 | Fisher | G06T 7/70 705/14.71 |
| 2012/0296958 | A1 | * | 11/2012 | Isozu | G06F 16/958 709/203 |
| 2012/0327252 | A1 | * | 12/2012 | Nichols | H04N 5/772 348/207.1 |
| 2013/0125000 | A1 | * | 5/2013 | Fleischhauer | G11B 27/031 715/723 |

(56) References Cited

U.S. PATENT DOCUMENTS

| | | | |
|---|---|---|---|
| 2013/0155114 A1* | 6/2013 | Lin | H04N 7/142 345/651 |
| 2013/0167031 A1* | 6/2013 | Inada | H04N 21/4314 715/716 |
| 2013/0215239 A1* | 8/2013 | Wang | G06T 7/579 348/50 |
| 2013/0300937 A1* | 11/2013 | Williams | H04N 5/265 348/581 |
| 2014/0028685 A1* | 1/2014 | Weskamp | G06F 3/0481 345/473 |
| 2014/0098140 A1* | 4/2014 | Tran | G09G 5/00 345/660 |
| 2014/0118390 A1* | 5/2014 | Ioffe | G06F 16/58 345/619 |
| 2014/0193040 A1* | 7/2014 | Bronshtein | G06T 7/246 382/107 |
| 2014/0270706 A1* | 9/2014 | Pasko | H04N 21/21805 386/278 |

FOREIGN PATENT DOCUMENTS

| | | | | |
|---|---|---|---|---|
| FR | 2834416 A1 | 7/2003 | | |
| JP | 2001-034250 A | 2/2001 | | |
| JP | 2004-186824 A | 7/2004 | | |
| JP | 2008147838 A | * | 6/2008 | H04N 5/775 |
| JP | 2010113655 A | * | 5/2010 | |
| JP | 2012-004739 A | 1/2012 | | |
| JP | 2012-249188 A | 12/2012 | | |
| WO | 2008/151416 A1 | 12/2008 | | |

OTHER PUBLICATIONS

Japanese Office Action dated Dec. 22, 2016 for corresponding Japanese Application 2013-186305.

* cited by examiner

FIG. 13
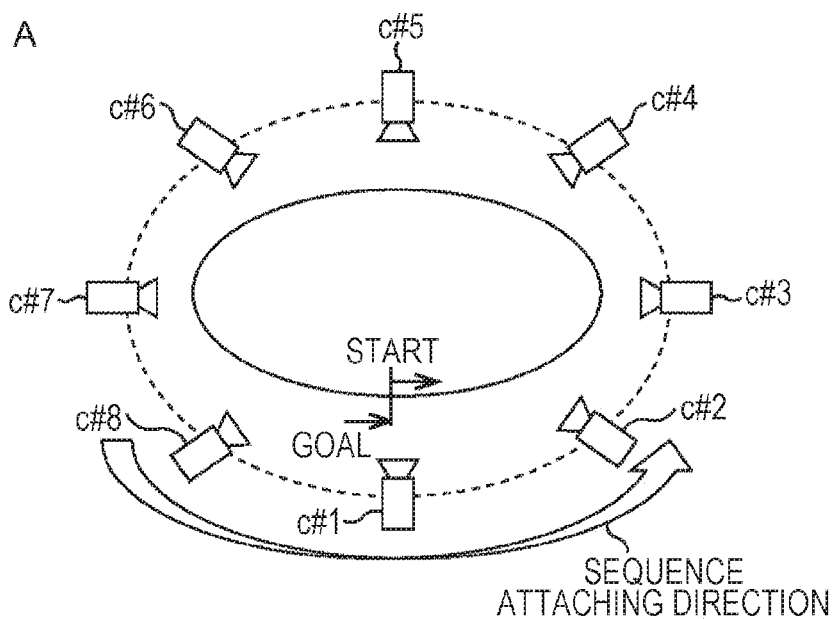
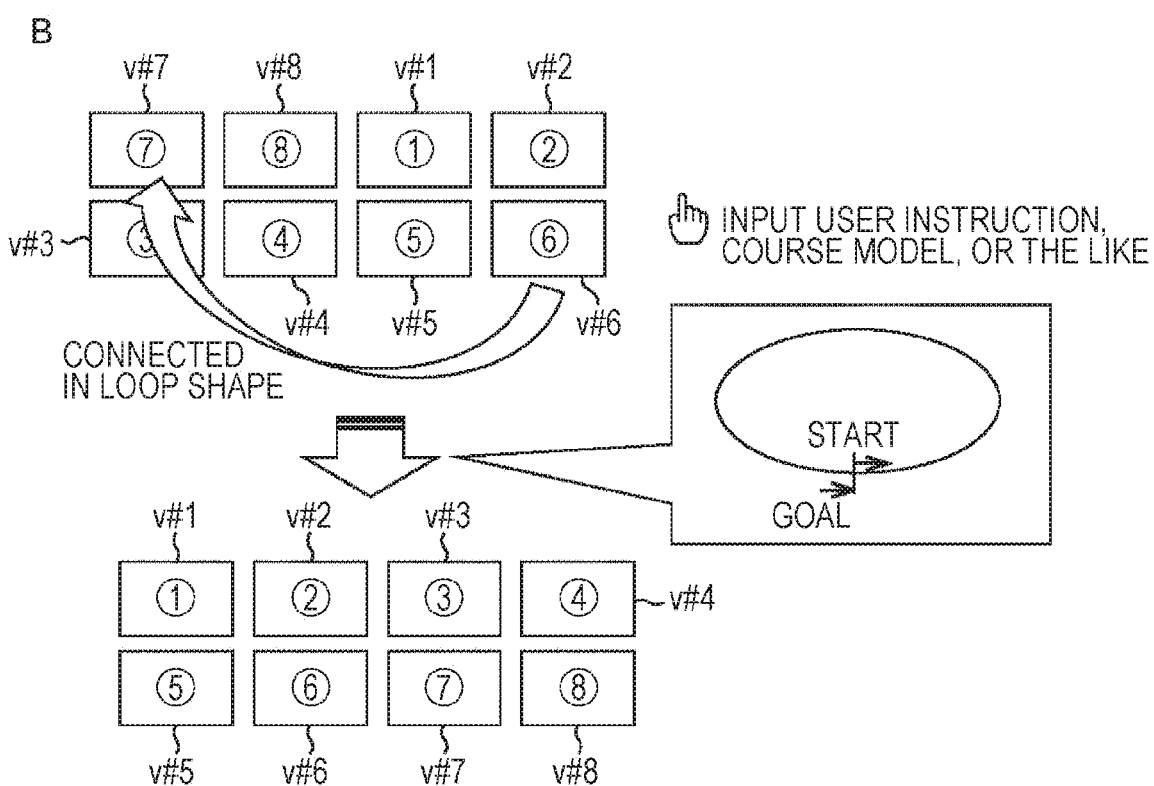

FIG. 15
A
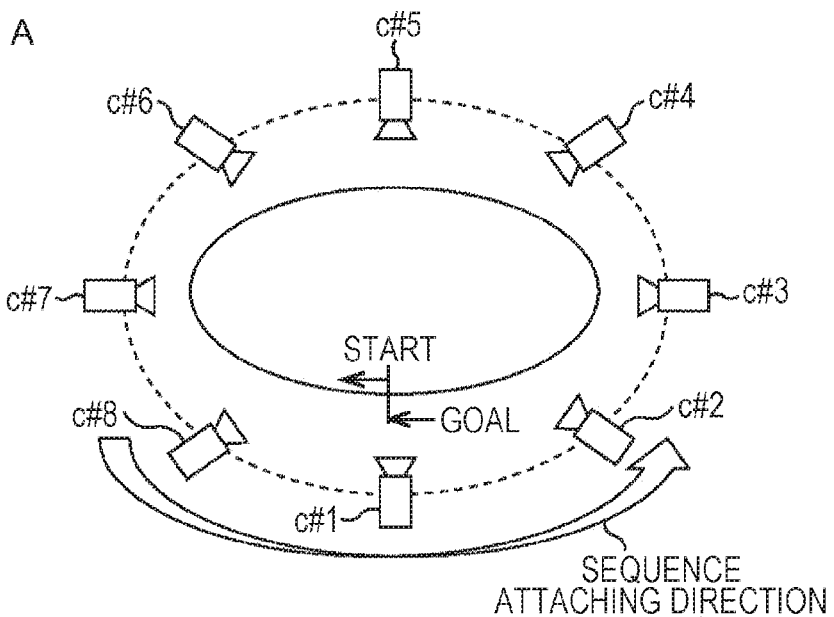
B
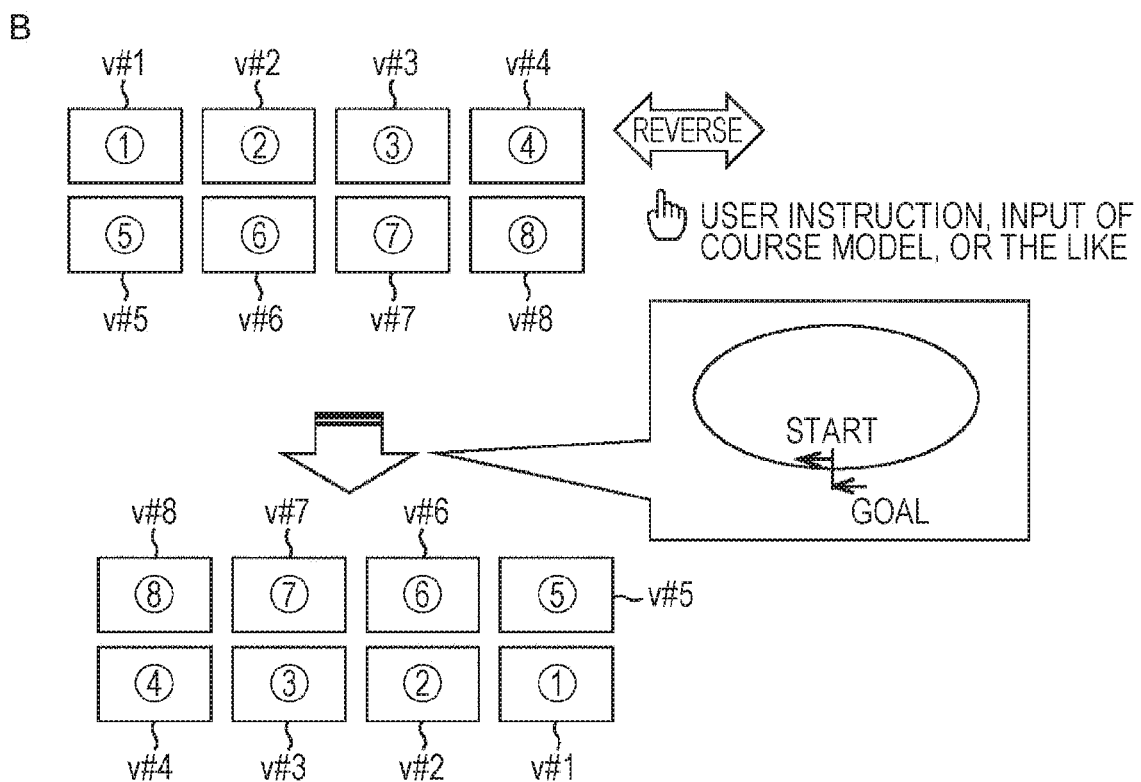

IMAGE INFORMATION PROCESSING METHOD, APPARATUS, AND PROGRAM UTILIZING A POSITION SEQUENCE

CROSS REFERENCE TO RELATED APPLICATIONS

This application claims the benefit of Japanese Priority Patent Application JP 2013-186305 filed on Sep. 9, 2013, the entire contents of which are incorporated herein by reference.

TECHNICAL FIELD

The present technology relates to an image processing apparatus, an image processing method, and a program, and more particularly, to an image processing apparatus, an image processing method, and a program capable of providing a plurality of images, for example, captured, by a plurality of cameras in a form that can be easily handled by a user.

BACKGROUND ART

For example, technologies for editing a moving image by using a plurality of moving images captured by a plurality of cameras as materials have been proposed (for example, see PTL 1).

CITATION LIST

Patent Literature

[PTL 1]
JP 2012-004739 A

SUMMARY

A method for processing image information has accessing position information associated with images where the position information identifies locations that respectively correspond to perspective positions of each of the images and contains a relationship between the locations. The method further includes identifying a position sequence that provides a series of the locations along a pathway corresponding to a subject and processing the images according to the position sequence, which can be adjusted based on movement of the subject.

Specifically, the pathway comprises at least a portion of a rectangular or curved perimeter surrounding the subject. Also, the perspective positions of the images are determined with respect to the subject and each of the perspective positions is respectively corresponding to a camera capturing the images of the subject.

The method also includes synthesizing the images by time slicing according to the position sequence and displaying the images row by row in an order of the position sequence. In displaying the images, a top image is selected to change an order of the images or to reverse the order of the images to be displayed.

The method further includes sequentially reproducing the images on a reproduction screen in the order of the position sequence.

An apparatus designed to implement the method for processing image information includes a processor and a memory, which stores program code executable by the processor to perform the method.

Technical Problem

In editing or viewing a plurality of moving images captured by a plurality of cameras that are materials for editing, in a case where the plurality of moving images (reproduction screens thereof or symbols of first images of the moving images) are displayed with being simply aligned, for example, moving images captured at locations close to each other may be arranged apart from each other, or moving images captured at locations apart from each other may be arranged close to each other, which makes it difficult for a user to handle the moving images.

The present technology is contrived in consideration of such situations and is to provide a plurality of images captured by a plurality of cameras in a form that can be easily handled by a user.

Solution to Problem

Advantageous Effects of Invention

According to an embodiment of the present technology, a plurality of images captured by a plurality of cameras can be provided in a form that can be easily handled by a user.

In addition, the advantages are not necessarily limited to advantages described here but may be advantages not described in this disclosure.

BRIEF DESCRIPTION OF DRAWINGS

FIG. 13 is a diagram that illustrates a fifth example of the rearrangement process performed by the rearrangement unit 33.

FIG. 15 is a diagram that illustrates an example of a reverse rearrangement process performed by a reverse rearrangement unit 34.

DESCRIPTION OF EMBODIMENTS

<Viewing of Images Captured by Plurality of Cameras>

Figure 1:
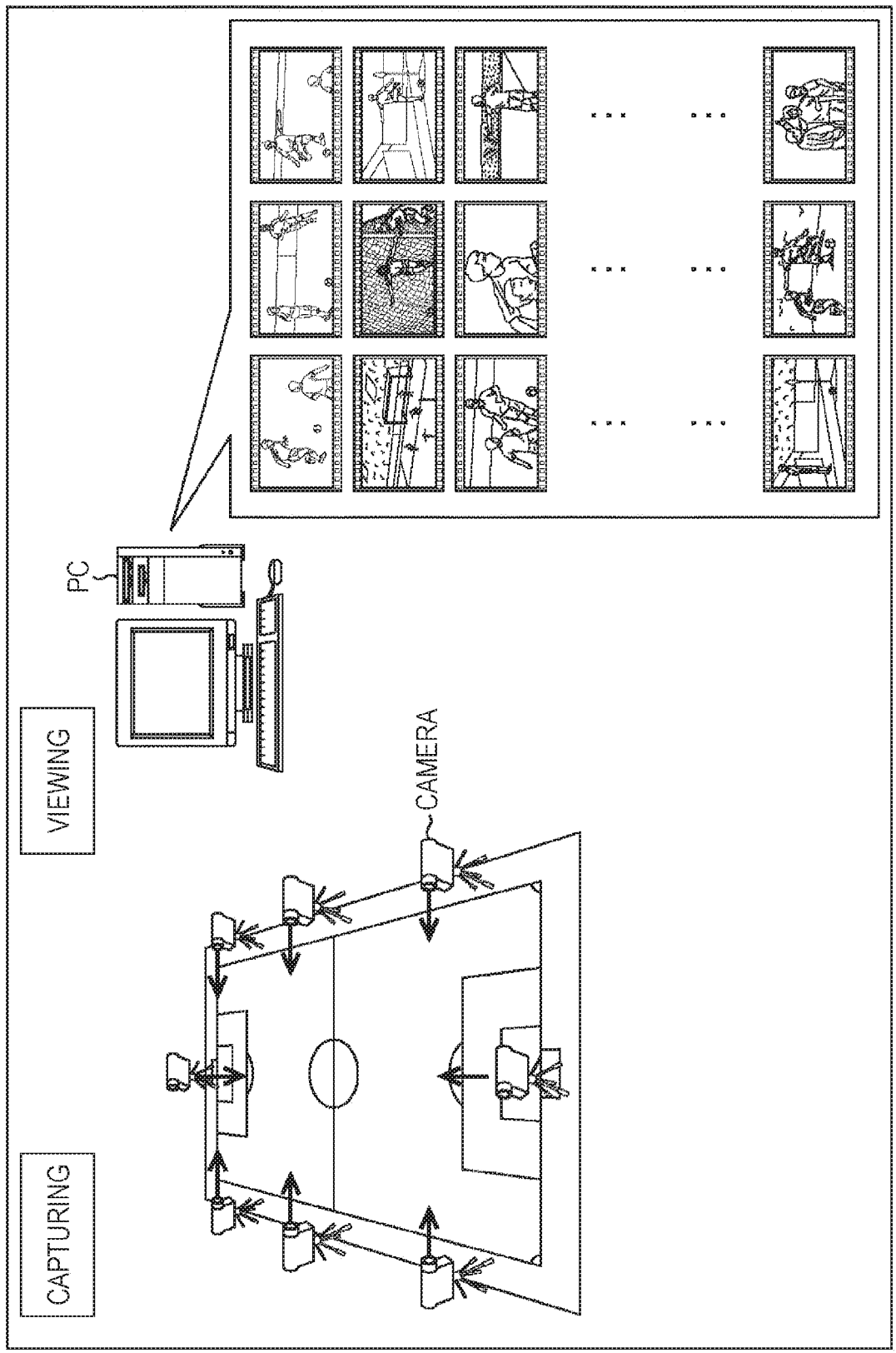
FIG. 1 is a diagram that illustrates an example of viewing of images captured by a plurality of cameras.

FIG. 1 is a diagram that illustrates an example of viewing of images captured by a plurality of cameras.

As illustrated in FIG. 1, in a football stadium, a football game is captured from various capture positions using a plurality of (video) cameras.

Here, as a case where a football game is captured by a plurality of cameras, for example, there is a case where a broadcasting station captures a football game for program broadcasting, a case where a plurality of spectators as a group capture a football game by using cameras held by the spectators or wearing wearable cameras, or the like may be considered.

Now, it is assumed that images (hereinafter, also referred to as captured images) captured by cameras are acquired by using any method, and a plurality of captured images captured by a plurality of cameras are edited and viewed.

In such a case, by displaying the plurality of captured images (reproduction screens thereof or symbols of first screens of moving images or the like) with being simply aligned as illustrated in FIG. 1, particularly in a case where the number of the captured images is great, for example, when a specific captured image is focused, and a captured image that is captured at a capture location close to the capture location of the specific captured image is desired to be viewed by a user, it is difficult to instantly acquire a position at which the captured image is displayed, and it is difficult for the user to handle the images.

Thus, according to an embodiment of the present technology, a plurality of captured images that are captured by a plurality of cameras are provided in a form that can be easily handled by a user.

<Image Processing Apparatus According to Embodiment to which Present Technology is Applied>

Figure 2:
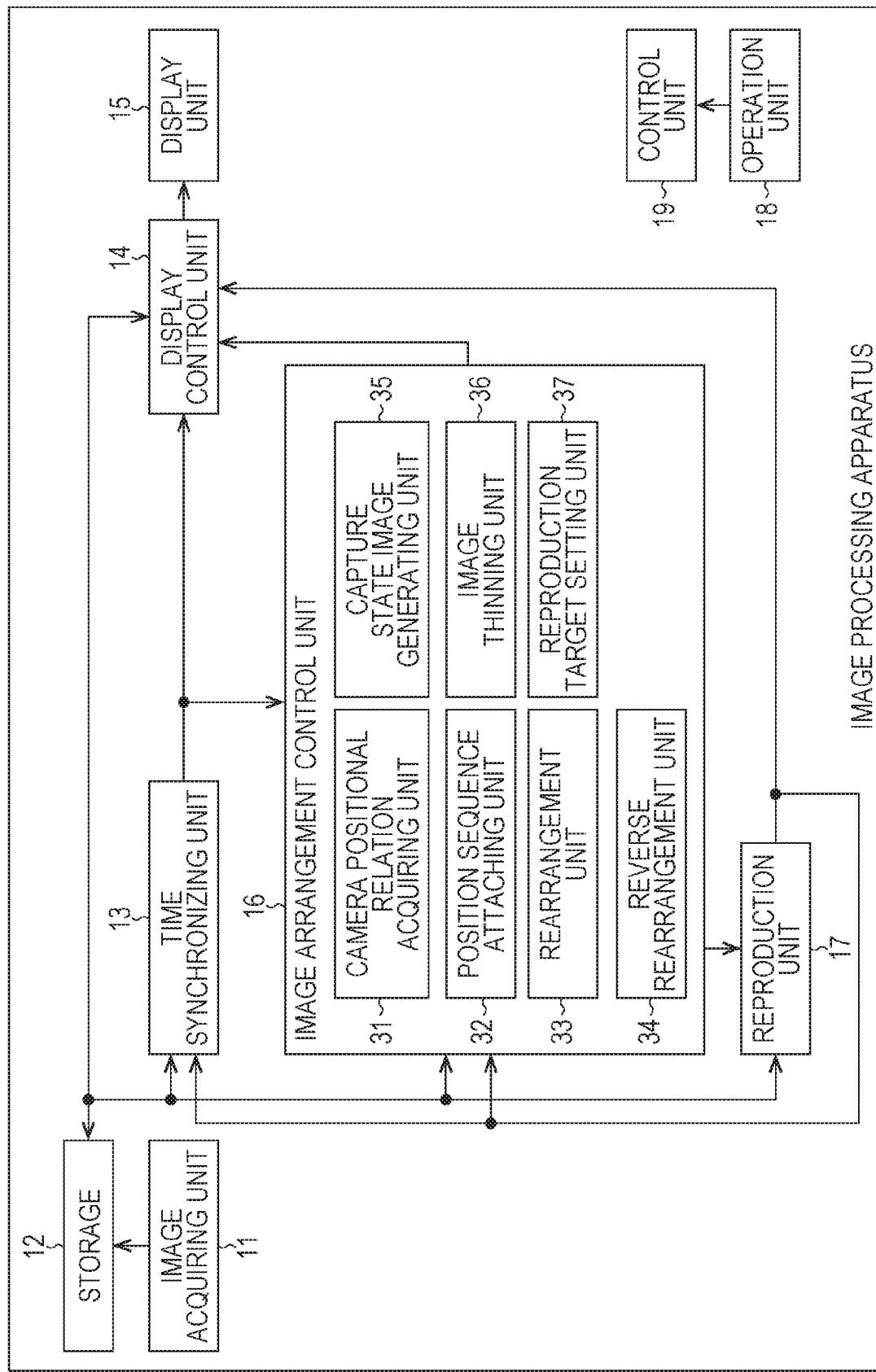
FIG. 2 is a block diagram that illustrates an example of the configuration of an image processing apparatus according to an embodiment to which the present technology is applied.

FIG. 2 is a block diagram that illustrates an example of the configuration of an image processing apparatus according to an embodiment to which the present technology is applied.

As illustrated in FIG. 2, the image processing apparatus includes: an image acquiring unit 11; a storage 12; a time synchronizing unit 13; a display control unit 14; a display unit 15, an image arrangement control unit 16; a reproduction unit 17; an operation unit 18; and a control unit 19.

The image acquiring unit 11 acquires a plurality of captured images that are acquired by photographing a predetermined capture target, for example, a football game, a specific person, or the like using a plurality of cameras.

For example, the plurality of captured images that are captured using the plurality of cameras are stored in the form of a moving image file of a predetermined format in a predetermined server (including a server on a cloud), and the image acquiring unit 11 can acquire the plurality of captured images (files thereof) by downloading the captured images from the server.

In addition, for example, the plurality of the captured images captured using the plurality of cameras can be acquired from the plurality of cameras by the image acquiring unit 11 communicating with the plurality of cameras.

The image acquiring unit 11 supplies the plurality of the captured images (files thereof) acquired from the server or the like to the storage 12.

The storage 12, for example, is configured by a hard disk, a semiconductor memory, or the like and stores a plurality of captured images (files thereof) supplied from the image acquiring unit 11.

The time synchronizing unit 13 generates synchronization information representing differences in the capture start times of the plurality of captured images for synchronizing the times of the plurality of captured images stored in the storage 12 and supplies the generated synchronization information to the display control unit 14. In addition, it may be configured such that a sound accompanied with a captured image reproduced by the reproduction unit 17 is supplied to the time synchronizing unit 13, and the time synchronizing unit 13 generates the synchronization information using the sound.

The display control unit 14 performs display control for displaying a captured image (a symbol thereof) stored in the storage 12 or a captured image (a reproduction screen thereof) supplied from the reproduction unit 17 on the display unit 15 by using the synchronization information supplied from the time synchronizing unit 13 or information supplied from the image arrangement control unit 16 as is necessary.

The display unit 15, for example, is configured by an LCD (liquid crystal display), an organic EL (electro luminescence), or the like and displays an image under the control of the display control unit 14.

The image arrangement control unit 16 generates information and the like for controlling the arrangement (alignment) of captured images displayed on the display unit 15 and supplies the generated information and the like to the display control unit 14, thereby controlling the arrangement and the like of captured images (symbols or reproduction screens thereof) displayed on the display unit 15.

In other words, the image arrangement control unit 16 includes: a camera positional relation acquiring unit 31; a position sequence attaching unit 32; a rearrangement unit 33; a reverse rearrangement unit 34; a capture state image generating unit 35; an image thinning unit 36; and a reproduction target setting unit 37.

The camera positional relation acquiring unit 31 acquires a positional relation (hereinafter, also referred to as a camera positional relation) of a plurality of cameras that have captured a plurality of captured images stored in the storage 12.

Here, in the camera positional relation, at least the capture locations (locations at the capture time) of the cameras is included.

In addition, in the camera positional relation, capture directions (directions of the cameras at the capture time) of the cameras may be included.

The capture locations and the capture directions as the camera positional relation, for example, may be either relative values acquired using an arbitrary camera out of a plurality of cameras or the like as the reference or absolute values.

For example, a GPS (Global Positioning System) or a direction sensor may be built in each camera, and the camera positional relation may be acquired from the GPS or the direction sensor.

In addition, the camera positional relation, for example, may be estimated through calculation based on a plurality of captured images captured by a plurality of cameras.

In other words, the camera positional relation acquiring unit 31 may synchronize the times of a plurality of captured images reproduced by the reproduction unit 17 by using the synchronization information generated by the time synchronizing unit 13 and estimate the camera positional relation through calculation based on the plurality of captured images of which the times are synchronized at that time.

The position sequence attaching unit 32 performs a position sequence attaching process in which a position sequence is attached to each one of a plurality of captured images, which have been captured by a plurality of cameras, stored in the storage 12 for connecting the plurality of captured images in a loop shape based on the camera positional relation acquired by the camera positional relation acquiring unit 31 and the like.

Here, the position sequence attaching process will be described later in detail.

The rearrangement unit 33 performs a rearrangement process in which a plurality of captured images are rearranged such that a specific image out of the plurality of captured images is located at a predetermined position with the alignment order according to the position sequences of the plurality of captured images stored in the storage 12 being maintained.

The reverse rearrangement unit 34 performs a reverse rearrangement process in which the arrangement of a plurality of captured images according to the position sequences of the captured images is rearranged in the reverse order.

The capture state image generating unit 35 performs a capture state image generating process in which a capture state image representing a capture state according to a plurality of cameras capturing a plurality of captured images stored in the storage 12 is generated based on the camera positional relation acquired by the camera positional relation acquiring unit 31.

The image thinning unit 36 performs an image thinning process in which captured images to be displayed on the display unit 14 are thinned.

The reproduction target setting unit 37 performs a reproduction target setting process in which a captured image that is a reproduction target out of the plurality of captured images stored in the storage 12 is set.

The reproduction unit 17 reproduces a captured image stored in the storage 12 so as to be supplied to the display control unit 14.

The operation unit 18 is operated by a user and supplies an operation signal corresponding to the operation to the control unit 19.

The control unit 19 controls the entirety (each block configuring the image processing apparatus) of the image processing apparatus.

In addition, the control unit 19, for example, performs an editing process such as setting of an in-point and an out-point or addition of an effect to a captured image stored in the storage 12 in accordance with the operation of the operation unit 18.

Figure 3:
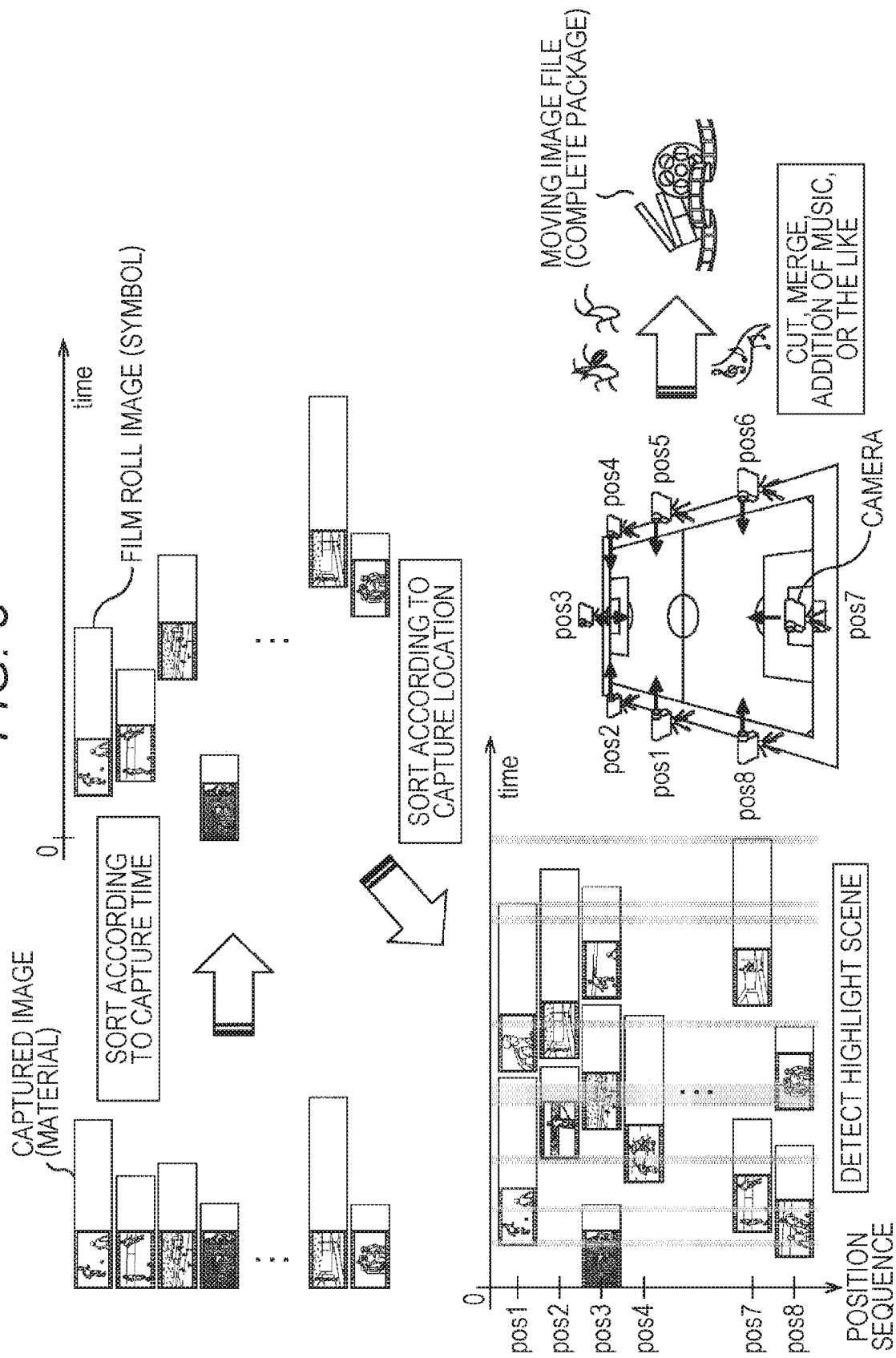
FIG. 3 is a diagram that illustrates an overview of an example of image processing performed by the image processing apparatus.

FIG. 3 is a diagram that illustrates an overview of an example of image processing performed by the image processing apparatus illustrated in FIG. 2.

In the image processing apparatus, for example, the time synchronizing unit 13 generates synchronization information that represents differences in the capture start times of a plurality of captured image for synchronizing the times of the plurality of captured images stored in the storage 12 and supplies the generated synchronization information to the display control unit 14.

The display control unit 14 can display symbols of the plurality of captured images stored in the storage 12 based on the synchronization information supplied from the time synchronizing unit 13. In this case, for example, as illustrated in FIG. 3, the symbols of the plurality of captured images are arranged to be aligned in the vertical direction such that the times thereof are synchronized with the horizontal axis being set as the time.

Here, in FIG. 3, as the symbol of a captured image, an image resembling a film roll having a length that is proportional to the capture time of the captured image is used.

In the image processing apparatus, instead of arranging a plurality of captured images (symbols thereof or the like) to be aligned such that the times are synchronized as described above, the plurality of captured images may be arranged to be aligned in accordance with the position sequences.

In other words, in the image arrangement control unit 16 of the image processing apparatus, the camera positional relation acquiring unit 31 acquires a camera positional relation of a plurality of captured images stored in the storage 12, and the position sequence attaching unit 32 attaches position sequences to the plurality of captured images stored in the storage 12 based on the camera positional relation and supplies resultant captured images to the display control unit 14.

The display control unit 14, in accordance with the position sequences attached by the position sequence attaching unit 32, for example, as illustrated in FIG. 3, arranges the symbols of the plurality of captured images to be aligned in the vertical direction in order of the position sequences with the vertical axis being set as the position sequence.

As above, according to the image processing apparatus, the symbols of the plurality of captured images have the times to be synchronized with each other with the horizontal axis and the vertical axis being set as the time and the position sequence and are arranged to be aligned in order of the position sequence.

Thereafter, when a user operates the operation unit 18 for cutting, merging, adding music, or the like, the control unit 19 performs an editing operation in accordance with the operation, whereby so-called a moving image as a complete package is generated.

As modes of the editing operation performed by the control unit 19, for example, there are a manual mode and an automatic mode.

In the manual mode, the control unit 19 performs the editing operation in accordance with a user's operation for the operation unit 18.

In the automatic mode, the control unit 19, for example, performs an editing operation of detecting predetermined scenes such as highlight scenes from a plurality of captured images and joining the scenes.

As a highlight scene, among a plurality of captured images of which the times are synchronized, at each time, out of captured images of which the degree of highlight representing the degree of excitement is a predetermined threshold or more, one captured image having a highest degree of highlight can be detected.

As the degree of highlight, for example, a value that is proportional to a level of the sound or the movement, the size, or the like of a subject shown up in a captured image may be used.

In addition, in the automatic mode, instead of detecting only one captured image of which the degree of highlight is a threshold or more and is highest, all the captured images each of which the degree of highlight is a threshold or more may be detected as highlight scenes.

In a case where all the captured images each of which the degree of highlight is the threshold or more are detected as highlight scenes, there are cases where two or more captured images are detected as the highlight scenes. When two or more captured images are detected as the highlight scenes, the two or more captured images as the highlight scenes are arranged to divide the screen of the display unit 15.

In such cases, in the complete package, there are a case where only one captured image is displayed and a case where two or more captured images are displayed to divide the screen. For example, in a case where the degree of highlight of each one of all the plurality of captured images stored in the storage 12 is the threshold or more, all the plurality of captured images are displayed to divide the screen.

In the automatic mode, it may be set whether only one captured image of which the degree of highlight is the threshold or more and is highest is detected as a highlight scene or all the captured images each of which the degree of highlight is the threshold value or more are detected as highlight scenes, for example, in accordance with a user's operation of the operation unit 18.

In addition, other than that, for example, the image processing apparatus may be configured such that the reproduction unit 17 simultaneously reproduces a plurality of captured images of which the times are synchronized, and the display control unit 14 selects one captured image from among the plurality of captured images reproduced by the reproduction unit 17 that is selected in accordance with a user's operation of the operation unit 18 and displays the selected captured image on the display unit 15.

Furthermore, when all the degrees of highlight of the plurality of captured images reproduced by the reproduction unit 17 are less than the threshold, the display control unit 14 may display one captured image selected by the user, and, when the degree of highlight of one or more captured images becomes the threshold or more, the display control unit may display one captured image of which the degree of highlight is highest or captured images corresponding to a number designated by the user or less out of one or more captured images of which the degrees of highlight become the threshold or more to divide the screen of the display unit 15 as is necessary.

In such a case, the user can easily acquire the highlight scenes.

<Position Sequence Attaching Process>

Figure 4:
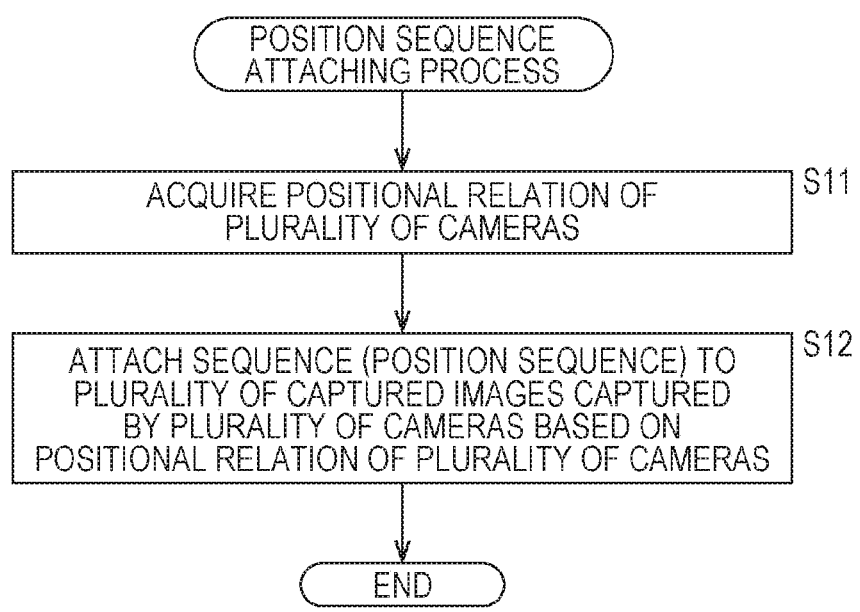
FIG. 4 is a flowchart that illustrates an example of a position sequence attaching process performed by a camera positional relation acquiring unit 31 and a position sequence attaching unit 32.

FIG. 4 is a flowchart that illustrates an example of the position sequence attaching process performed by the camera positional relation acquiring unit 31 and the position sequence attaching unit 32 illustrated in FIG. 2.

In Step S11, the camera positional relation acquiring unit 31 acquires a camera positional relation of a plurality of cameras that have captured a plurality of captured images stored in the storage 12, and the process proceeds to Step S12.

In Step S12, the position sequence attaching unit 32 attaches position sequences to the plurality of captured images stored in the storage 12 for connecting the plurality of captured images in a loop shape based on the camera positional relation acquired by the camera positional relation acquiring unit 31 and ends the position sequence attaching process.

Here, in the position sequence attaching process, the plurality of captured images that are targets for attaching a series of position sequences are a plurality of images that are acquired by photographing the same target (a subject, a game, or the like) at the (almost) same time slot, and, hereinafter, the unit (set) of such a plurality of captured images will be also referred to as a group.

Figure 5:
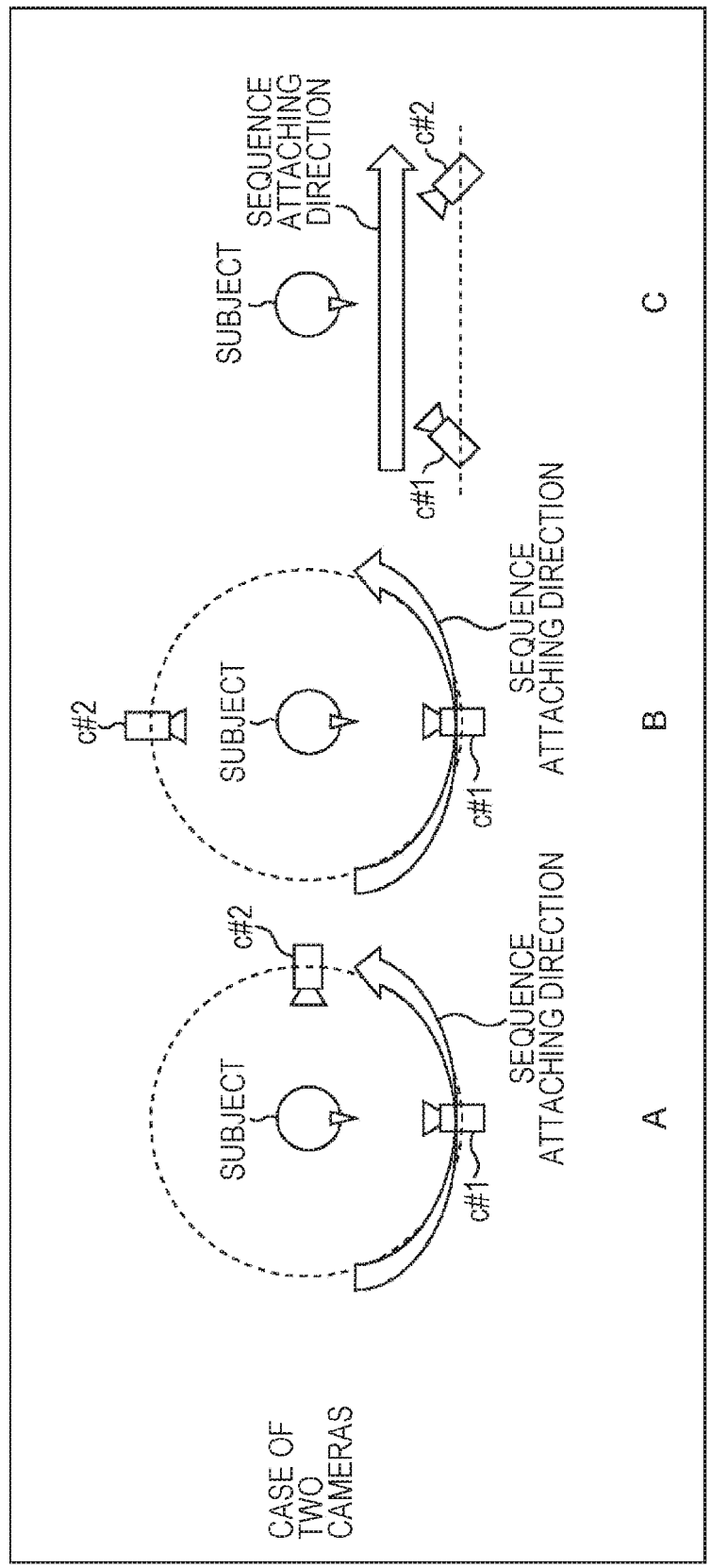
FIG. 5 is a diagram that illustrates an example of a position sequence attaching process in a case where two captured images are captured by using two cameras c #1 and c #2.

FIG. 5 is a plan view that illustrates an example of the position sequence attaching process in a case where two captured images are captured by using two cameras c #1 and c #2.

FIG. 5A illustrates a capture state in which a subject is photographed by using the two cameras c #1 and c #2 with a person set as the subject and a front position of the subject and a position on the right side (toward the subject) set as capture locations.

In this case, the position sequence attaching unit 32 recognizes that the capture locations of the cameras c #1 and c #2 are located, for example, on the circumference of a circle having the subject as its center based on the camera positional relation of the cameras c #1 and c #2, the subject toward the front face that is shown up in a captured image that is captured by the camera c #1 and the subject of the right side that is shown up in a captured image captured by the camera c #2 and sets a direction along the circumference as a sequence attaching direction (locus) for attaching the position sequences.

Here, in a case where the plurality of cameras are located on the circumference of the circle having the subject as its center, as directions along the circumference, there are two directions of the clockwise direction and the counterclockwise direction of the circumference, and an arbitrary direction of the two directions may be set as the sequence attaching direction. In FIG. 5A, the counterclockwise direction is set as the sequence attaching direction.

The position sequence attaching unit 32 attaches position sequences to captured images captured by the cameras c #1 and c #2 along the sequence attaching direction.

Here, as the position sequence, for example, an integer having "1st" as the initial value thereof may be used.

In a case where the direction of the sequence is a direction (locus) for which the original position is finally returned when advancement is made in the direction of the sequence like a direction along the circumference, a position sequence of "1st" may be attached to a captured image, which is captured by an arbitrary camera, out of a plurality of cameras.

Accordingly, in the case illustrated in FIG. 5A, for example, a position sequence of "1st" may be attached to a captured image that is captured by the camera c #1 out of the cameras c #1 and c #2. In such a case, a position sequence of "2nd" is attached to a captured image captured by the camera c #2 that is attained along the sequence attaching direction from the camera c #1 (the capture position thereof).

In addition, in the case illustrated in FIG. 5A, for example, a position sequence of "1st" may be attached to a captured image that is captured by the camera c #2. In such a case, a position sequence of "2nd" is attached to a captured image captured by the camera c #1 that is attained along the sequence attaching direction from the camera c #2 (the capture position thereof).

FIG. 5B illustrates a capture state in which a subject is photographed by using two cameras c #1 and c #2 with a person set as the subject and a front position and a rear position of the subject set as capture locations.

In this case, the position sequence attaching unit 32 recognizes that the capture locations of the cameras c #1 and c #2 are located on the circumference of a circle having the subject as its center, for example, based on the camera positional relation of the cameras c #1 and c #2, that is, the capture locations of the cameras c #1 and c #2 being on a straight line and the photographing directions of the cameras c #1 and c #2 being different from each other by 180 degrees and sets a direction along the circumference as a sequence attaching direction for attaching the position sequences.

Here, in the case illustrated in FIG. 5B, similar to the case illustrated in FIG. 5A, the counterclockwise direction of the circumference is set as the sequence attaching direction.

The position sequence attaching unit 32, as described with reference to FIG. 5A, attaches position sequences to captured images captured by the cameras c #1 and c #2 along the sequence attaching direction.

Accordingly, in the case illustrated in FIG. 5B, for example, a position sequence of "1st" is attached to a captured image that is captured by the camera c #1 out of the cameras c #1 and c #2, and a position sequence of "2nd" is attached to a captured image captured by the camera c #2 that is attained along the sequence attaching direction from the camera c #1.

Alternatively, in the case illustrated in FIG. 5B, for example, a position sequence of "1st" is attached to a captured image that is captured by the camera c #2, and a position sequence of "2nd" is attached to a captured image captured by the camera c #1 that is attained along the sequence attaching direction from the camera c #2.

FIG. 5C illustrates a capture state in which a subject is photographed by using two cameras c #1 and c #2 with a person set as the subject and a diagonally forward left position and a diagonally forward right position of the subject set as capture locations.

In this case, the position sequence attaching unit 32 recognizes that the capture locations of the cameras c #1 and c #2 are located on a straight line perpendicular to the forward direction of the subject on the front side of the subject, for example, based on the camera positional relation of the cameras c #1 and c #2, the subject viewed from the diagonally forward left side that is shown up in the captured image captured by the camera c #1, and the subject viewed from the diagonally forward right side that is shown up in the captured image captured by the camera c #2 and sets a direction along the straight line as a sequence attaching direction for attaching the position sequences.

Here, in a case where the plurality of cameras are located on a straight line not returning to the original position such as a straight line, a polygonal line, or a curved line, while there are two directions as directions along the line, an arbitrary direction of the two directions may be set as the sequence attaching direction.

In other words, as illustrated in FIG. 5C, in a case where two cameras c #1 and c #2 are located on a straight line, while there are two directions including a rightward direction (from the left side) and a leftward direction (from the right side), an arbitrary direction out of the two directions may be set as the sequence attaching direction. In the case illustrated in FIG. 5C, the rightward direction is set as the sequence attaching direction.

The position sequence attaching unit 32, as described with reference to FIG. 5A, attaches position sequences to captured images captured by the cameras c #1 and c #2 along the sequence attaching direction.

Accordingly, in the case illustrated in FIG. 5C, a position sequence of "1st" is attached to a captured image that is captured by the camera c #1 positioned on the front most side along the sequence attaching direction, and a position sequence of "2nd" is attached to a captured image captured by the camera c #2 that is attained along the sequence attaching direction from the camera c #1.

Figure 6:
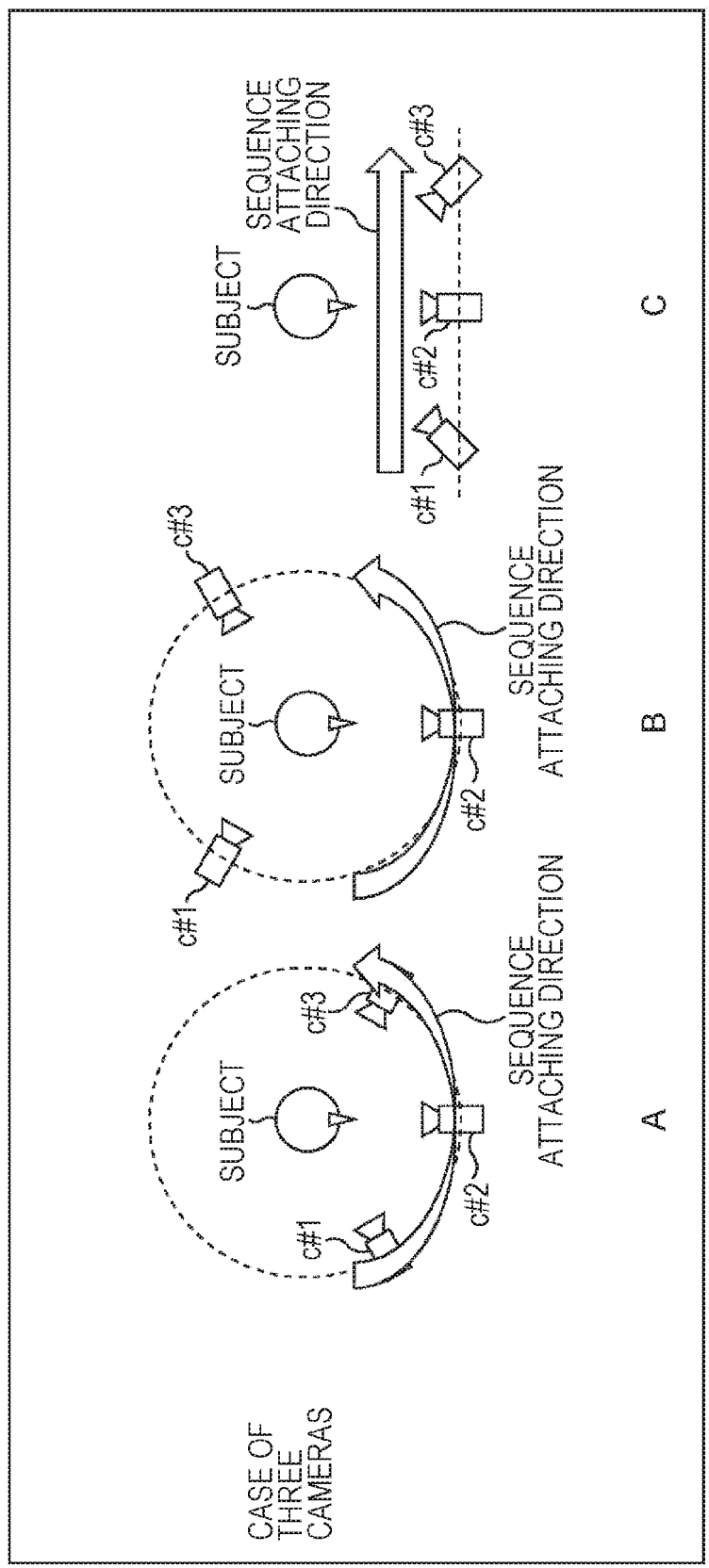
FIG. 6 is a diagram that illustrates an example of a position sequence attaching process in a case where three captured images are captured by using three cameras c #1, c #2, and c #3.

FIG. 6 is a plan view that illustrates an example of the position sequence attaching process in a case where three captured images are captured by using three cameras c #1, c #2, and c #3.

FIG. 6A illustrates a capture state in which a subject is photographed by using the three cameras c #1 to c #3 with a person set as the subject and a front position of the subject, a diagonally forward left position, and a diagonally forward right direction set as capture locations.

FIG. 6B illustrates a capture state in which a subject is photographed by using three cameras c #1 to c #3 with a person set as the subject and a front position of the subject, a diagonally backward left position, and a diagonally backward right direction set as capture locations.

In the cases illustrated in FIGS. 6A and 6B, the position sequence attaching unit 32 recognizes that the capture locations of the cameras c #1 to c #3 are located on the circumference of a circle having the subject as its center, for example, based on the camera positional relation of the cameras c #1 to c #3 and sets a direction along the circumference as a sequence attaching direction for attaching the position sequences.

The position sequence attaching unit 32 attaches position sequences to captured images captured by the cameras c #1 to c #3 along the sequence attaching direction.

In the cases illustrated in FIGS. 6A and 6B, the counterclockwise direction of the circumference is set as the sequence attaching direction.

In addition, in the cases illustrated in FIGS. 6A and 6B, for example, when the capture location of the camera c #1 is set as a start point out of the cameras c #1 to c #3, the capture locations of the cameras c #2 and c #3 are located in the order along the sequence attaching direction.

Accordingly, for example, the position sequence of the captured image captured by the camera c #1 is set as "1st", and, along the sequence attaching direction, a position sequence of "2nd" is attached to the captured image captured by the camera c #2, and a position sequence of "3rd" is attached to the captured image captured by the camera c #3.

FIG. 6C illustrates a capture state in which a subject is photographed by using three cameras c #1 to c #3 with a person set as the subject and a front position of the subject, a diagonally forward left position, and a diagonally forward right direction set as capture locations.

In this case, the position sequence attaching unit 32 recognizes that the capture locations of the cameras c #1 to c #3 are located on a straight line based on the camera positional relation of the cameras c #1 to c #3 and sets a direction along the straight line as a sequence attaching direction for attaching the position sequences.

The position sequence attaching unit 32 attaches position sequences to captured images captured by the cameras c #1 to c #3 along the sequence attaching direction.

In the case illustrated in FIG. 6C, the rightward direction of the straight line is set as the sequence attaching direction.

In the case illustrated in FIG. 6C, the capture locations of the cameras c #1 to c #3 are located in the order along the sequence attaching direction.

Accordingly, along the sequence attaching direction, a position sequence of "1st" is attached to the captured image captured by the camera c #1, a position sequence of "2nd" is attached to the captured image captured by the camera c #2, and a position sequence of "3rd" is attached to the captured image captured by the camera c #3.

Figure 7:
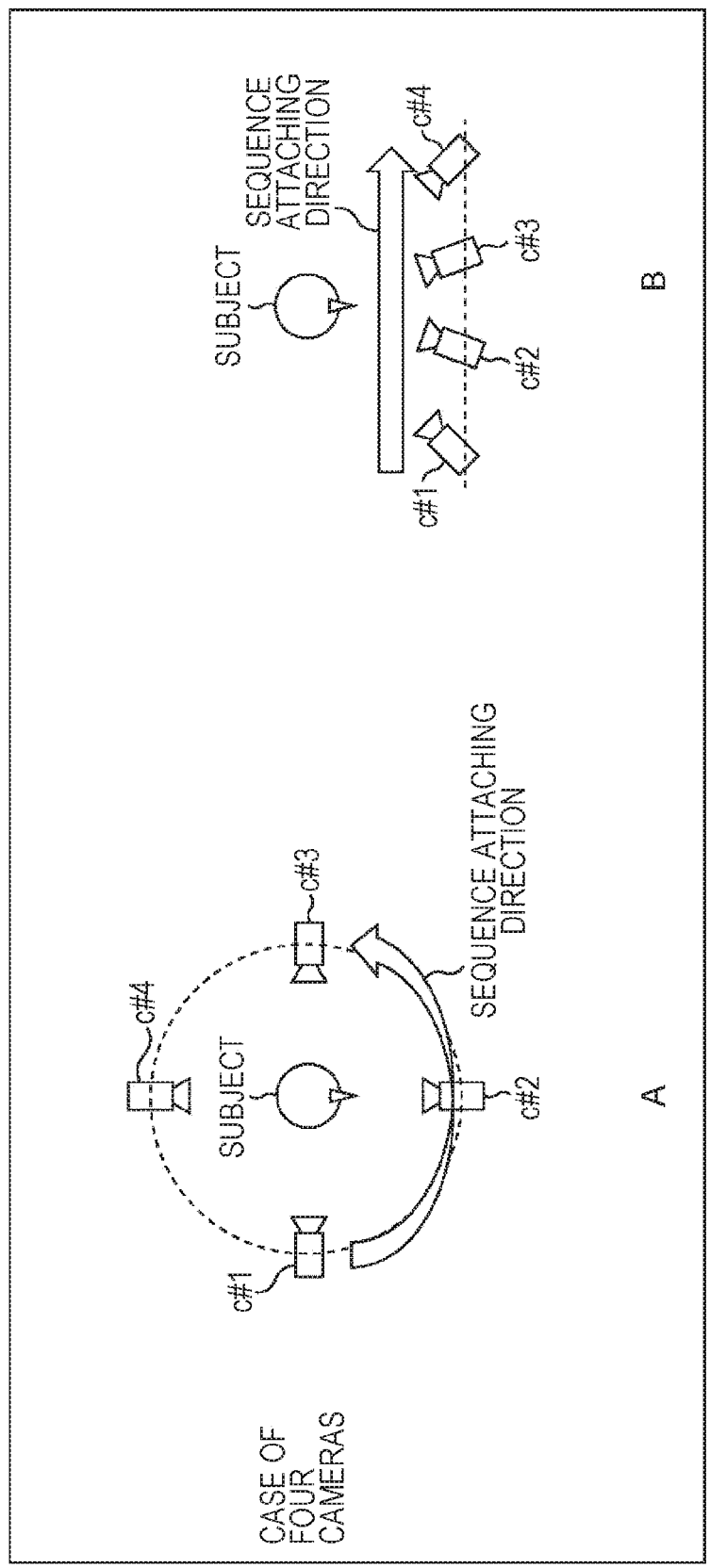
FIG. 7 is a diagram that illustrates an example of a position sequence attaching process in a case where four captured images are captured by using four cameras c #1, c #2, c #3, and c #4.

FIG. 7 is a plan view that illustrates an example of the position sequence attaching process in a case where four captured images are captured by using four cameras c #1, c #2, c #3, and c #4.

FIG. 7A illustrates a capture state in which a subject is photographed by using the four cameras c #1 to c #4 with a person set as the subject and a front position, a front position, a left position, a right position, and a rear position of the subject set as capture locations.

In the case illustrated in FIG. 7A, the position sequence attaching unit 32 recognizes that the capture locations of the cameras c #1 to c #4 are located on the circumference of a circle having the subject as its center, for example, based on the camera positional relation of the cameras c #1 to c #4 and sets a direction along the circumference as a sequence attaching direction for attaching the position sequences.

The position sequence attaching unit 32 attaches position sequences to captured images captured by the cameras c #1 to c #4 along the sequence attaching direction.

In the case illustrated in FIG. 7A, the counterclockwise direction of the circumference is set as the sequence attaching direction.

In addition, in the case illustrated in FIG. 7A, for example, when the capture location of the camera c #1 is set as a start point out of the cameras c #1 to c #4, the capture locations of the cameras c #2 to c #4 are located in the order along the sequence attaching direction.

Accordingly, for example, the position sequence of the captured image captured by the camera c #1 is set as "1st", and, along the sequence attaching direction, a position sequence of "2nd" is attached to the captured image captured by the camera c #2, a position sequence of "3rd" is attached to the captured image captured by the camera c #3, and a position sequence of "4th" is attached to the captured image captured by the camera c #4.

FIG. 7B illustrates a capture state in which a subject is photographed by using four cameras c #1 to c #4 with a person set as the subject and four points on a straight line on the front side of the subject set as capture locations.

In this case, the position sequence attaching unit 32 recognizes that the capture locations of the cameras c #1 to c #4 are located on a straight line based on the camera positional relation of the cameras c #1 to c #4 and sets a direction along the straight line as a sequence attaching direction for attaching the position sequences.

The position sequence attaching unit 32 attaches position sequences to captured images captured by the cameras c #1 to c #4 along the sequence attaching direction.

In the case illustrated in FIG. 7B, the rightward direction of the straight line is set as the sequence attaching direction.

In the case illustrated in FIG. 7B, the capture locations of the cameras c #1 to c #4 are located in the order along the sequence attaching direction.

Accordingly, along the sequence attaching direction, a position sequence of "1st" is attached to the captured image captured by the camera c #1, a position sequence of "2nd" is attached to the captured image captured by the camera c #2, a position sequence of "3rd" is attached to the captured image captured by the camera c #3, and a position sequence of "4th" is attached to the captured image captured by the camera c #4.

Figure 8:
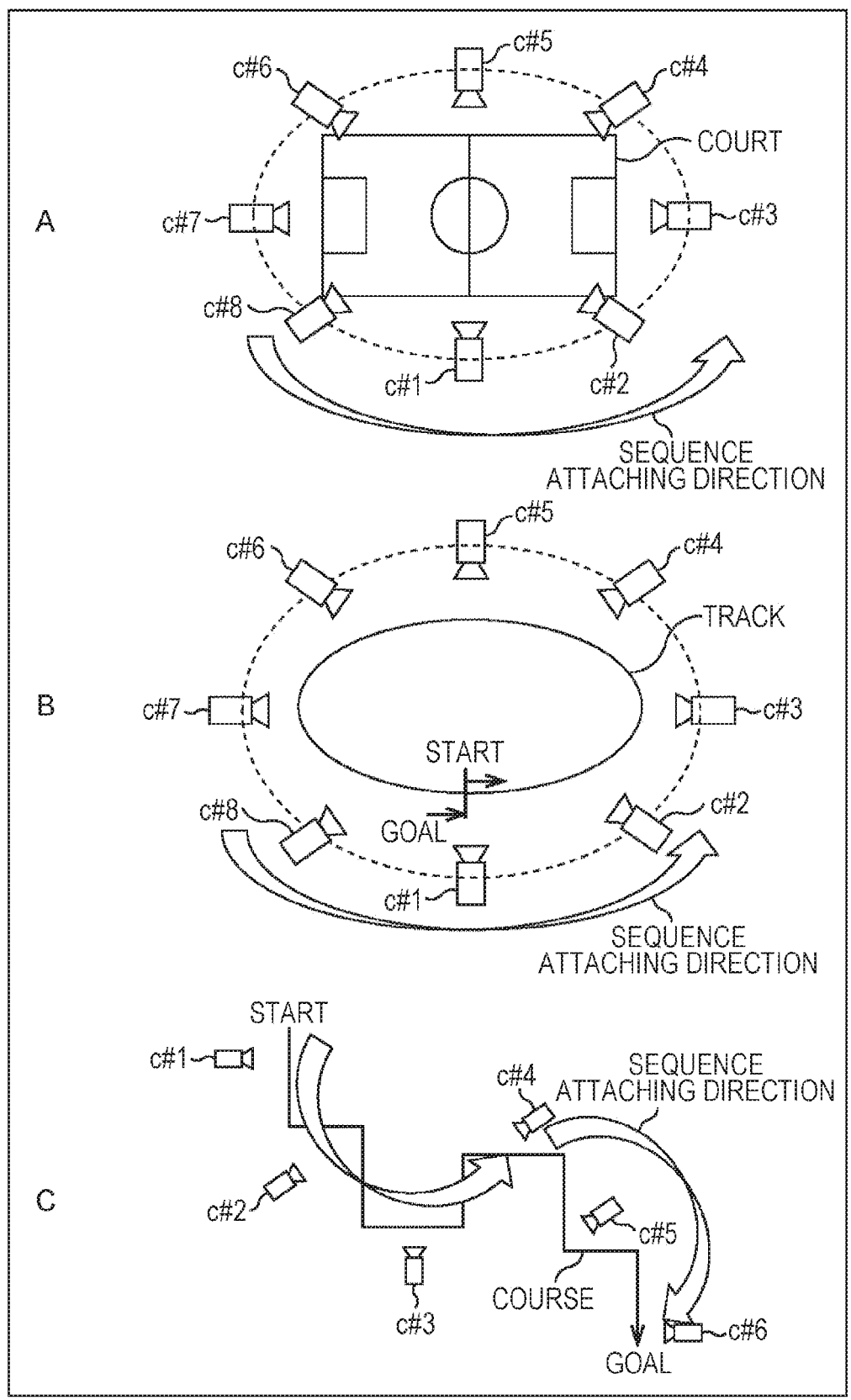
FIG. 8 is a diagram that illustrates other examples of the position sequence attaching process.

FIG. 8 is a diagram that illustrates other examples of the position sequence attaching process.

FIG. 8A illustrates a capture state in which a football game is photographed with eight cameras c #1, c #2, c #3, c #4, c #5, c #6, c #7, and c #8 facing a football court and eight points located on the circumference of an oval surrounding the periphery of the football court (field) set as capture locations.

FIG. 8B illustrates a capture state in which a track-and-field event is photographed with eight cameras c #1 to c #8 facing a track and eight points located on the circumference of an oval surrounding the periphery of the track of the track-and-field event set as capture locations.

In the cases illustrated in FIGS. 8A and 8B, the position sequence attaching unit 32 recognizes that the capture locations of the cameras c #1 to c #8 are located on the circumference of an oval, for example, based on the camera positional relation of the cameras c #1 to c #8 and sets a direction along the circumference as a sequence attaching direction for attaching the position sequences.

The position sequence attaching unit 32 attaches position sequences to captured images captured by the cameras c #1 to c #8 along the sequence attaching direction.

In the cases illustrated in FIGS. 8A and 8B, the counterclockwise direction of the circumference is set as the sequence attaching direction.

In addition, in the case illustrated in FIG. 8A, for example, when the capture location of the camera c #1 is set as a start point out of the cameras c #1 to c #8, the capture locations of the cameras c #2 to c #8 are located in the order along the sequence attaching direction.

Accordingly, for example, the position sequence of the captured image captured by the camera c #1 is set as "1st", and, thereafter, along the sequence attaching direction, a position sequence of "i-th" is attached to a captured image captured by the camera c #i.

FIG. 8C illustrates a capture state in which a race is photographed by using six cameras c #1 to c #6 with six points on a line (hereinafter, also referred to as a race course line) following the race course of a race set as capture locations.

In the case illustrated in FIG. 8C, for example, a course model representing a race course is provided, for example, from a server disposed on a network, based on the course model, the position sequence attaching unit 32 recognizes the line of the race course in which the capture locations of the cameras c #1 to c #6 are located and sets a direction along the line of the race course as the sequence attaching direction for attaching the position sequences.

In addition, the position sequence attaching unit 32 recognizes the positions (capture locations) of the cameras c #1 to c #6 disposed on the line of the race course based on the camera positional relation of the cameras c #1 to c #6 and attaches position sequences to the captured images captured by the cameras c #1 to c #6 along the sequence attaching direction.

In the case illustrated in FIG. 8C, a direction from the start of the line of the race course toward the goal is set as the sequence attaching direction.

In the case illustrated in FIG. 8C, the capture locations of the cameras c #1 to c #6 are located in the order in a direction from the start toward the goal.

Accordingly, for example, the position sequence of the captured image captured by the camera c #1 is set as "1st", and, thereafter, along the sequence attaching direction, a position sequence of "i-th" is attached to a captured image captured by the camera c #i.

In the case illustrated in FIG. 8C, in a case where a leading subject of the race is a known subject (for example, a vehicle leading the race or the like), it may be configured such that the known subject is detected from the captured images captured by the cameras c #1 to c #6, and a direction (locus) joining the capture locations of the cameras c #1 to c #6 in the order in which the known subject appears in the captured images may be set as the sequence attaching direction.

In such a case, the sequence attaching direction may be set without the course model.

Other than that, for example, by displaying the capture locations of the cameras c #1 to c #6 on a map by using the display unit 15 and user's designating the capture locations in the order from the start toward the goal, a direction (locus) joining the capture locations in the sequence designated by the user may be set as the sequence attaching direction.

Here, after the position sequences are attached to the captured images stored in the storage 12, the position sequence attaching unit 32 may change the file names of the captured images stored in the storage 12 in accordance with the position sequences.

In other words, as the file names of a plurality of captured images of a group to which the position sequences are attached, for example, file names each acquired by attaching a serial number "XX" according to the position sequence to the same prefix "VVV" may be used, and the file name (for example, in the case of an mpg file having an extension of "mpg", VVV XX.mpg or the like) of the captured image stored in the storage 12 to which the position sequence is attached may be changed to a position sequence-attached file name.

<Rearrangement Process>

Figure 9:
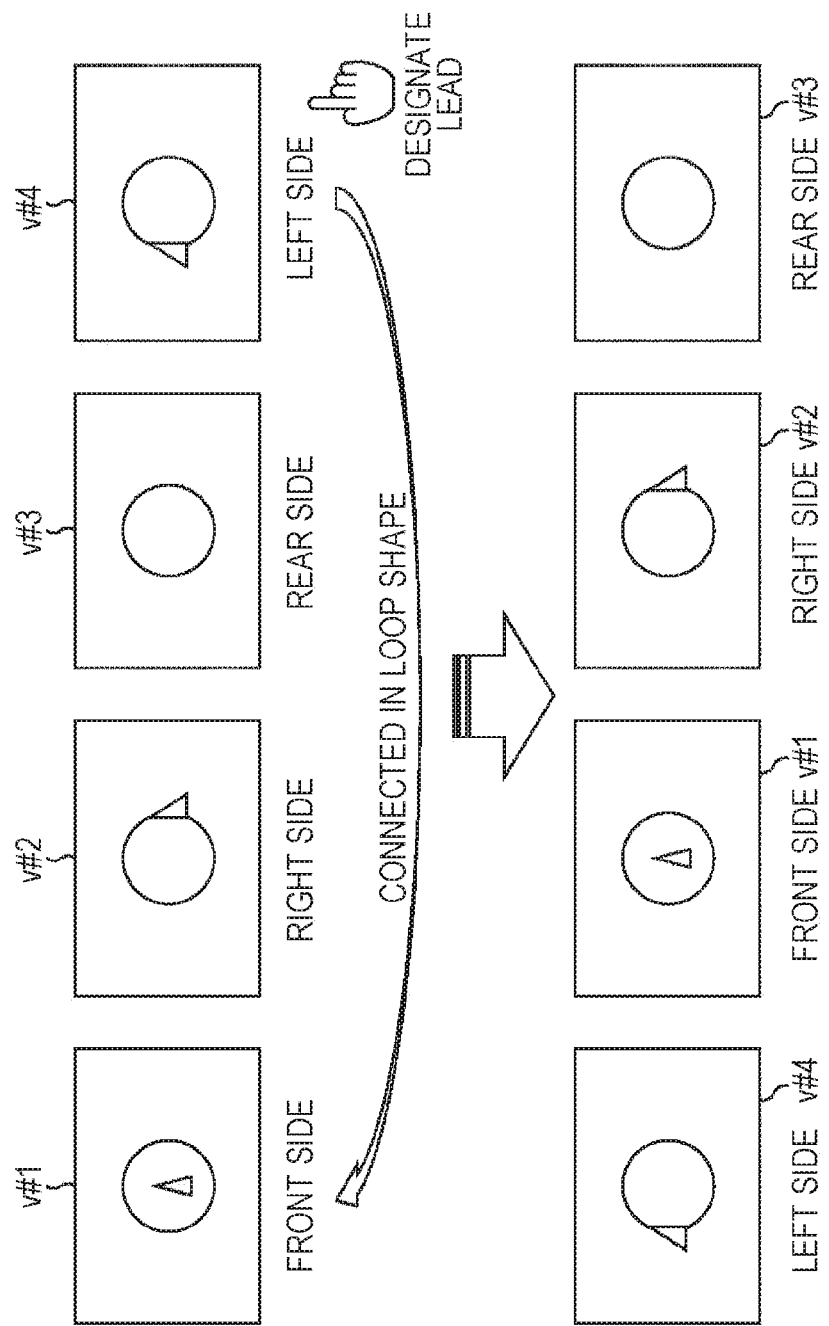
FIG. 9 is a diagram that illustrates a first example of a rearrangement process performed by a rearrangement unit 33.

FIG. 9 is a diagram that illustrates a first example of the rearrangement process performed by the rearrangement unit 33 illustrated in FIG. 2.

Now, it is assumed that four captured images v #1, v #2, v #3, and v #4 acquired by photographing a person as a subject from the front side, the right side, the rear side, and the left side are stored in the storage 12 as a group, and a position sequence of the "i-th" is attached to the captured image v #i.

For example, when the user requests the reproduction of the group configured by four captured images v #1 to v #4 by operating the operation unit 18, the reproduction unit 17 reproduces the captured images v #1 to v #4 stored in the storage 12 so as to be supplied to the display control unit 14.

The display control unit 14 recognizes the position sequences of the captured images v #1 to v #4, for example, based on the file names or the like of the captured images v #1 to v #4 and arranges reproduction screens of the captured images v #1 to v #4 supplied from the reproduction unit 17 based on the position sequences, for example, to be aligned from the left side in order of the position sequence, thereby displaying the reproduction screens on the display unit 15.

Here, as described above, since the position sequence of "i-th" is attached to the captured image v #i, the reproduction screen of the captured image v #1 to which the position sequence of "1st" is attached is displayed first, and, thereafter, the reproduction screens of the captured images v #2 to v #4 to which the position sequence of "2nd" and subsequent position sequences are aligned to be displayed from the left side in the order.

As above, in a case where the reproduction screens of the captured images v #1 to v #4 are aligned to be displayed in the order of the position sequence, for example, when the captured image v #4 of which the reproduction screen is displayed fourth from the left side (the first from the right side) is designated as being the first (here, the leftmost position) by the user operating the operation unit 18, the rearrangement unit 33 rearranges the captured images v #1 to v #4 (the reproduction screens thereof) such that the captured image (the reproduction screen thereof) designated by the user is located, for example, at the first position as a predetermined position with the alignment order according to the position sequence being maintained.

In other words, the rearrangement unit 33 supplies control information for rearranging the captured images v #1 to v #4 such that the captured image designated by the user is located at the first position to the display control unit 14, and the display control unit 14 rearranges the captured images v #1 to v #4 (the reproduction screens thereof) based on the control information supplied from the rearrangement unit 33.

Here, the position sequence is a sequence for connecting a plurality of captured images of a group in a loop shape, and the captured images v #1 to v #4 in which the position sequence of "i-th" is attached to the captured image v #i are connected in the loop shape according to the position sequences.

The rearrangement unit 33 rearranges the captured images v #1 to v #4 such that the captured image designated by the user is located at the first position with the alignment order according to the position sequences, in other words, the connection in the loop shape being maintained.

Accordingly, as described above, in a case where the captured image designated by the user is the captured image v #4, as illustrated in FIG. 9, the captured image v #4 is displayed at the first position, and, thereafter, the captured images are rearranged in order of the captured images v #1, v #2, and v #3 such that the connection (v #1→v #2→v #3→v #4→v #1) formed in the loop shape according to the position sequences is maintained.

In addition, after the rearrangement unit 33 rearranges the captured images, the position sequence attaching unit 32 can change the position sequences of the captured images in accordance with the alignment of the captured images after the rearrangement.

For example, as illustrated in FIG. 9, in a case where the alignment of the captured images v #1 to v #4 is rearranged in the order of the captured images v #4, v #1, v #2, and v #3, the position sequence of the first captured image v #4 can be changed to "1st", and thereafter, the position sequences of the captured images v #1 to v #3 can be changed to "2nd" to "4th".

As above, by changing the position sequences and changing the file names of the captured images in accordance with the change in the position sequence, in a case where the reproduction of a group configured by four captured images v #1 to v #4 is requested thereafter, in the display unit 15, a reproduction screen on which the captured images are aligned from the left side in order of the captured images v #4, v #1, v #2, and v #3 in accordance with the position sequences after the change is displayed.

Figure 10:
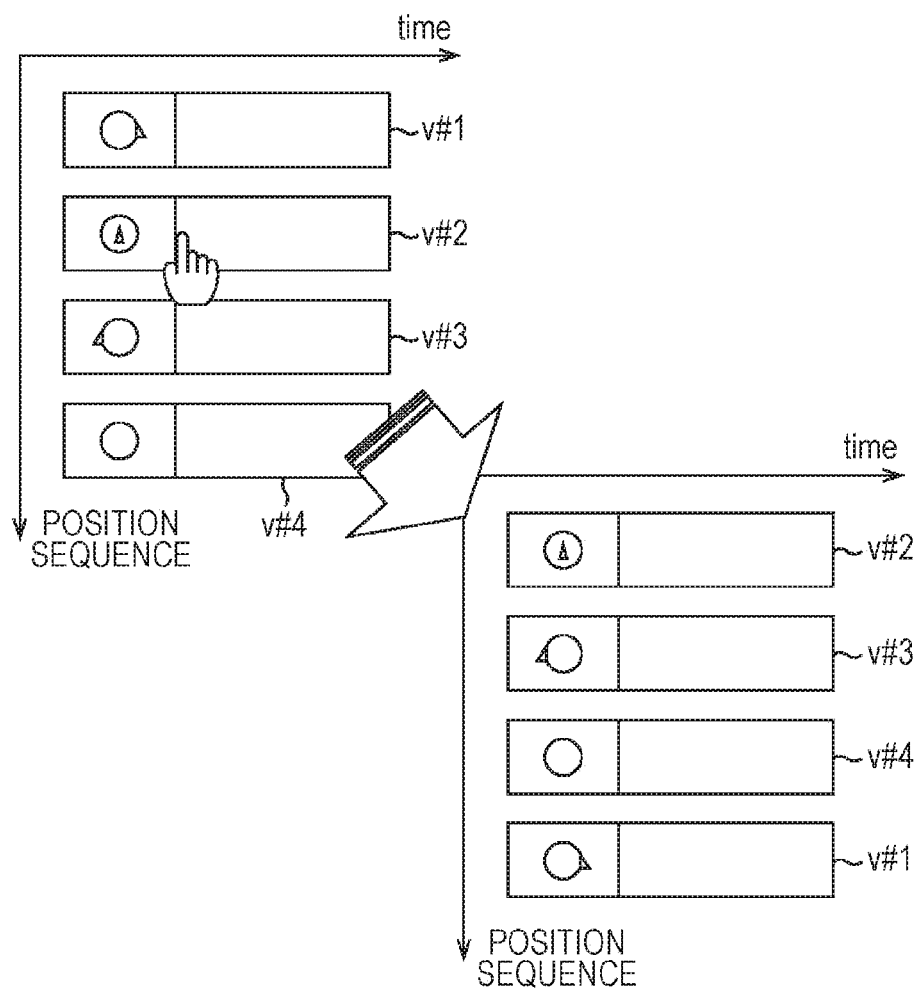
FIG. 10 is a diagram that illustrates a second example of the rearrangement process performed by the rearrangement unit 33.

FIG. 10 is a diagram that illustrates a second example of the rearrangement process performed by the rearrangement unit 33 illustrated in FIG. 2.

Now, it is assumed that four captured images v #1, v #2, v #3, and v #4 acquired by photographing a person as a subject from the right side, the front side, the left side, and the rear side are stored in the storage 12 as a group, and a position sequence of the "i-th" is attached to the captured image v #i.

For example, when the user requests the editing with the group configured by four captured images v #1 to v #4 being used as materials by operating the operation unit 18, the time synchronizing unit 13 generates synchronization information used for synchronizing the times in the group configured by the four captured images v #1 to v #4 stored in the storage 12 and supplies the generated synchronization information to the display control unit 14.

The display control unit 14 generates images (hereinafter, also referred to as film roll images) each resembling a film roll having a length that is proportional to the capture time of the captured image #i as the symbols of the captured images v #1 to v #4 stored in the storage 12.

In addition, the display control unit 14 recognizes the position sequences of the captured images v #1 to v #4 based on the file names or the like of the captured images v #1 to v #4.

Then, the display control unit 14 arranges the film roll images as the symbols of the captured images v #1 to v #4 such that the times are synchronized with the horizontal axis and the vertical axis set as the time and the position sequence and the film roll images are aligned in order of the position sequences by using the synchronization information supplied from the time synchronizing unit 13 and the position sequences of the captured images v #1 to v #4 and displays the film roll images on the display unit 15.

Here, in the case illustrated in FIG. 10, the captured images v #1 to v #4, for example, are images that have been captured for the same capture time from the same start time, and accordingly, the film roll images as the symbols of the captured images v #1 to v #4 are arranged to be vertically aligned such that the positions in the direction of the horizontal axis coincide with one another.

In addition, in the case illustrated in FIG. 10, as described above, since the position sequence of "i-th" is attached to the captured image v #i, the film roll image of the captured image v #1 to which the position sequence of "1st" is attached is displayed at the first position, and, thereafter, the film roll images of the captured images v #2 to v #4 to which the position sequence of "2nd" and subsequent position sequences are attached are arranged in the order from the upper side.

As above, in a case where the film roll images of the captured images v #1 to v #4 are aligned to be displayed in the order of the position sequence, for example, when the captured image v #4 of which the film roll image is displayed second from the upper side is designated as being the first (here, the uppermost position) by the user operating the operation unit 18, the rearrangement unit 33 rearranges the captured images v #1 to v #4 (the film roll images thereof) such that the captured image (the film roll image thereof) designated by the user is located, for example, at the first position as a predetermined position with the alignment order according to the position sequence being maintained.

In other words, the rearrangement unit 33 supplies control information for rearranging the captured images v #1 to v #4 to the display control unit 14 such that the captured image designated by the user is located at the first position, and the display control unit 14 rearranges the captured images v #1 to v #4 (the film roll images thereof) based on the control information supplied from the rearrangement unit 33.

Here, the position sequence is a sequence for connecting a plurality of captured images of a group in a loop shape, and the captured images v #1 to v #4 in which the position sequence of "i-th" is attached to the captured image v #i are connected in the loop shape according to the position sequences.

The rearrangement unit 33 rearranges the captured images v #1 to v #4 such that the captured image designated by the user is located at the first position with the alignment order according to the position sequences, in other words, the connection in the loop shape being maintained.

Accordingly, as described above, in a case where the captured image designated by the user is the captured image v #2, as illustrated in FIG. 10, the captured image v #2 is displayed at the first position, and, thereafter, the captured images are rearranged in order of the captured images v #3, v #4, and v #1 such that the connection (v #1→v #2→v #3→v #4→v #1) formed in the loop shape according to the position sequences is maintained.

Figure 11:
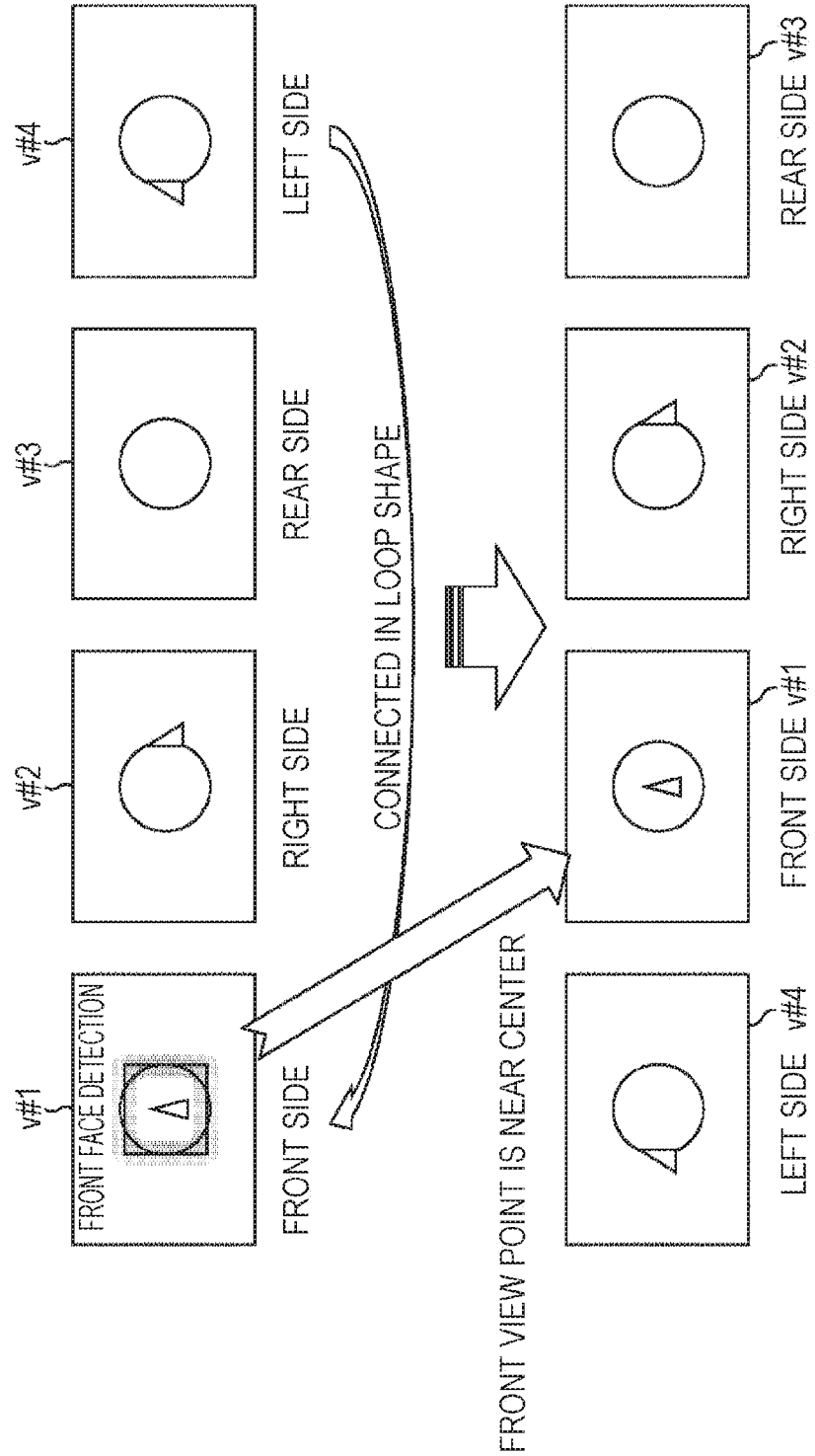
FIG. 11 is a diagram that illustrates a third example of the rearrangement process performed by the rearrangement unit 33.

FIG. 11 is a diagram that illustrates a third example of the rearrangement process performed by the rearrangement unit 33 illustrated in FIG. 2.

In the case illustrated in FIG. 11, similar to the case illustrated in FIG. 9, four captured images v #1, v #2, v #3, and v #4 acquired by photographing a person as a subject from the front side, the right side, the rear side, and the left side are stored in the storage 12 as a group, and a position sequence of the "i-th" is attached to the captured image v #i.

For example, when the user requests the reproduction of the group configured by four captured images v #1 to v #4 by operating the operation unit 18, the display control unit 14, similar to the case illustrated in FIG. 9, displays the reproduction screen of the captured image v #1 to which the position sequence of "1st" is attached at the first position and, thereafter, displays the reproduction screens of the captured images v #2 to v #4 to which the position sequence of "2nd" and subsequent position sequences are attached to be aligned in the order form the left side.

As above, in a case where the reproduction screens of the captured images v #1 to v #4 are aligned to be displayed in the order of the position sequence, for example, when the detection of a front face (a face facing the front side) is requested from the user by operating the operation unit 18 or the like, the rearrangement unit 33 detects the front face from the captured images v #1 to v #4 as targets and rearranges the captured images v #1 to v #4 (the reproduction screens thereof) such that the captured image (the reproduction screen thereof) from which the front face has been detected is arranged, for example, at the center position (or near the center position) as a predetermined position with the alignment order according to the position sequences being maintained.

In other words, the rearrangement unit 33 supplies control information for rearranging the captured images v #1 to v #4 such that the captured image from which the front face has been detected is arranged near the center position to the display control unit 14, and the display control unit 14 rearranges the captured images v #1 to v #4 (the reproduction screens thereof) based on the control information supplied from the rearrangement unit 33.

Here, in the case illustrated in FIG. 11, the front face is shown up in the captured image v #1, and thus, the front face is detected from the captured image v #1.

In addition, the captured images v #1 to v #4 (the reproduction screens thereof) are aligned in the order from the left side, and, as the center position (near center position), for example, the second position from the left side is used.

In this case, as illustrated in FIG. 11, the captured images v #1 to v #4 (the reproduction screens thereof) are rearranged in order of the captured images v #4, v #1, v #2, and v #3 from the left side such that the captured image v #1 from which the front face has been detected is arranged at the second position from the left side as the center position, and the connection (v #1→v #2→v #3→v #4→v #1) having a loop shape according to the position sequences is maintained.

Figure 12:
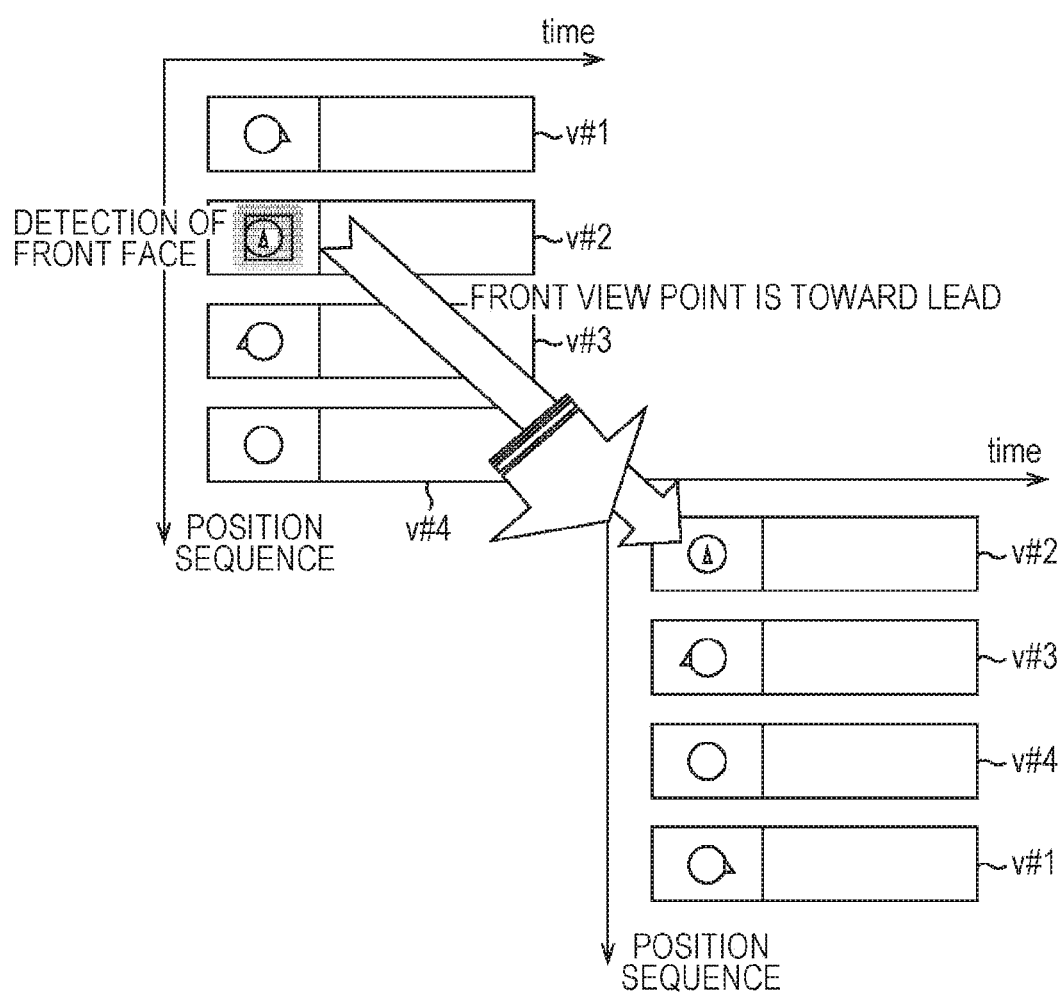
FIG. 12 is a diagram that illustrates a fourth example of the rearrangement process performed by the rearrangement unit 33.

FIG. 12 is a diagram that illustrates a fourth example of the rearrangement process performed by the rearrangement unit 33 illustrated in FIG. 2.

In the case illustrated in FIG. 12, similar to the case illustrated in FIG. 10, four captured images v #1, v #2, v #3, and v #4 acquired by photographing a person as a subject from the right side, the front side, the left side, and the rear side are stored in the storage 12 as a group, and a position sequence of the "i-th" is attached to the captured image v #i.

For example, when the user requests the editing with the group configured by four captured images v #1 to v #4 being used as materials by operating the operation unit 18, similar to the case illustrated in FIG. 10, the display control unit 14 arranges the film roll images as the symbols of the captured images v #1 to v #4 such that the times are synchronized with the horizontal axis and the vertical axis set as the time and the position sequence, and the film roll images are aligned in order of the position sequences and displays the film roll images on the display unit 15.

In other words, in the case illustrated in FIG. 12, similar to the case illustrated in FIG. 10, the film roll images as the symbols of the captured images v #1 to v #4 are arranged to be vertically aligned such that the positions in the direction of the horizontal axis coincide with each other. In addition, the film roll image of the captured image v #1 to which the position sequence of "1st" is attached is displayed at the first position, and, thereafter, the film roll images of the captured images v #2 to v #4 to which the position sequence of "2nd" and subsequent position sequences are attached are arranged to be aligned in the order from the upper side and are displayed.

As above, in a case where the film roll images of the captured images v #1 to v #4 are aligned to be displayed in the order of the position sequence, for example, when the detection of a front face (a face facing the front side) is requested from the user by operating the operation unit 18 or the like, the rearrangement unit 33 detects the front face from the captured images v #1 to v #4 as targets and rearranges the captured images v #1 to v #4 (the film roll images thereof) such that the captured image (the film roll images thereof) from which the front face has been detected is arranged, for example, at the first position as a predetermined position with the alignment order according to the position sequences being maintained.

In other words, the rearrangement unit 33 supplies control information for rearranging the captured images v #1 to v #4 such that the captured image from which the front face has been detected is arranged at the first position to the display control unit 14, and the display control unit 14 rearranges the captured images v #1 to v #4 (the film roll images thereof) based on the control information supplied from the rearrangement unit 33.

Here, in the case illustrated in FIG. 12, the front face is shown up in the captured image v #2, and thus, the front face is detected from the captured image v #2.

In this case, as illustrated in FIG. 12, the captured images v #1 to v #4 (the film roll images thereof) are rearranged in order of the captured images v #2, v #3, v #4, and v #1 from the upper side such that the captured image v #2 from which the front face has been detected is arranged at the first position (lead) from the upper side, and the connection (v #1→v #2→v #3→v #4→v #1) having a loop shape according to the position sequences is maintained.

FIG. 13 is a diagram that illustrates a fifth example of the rearrangement process performed by the rearrangement unit 33 illustrated in FIG. 2.

FIG. 13A is a diagram that illustrates an example of the capture state of captured images configuring a group.

In the case illustrated in FIG. 13A, a plurality of eight cameras c #1 to c #8 are arranged on the periphery of a track of a stadium, and an athletic sport performed in the track is photographed.

In this case, similar to the case illustrated in FIG. 8B, the position sequence attaching unit 32 (FIG. 2) recognizes that the capture locations of the cameras c #1 to c #8 are located on the circumference of an oval, for example, based on the camera positional relation of the cameras c #1 to c #8 and sets a direction, for example, a counterclockwise direction along the circumference as a sequence attaching direction for attaching the position sequences.

The position sequence attaching unit 32 attaches position sequences to captured images v #1 to v #8 captured by the cameras c #1 to c #8 along the sequence attaching direction.

In other words, the position sequence attaching unit 32 attaches position sequences to the cameras c #1 to c #8 along the sequence attaching direction with the capture location of an arbitrary one camera c #i out of the cameras c #1 to c #8 being set as a start point.

Now, out of the cameras c #1 to c #8, for example, in a case where the capture location of the camera c #7 is set as the start point, the position sequence of "1st" is attached to the captured image v #7 of the camera c #7. In addition, along the sequence attaching direction, the position sequence of "2nd" is attached to the captured image v #8 of the camera c #8, and the position sequence of "3rd" is attached to the captured image v #1 of the camera c #1. Similarly, the position sequence of "4th" is attached to the captured image v #2 of the camera c #2, the position sequence of "5th" is attached to the captured image v #3 of the camera c #3, the position sequence of "6th" is attached to the captured image v #4 of the camera c #4, the position sequence of "7th" is attached to the captured image v #5 of the camera c #5, and the position sequence of "8th" is attached to the captured image v #6 of the camera c #6.

In a case where the captured images v #1 to v #8 as above are stored in the storage 12 as a group, for example, when the user requests the reproduction of the group configured by the captured images v #1 to v #8 by operating the operation unit 18, the reproduction unit 17 reproduces the captured images v #1 to v #8 stored in the storage 12 so as to be supplied to the display control unit 14.

FIG. 13B is a diagram that illustrates an example of the display of the reproduction screens of the captured images v #1 to v #8.

The display control unit 14 recognizes the position sequences of the captured images v #1 to v #8, for example, based on the file names or the like of the captured images v #1 to v #8, arranges the reproduction screens of the captured images v #1 to v #8 supplied from the reproduction unit 17 to be aligned in order of the position sequence, and displays the arranged reproduction screens on the display unit 15.

Here, in the case illustrated in FIG. 13B, as the arrangement pattern of the eight captured images v #1 to v #8 (the reproduction screens thereof), an arrangement pattern of horizontal×vertical: 4×2 is used.

In the arrangement pattern of horizontal×vertical: H×V, the arrangement of the captured images (the reproduction screens thereof) is performed, for example, in order from the left side to the right side, and, when the right end is attained, the arrangement position is lowered by one row, and, again, the arrangement is performed in order from the left side to the right side.

In the arrangement pattern of 4×2, the reproduction screens of the eight captured images v #1 to v #8 are arranged in order of v #7, v #8, v #1, v #2, v #3, v #4, v #5, and v #6 in accordance with the position sequences and are displayed.

As above, in a case where the reproduction screens of the captured images v #1 to v #8 are arranged to be displayed in the order of the position sequence, for example, when the captured image v #1 is designated as the lead by the user operating the operation unit 18 or the like, the rearrangement unit 33 rearranges the captured images v #1 to v #8 (the reproduction screens thereof) such that the captured image (the reproduction screen thereof) designated by the user is located at the first position as a predetermined position of the 4×2 arrangement pattern with the alignment order according to the position sequence being maintained.

In other words, the rearrangement unit 33 supplies control information for rearranging the captured images v #1 to v #8 such that the captured image designated by the user is located at the first position to the display control unit 14, and the display control unit 14 rearranges the captured images v #1 to v #8 (the reproduction screens thereof) based on the control information supplied from the rearrangement unit 33.

As described above, in a case where the captured image v #1 is designated by the user, as illustrated in FIG. 13B, the captured images v #1 to v #8 is rearranged in order of v #1, v #2, v #3, v #4, v #5, v #6, v #7, and v #8 such that the captured image v #1 designated by the user is arranged at the first position, and, thereafter, the connection (v #1→v #2→v #3→ . . . →v #7→v #8→v #1) formed in the loop shape according to the position sequences is maintained.

In addition, in FIGS. 9 to 13, while the rearrangement of a plurality of captured images of a group has been described to be performed such that the captured image designated by the user or the captured image from which a front face has been detected (shown up) is arranged at a predetermined position such as a first position, the captured image to be located at the predetermined position is not limited to the captured image designated by the user or the captured image in which the front face is shown up in the rearrangement of the captured images.

In other words, in the rearrangement of captured images, when a captured image to be arranged at a predetermined position is referred to as a specific image, the rearrangement unit 33, for example, performs detection of a face or detection of a person for a plurality of captured images of a group as targets and can perform rearrangement of the captured images with the captured image in which the area or the time in which a face is shown up is large, a captured image in which a specific person is shown up, a captured image in which the number of persons shown up are large, or the like being set as the specific image.

In addition, as illustrated in FIG. 13A, in a case where a model representing a track in which a sport is performed or a court, a course, or the like in which a sport is performed is provided from a server disposed on a network, based on the model, the specific image can be set out of a plurality of captured images of a group.

In other words, for example, start or a goal of the sport performed in the track can be recognized based on a model of the track, the rearrangement unit 33 can set a captured image captured by a camera located at a capture location close to the start or the goal as the specific image.

In addition, the rearrangement of a plurality of captured images of a group may be performed at arbitrary timing without waiting for a user's operation of the operation unit 18.

Furthermore, the position at which the specific image is arranged, for example, may be set in accordance with a user's operation of the operation unit 18.

As above, in the image processing apparatus illustrated in FIG. 2, the camera positional relation of a plurality of cameras is acquired, and, based on the camera positional relation, position sequences for connecting a plurality of captured images in a loop shape are attached to the plurality of captured images captured by the plurality of cameras. Then, the plurality of captured images are arranged to be aligned in accordance with the position sequence and are displayed.

In addition, the plurality of captured images can be rearranged with the alignment order according to the position sequence being maintained as is necessary.

Accordingly, for example, captured images captured at positions located close to each other are prevented from being arranged separate from each other, and captured images captured at positions located far from each other are prevented from being arranged at positions close to each other, and the plurality of captured images can be provided in a form that can be easily handled by the user.

Figure 14:
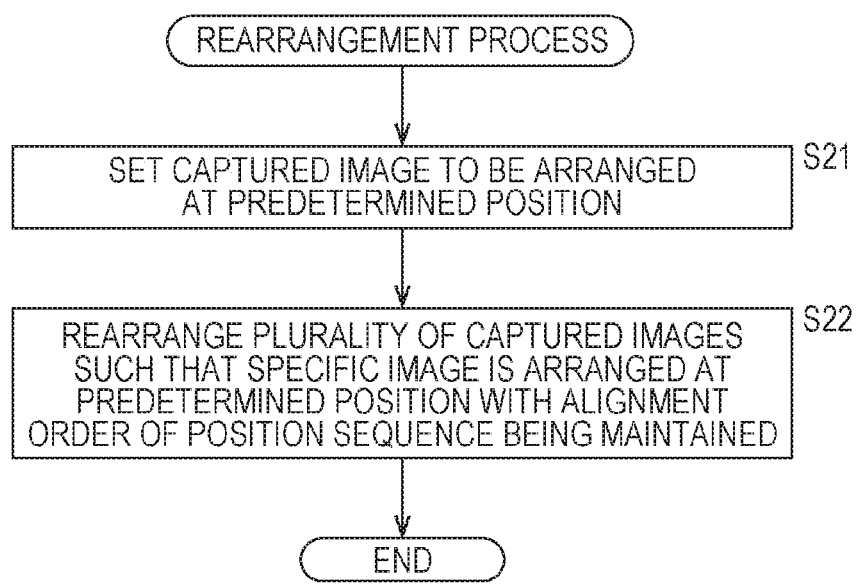
FIG. 14 is a flowchart that illustrates an example of the rearrangement process performed by the rearrangement unit 33.

FIG. 14 is a flowchart that illustrates an example of the rearrangement process performed by the rearrangement unit 33 illustrated in FIG. 2.

In Step S21, the rearrangement unit 33 sets a captured image to be arranged at a predetermined position out of a plurality of captured images of a group stored in the storage 12 as a specific image based on a user's operation of the operation unit 18 or the like, and the process proceeds to Step S22.

In Step S22, the rearrangement unit 33 generates control information used for rearranging the plurality of captured images of the group such that the specific image is located at the predetermined position with the alignment order of the position sequences of the plurality of captured images of the group being maintained and supplies the generated control information to the display control unit 14, and the rearrangement process ends.

Here, an image in which a plurality of captured images are aligned in accordance with the order of the position sequence, in other words, as illustrated in FIGS. 9, 11, and 13, an image in which a plurality of captured images (the reproduction screens thereof) of a group are aligned in order of the position sequence and, as illustrated in FIGS. 10 and 12, a plurality of captured images (the symbols of film roll images thereof) of a group are arranged such that the horizontal axis and the vertical axis are set as the time and the position sequence, the times are synchronized, and the captured images are arranged in order of the position sequence may be also referred to as position sequence images.

<Reverse Rearrangement Process>

FIG. 15 is a diagram that illustrates an example of a reverse rearrangement process performed by the reverse rearrangement unit 34 illustrated in FIG. 2.

FIG. 15A is a diagram that illustrates an example of the capture state of captured images configuring a group.

In the case illustrated in FIG. 15A, similar to the case illustrated in FIG. 13A, a plurality of eight cameras c #1 to c #8 are arranged on the periphery of a track of a stadium, and an athletic sport performed in the track is photographed.

In this case, similar to the case illustrated in FIG. 8B or 15A, the position sequence attaching unit 32 (FIG. 2) recognizes that the capture locations of the cameras c #1 to c #8 are located on the circumference of an oval, for example, based on the camera positional relation of the cameras c #1 to c #8 and sets a direction, for example, a counterclockwise direction along the circumference as a sequence attaching direction for attaching the position sequences.

The position sequence attaching unit 32 attaches position sequences to captured images v #1 to v #8 captured by the cameras c #1 to c #8 along the sequence attaching direction.

In other words, the position sequence attaching unit 32 attaches position sequences to the cameras c #1 to c #8 along the sequence attaching direction with the capture location of an arbitrary one camera c #i out of the cameras c #1 to c #8 being set as a start point.

Now, out of the cameras c #1 to c #8, for example, in a case where the capture location of the camera c #1 is set as the start point, the position sequence of "1st" is attached to the captured image v #1 of the camera c #1. In addition, the position sequence of "2nd" is attached to the captured image v #2 of the camera c #2, and the position sequence of "3rd" is attached to the captured image v #3 of the camera c #3. Thereafter, similarly, position sequences of "4th" to "8th" are attached to the captured images v #4 to v #8 of the cameras c #4 to c #8.

In a case where the captured images v #1 to v #8 as above are stored in the storage 12 as a group, for example, when the user requests the reproduction of the group configured by the captured images v #1 to v #8 by operating the operation unit 18, the reproduction unit 17 reproduces the captured images v #1 to v #8 stored in the storage 12 so as to be supplied to the display control unit 14.

FIG. 15B is a diagram that illustrates an example of the display of the reproduction screens of the captured images v #1 to v #8.

The display control unit 14 recognizes the position sequences of the captured images v #1 to v #8, for example, based on the file names or the like of the captured images v #1 to v #8, arranges the reproduction screens of the captured images v #1 to v #8 supplied from the reproduction unit 17 to be aligned, for example, in an arrangement pattern of 4×2 in order of the position sequence, and displays the arranged reproduction screens on the display unit 15.

In FIG. 15B, the reproduction screens of eight captured images v #1 to v #8 are displayed in the arrangement pattern of 4×2 to be arranged in order of captured images v #1, v #2, v #3, v #4, v #5, v #6, v #7, and v #8 in accordance with the position sequences.

As above, in a case where the reproduction screens of the captured images v #1 to v #8 are arranged in order of the position sequence and are displayed, for example, when a user designates the reversal of the alignment order of captured images by operating the operation unit 18 or the like, the reverse rearrangement unit 34 rearranges the alignment of the captured images v #1 to v #8 (the reproduction screens thereof) in a reverse order of the alignment order according to the position sequences.

In other words, the reverse rearrangement unit 34 supplies control information used for rearranging the captured images v #1 to v #8 in the reverse order of the alignment order according to the position sequences to the display control unit 14. The display control unit 14 rearranges the captured images v #1 to v #8 (the reproduction screens thereof) in the reverse order of the alignment order according to the position sequences based on the control information supplied from the reverse rearrangement unit 34.

In this case, since the alignment order of the captured images v #1 to v #8 according to the position sequence is the order of the captured images v #1, v #2, v #3, v #4, v #5, v #6, v #7, and v #8, the reverse rearrangement unit 34 rearranges the captured images v #1 to v #8, as illustrated in FIG. 15B, in order of the captured images v #8, v #7, v #6, v #5, v #4, v #3, v #2, and v #1 that is the reverse order.

In addition, in a case where the captured images are rearranged by the reverse rearrangement unit 34, similar to a case where the captured images are rearranged by the rearrangement unit 33, the position sequence attaching unit 32 can change the position sequences of the captured images in accordance with the alignment of the captured images after the rearrangement.

By changing the position sequences and changing the file names of the captured images in accordance with the change of the position sequences, in a case where reproduction of a group that is configured by the captured images v #1 to v #8 illustrated in FIG. 15 is requested thereafter, the reproduction screens aligned in order of the captured images v #8 to v #1 in accordance with the position sequences after the change are displayed on the display unit 15.

Here, in the case illustrated in FIG. 15, in a case where the alignment order of the captured images is designated to be reversed in accordance with a user's operation of the operation unit 18 or the like, while the reverse rearrangement for reversely rearranging the alignment of a plurality of captured images of a group has been described to be performed, the reverse rearrangement of the captured images may be performed at arbitrary timing without waiting for a user's operation of the operation unit 18.

In other words, for example, the reverse rearrangement unit 34 may detect a motion (optical flow) of a subject shown up in captured images over a plurality of captured images of a group and determine whether or not the alignment of the plurality of captured images according to the position sequence, for example, is alignment from the goal toward the start based on the motion of the subject.

Then, in a case where the alignment of the plurality of captured images according to the position sequence is the alignment toward a direction from the goal to the start, the reverse arrangement of the captured images can be performed.

In addition, for example, as illustrated in FIG. 15A, in a case where a model representing a track in which a sport is performed or a court, a course, or the like in which a sport is performed is provided from a server disposed on a network, based on the model, the reverse rearrangement unit 34 may recognize the advancement direction of the sport such as a direction from the start toward the goal or the like based on the model and perform reverse rearrangement of captured images in a case where the alignment of a plurality of the captured images according to the position sequences is not the alignment according to the advancement direction of the sport.

According to the reverse arrangement process, for example, a plurality of captured images of a group can be arranged to be aligned along the advancement direction of a sport, and accordingly, the plurality of captured images can be provided in a form that can be easily handled by the user.

Figure 16:
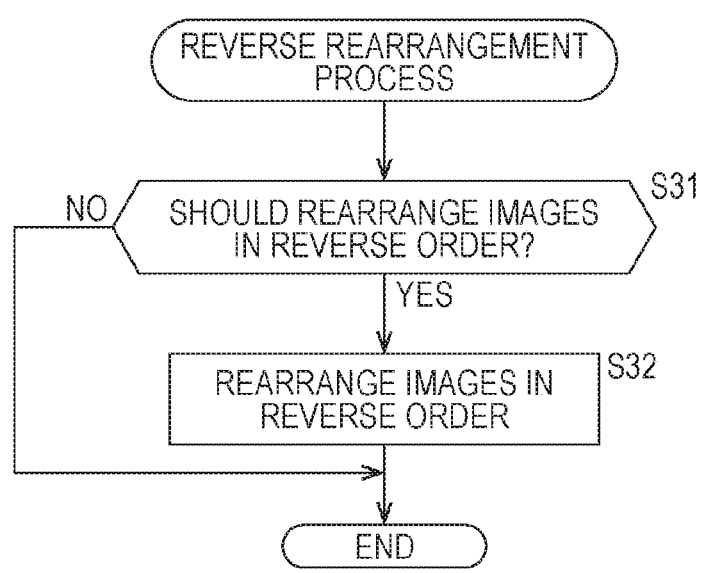
FIG. 16 is a flowchart that illustrates an example of a reverse rearrangement process performed by the reverse rearrangement unit 34.

FIG. 16 is a flowchart that illustrates an example of the reverse rearrangement process performed by the reverse rearrangement unit 34 illustrated in FIG. 2.

In Step S31, the reverse rearrangement unit 34 determines whether to perform the reverse arrangement process in which the alignment (arrangement) in the order of the position sequences of a plurality of captured images of a group stored in the storage 12 is changed to be in the reverse order.

Here, in Step S31, the determination of whether to perform the reverse rearrangement process, for example, may be made based on whether the reversal of the alignment order of captured images is designated by a user's operation of the operation unit 18, whether the alignment of a plurality of captured images according to the position sequences, for example, is in accordance with the advancement direction of a sport such as alignment in a direction toward the goal from the start, or the like.

In Step S31, in a case where the reverse rearrangement process is determined not to be performed, the reverse arrangement process ends.

On the other hand, in Step S31, in a case where the reverse rearrangement process is determined to be performed, in other words, in a case the alignment order of captured images is designated to be reversed by a user's operation of the operation unit 18 or a case where the alignment of a plurality of captured images according to the position sequences is not the alignment according to the advancement direction of the sport, the process proceeds to Step S32, the reverse rearrangement processing unit 34 generates control information used for rearranging the alignment of a plurality of captured images of a group stored in the storage 12 in a reverse order of the alignment order according to the position sequences and supplies the generated control information to the display control unit 14, and the reverse rearrangement process ends.

<Capture State Image Generating Process>

Figure 17:
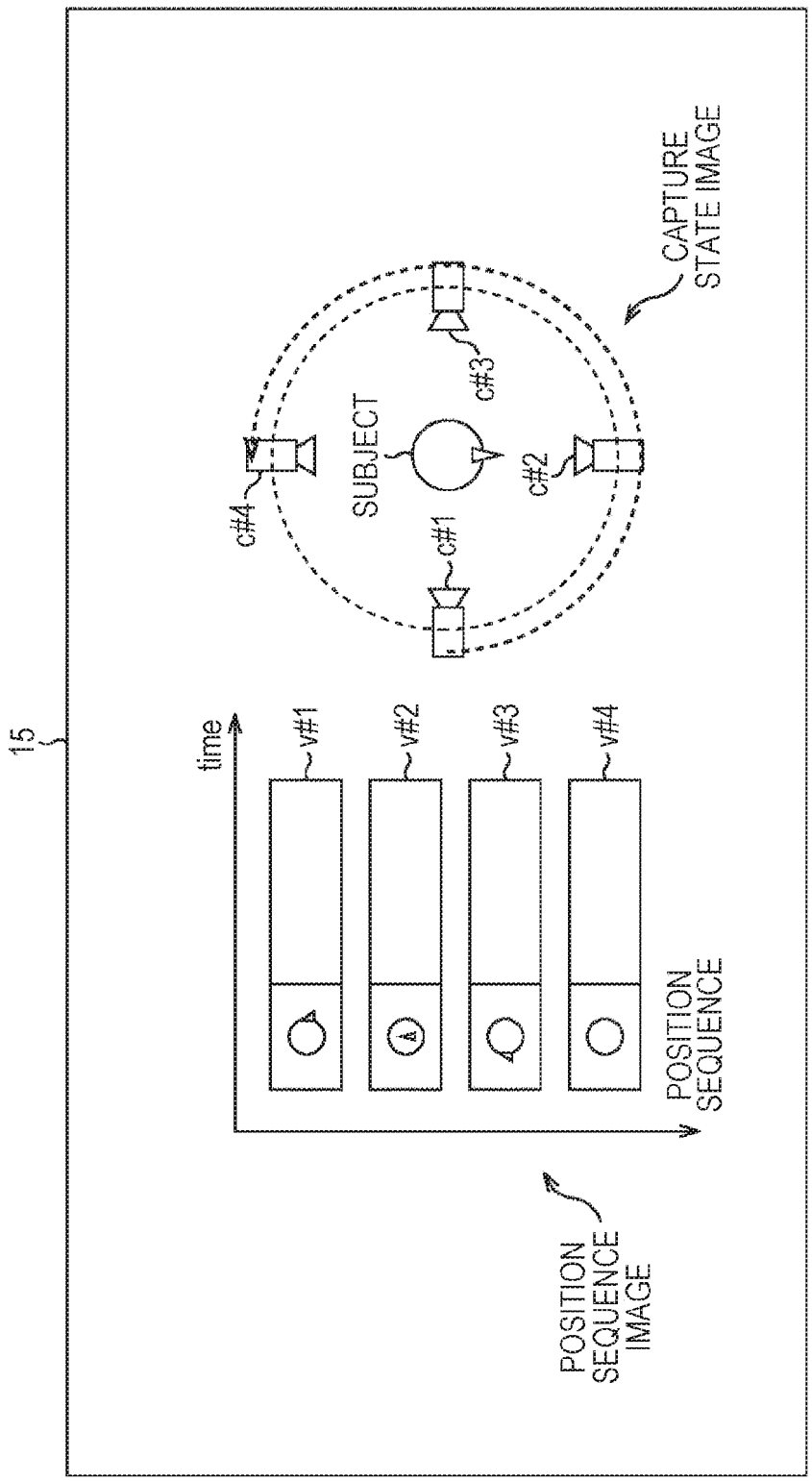
FIG. 17 is a diagram that illustrates a first display example of a capture state image generated by a capture state image generating unit 35.

FIG. 17 is a diagram that illustrates a first display example of a capture state image generated by a capture state image generating unit 35.

In FIG. 17, a position sequence image and a capture state image are displayed on the display unit 15.

In the position sequence image illustrated in FIG. 17, similar to the cases illustrated in FIGS. 10 and 12, the horizontal axis and the vertical axis are set as the time and the position sequence, and four captured images v #1 to v #4 (film roll images as the symbols thereof) of a group are arranged such that the times are synchronized, and the captured images are aligned in the order of the position sequence.

The capture state image is an image that represents the capture state according to a plurality of cameras capturing a plurality of captured images of a group, and the capture state image illustrated in FIG. 17 is an image that illustrates a capture state according to four cameras c #1 to c #4 capturing the four captured images v #1 to v #4 of the group that configures the position sequence image.

In other words, the capture state image illustrated in FIG. 17 includes a subject (an image resembling the subject) and four cameras c #1 to c #4 (images resembling the cameras) photographing the subject, and, in the capture state image, a camera c #i is arranged at a capture position at the time of photographing the subject using the camera c #i in a direction that is the capture direction at the time when the subject is photographed.

In addition, in the capture state image, as denoted by a dotted-line arrow in the figure, an arrow (an image of the arrow) representing the sequence attaching direction or the like may be included.

For example, in a case where the user requests editing by operating the operation unit 18, the capture state image generating unit 35 generates a capture state image representing a capture state according to a plurality of cameras capturing a plurality of captured images of a group based on the camera positional relation for the plurality of captured images of the group requested to be edited, and the display control unit 14, as illustrated in FIG. 17, can display the capture state image on the display unit 15 together with the position sequence image.

Figure 18:
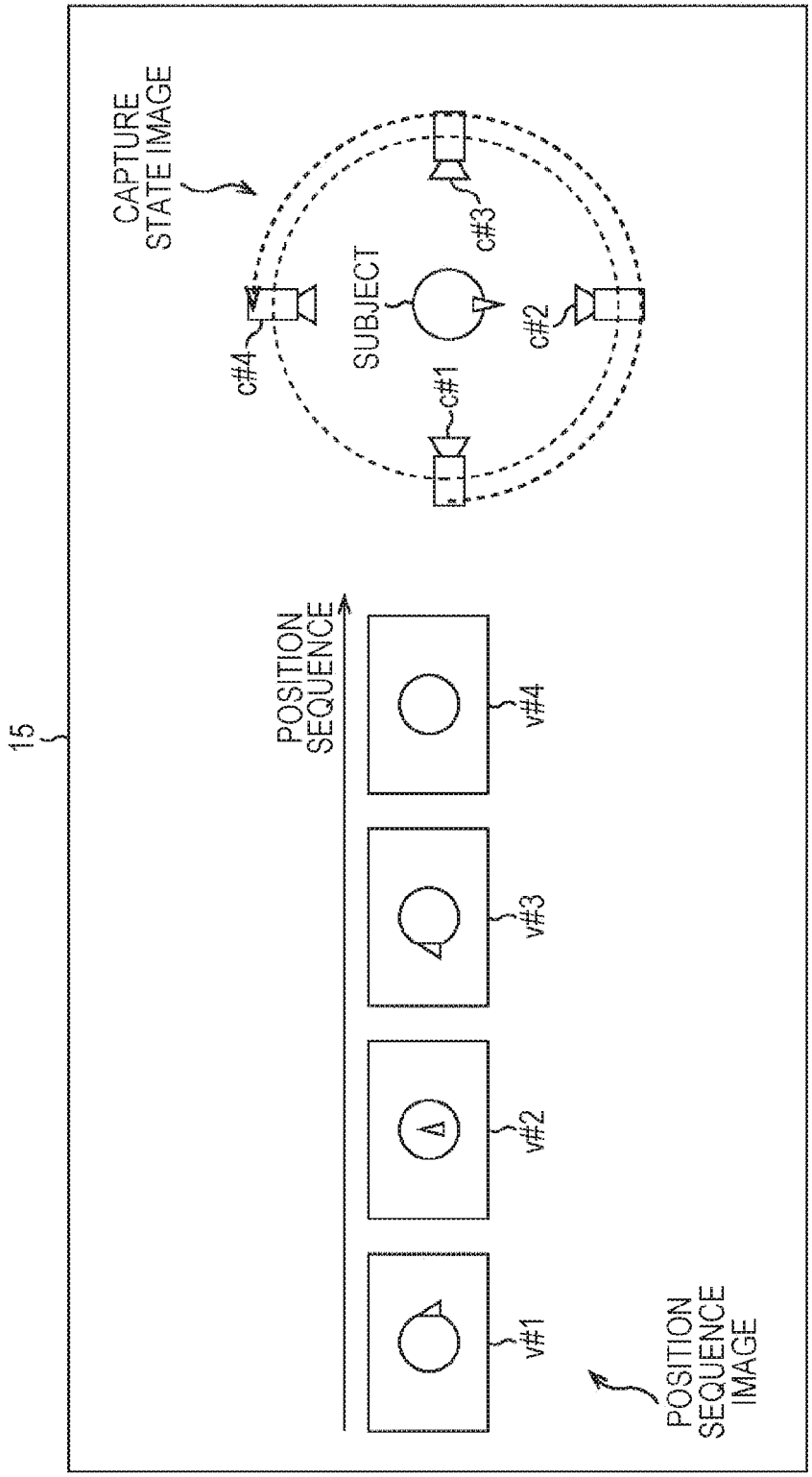
FIG. 18 is a diagram that illustrates a second display example of the capture state image generated by the capture state image generating unit 35.

FIG. 18 is a diagram that illustrates a second display example of the capture state image generated by the capture state image generating unit 35.

In FIG. 18, a position sequence image and a capture state image are displayed on the display unit 15.

In the position sequence image illustrated in FIG. 18, similar to the cases illustrated in FIGS. 9 and 11, four captured images v #1 to v #4 (the reproduction screens thereof) are arranged in a horizontal one row in the order of the position sequence, in other words, in an arrangement pattern of 4×1.

In addition, the capture state image illustrated in FIG. 18 is configured to be the same as the capture state image illustrated in FIG. 17.

For example, in a case where the user requests reproduction by operating the operation unit 18, the capture state image generating unit 35 generates a capture state image representing a capture state according to a plurality of cameras capturing a plurality of captured images of a group based on the camera positional relation for the plurality of captured images of the group requested to be reproduced, and the display control unit 14, as illustrated in FIG. 18, can display the capture state image on the display unit 15 together with the position sequence image.

Figure 19:
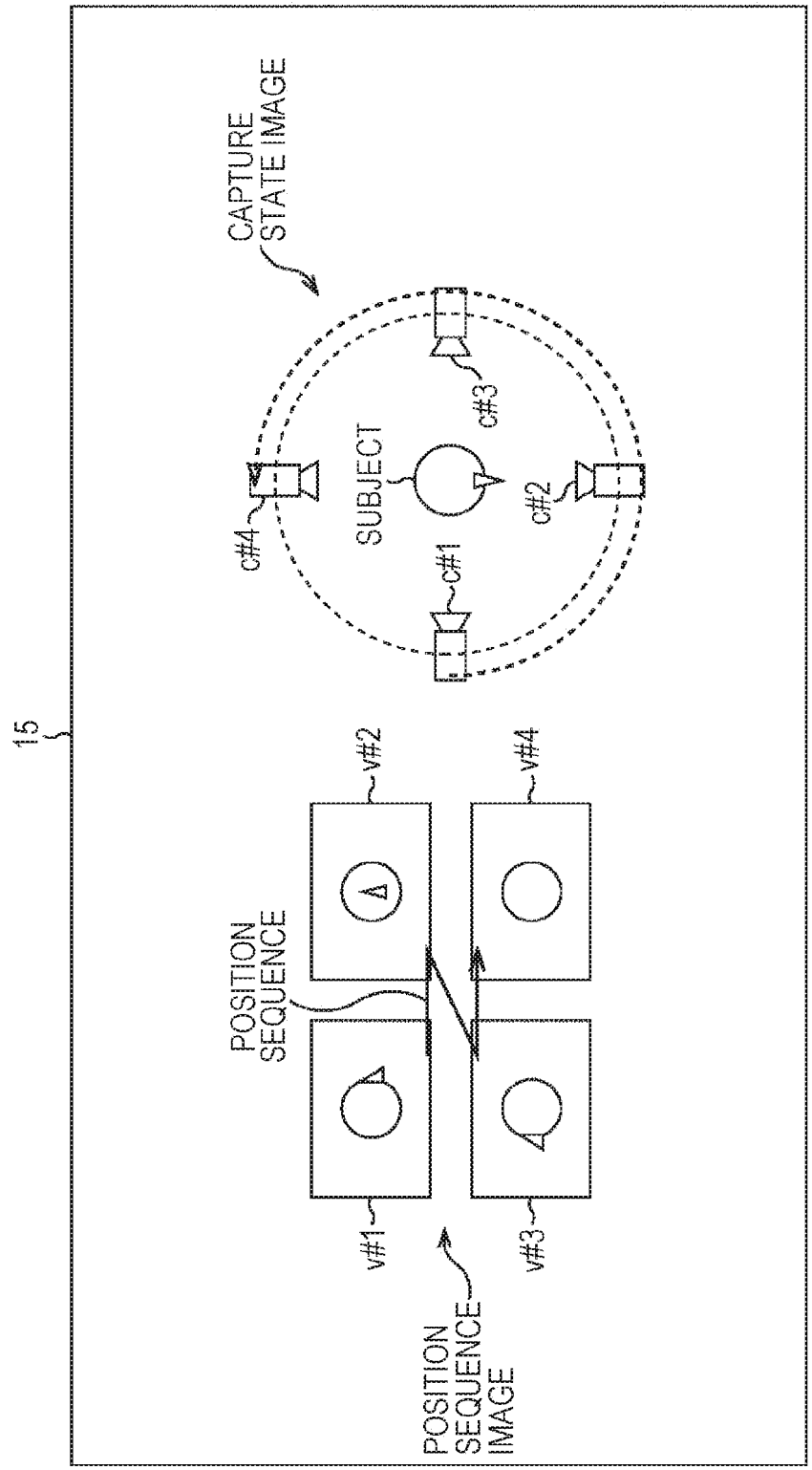
FIG. 19 is a diagram that illustrates a third display example of the capture state image generated by the capture state image generating unit 35.

FIG. 19 is a diagram that illustrates a third display example of the capture state image generated by the capture state image generating unit 35.

In the second display example illustrated in FIG. 18, in the position sequence image, while four captured images v #1 to v #4 are arranged in the arrangement pattern of 4×1 in the order of the position sequence, in the third display example illustrated in FIG. 19, in the position sequence image, four captured images v #1 to v #4 (the reproduction screens thereof) are arranged in an arrangement pattern of 2×2 in the order of the position sequence.

Regarding the other points, the third display example illustrated in FIG. 19 is the same as that of the second display example illustrated in FIG. 18.

As above, in a case where the capture state image is displayed, the user can easily acquire each capture position at which each captured image of the group is captured.

Figure 20:
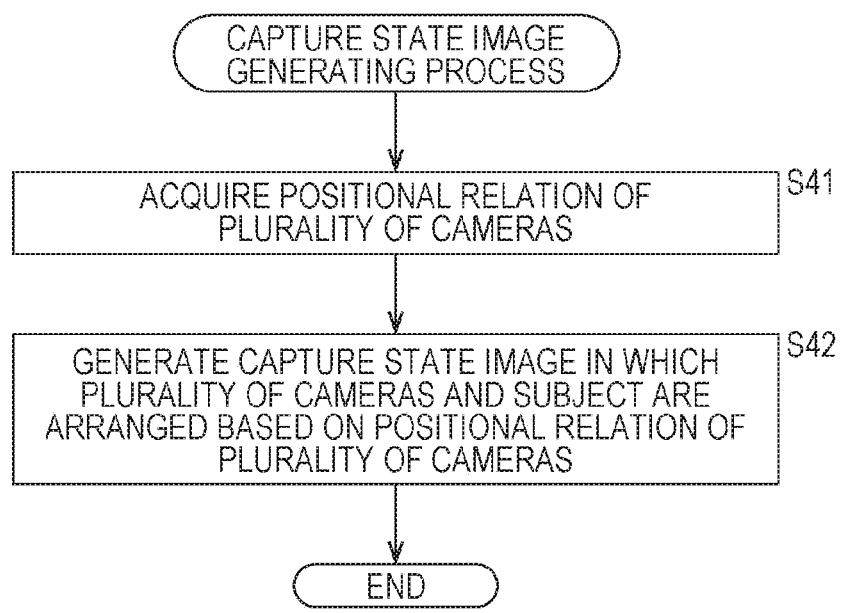
FIG. 20 is a flowchart that illustrates an example of a capture state image generating process performed by the camera positional relation acquiring unit 31 and the capture state image generating unit 35.

FIG. 20 is a flowchart that illustrates an example of a capture state image generating process performed by the camera positional relation acquiring unit 31 and the capture state image generating unit 35 illustrated in FIG. 2.

In Step S41, the camera positional relation acquiring unit 31 acquires the camera positional relation of a plurality of cameras capturing a plurality of captured images of the group stored in the storage 12, and the process proceeds to Step S42.

In Step S42, the capture state image generating unit 35 generates a capture state image that represents the capture state according to the plurality of cameras capturing a plurality of captured images stored in the storage 12 based on the camera positional relation acquired by the camera positional relation acquiring unit 31 or the like and supplies the generated capture state image to the display control unit 14, and the capture state image generating process ends.

In FIGS. 17 to 19, while the subject (an image resembling the subject) is included in the capture state image, the subject may be not included in the capture state image.

<Image Thinning Process>

Figure 21:
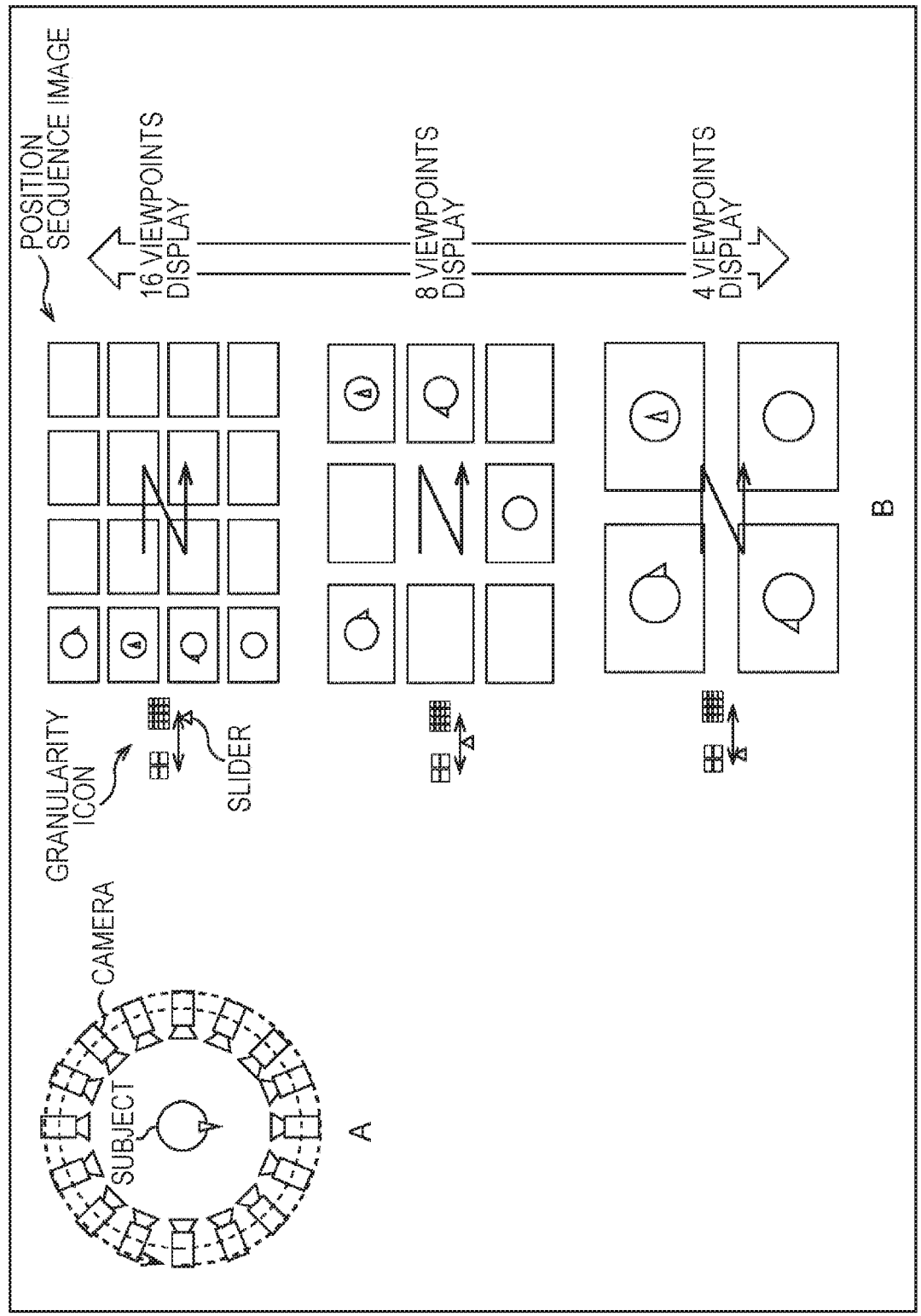
FIG. 21 is a diagram that illustrates an example of an image thinning process performed by a display control unit 14 and an image thinning unit 36.

FIG. 21 is a diagram that illustrates an example of an image thinning process performed by the display control unit 14 and the image thinning unit 36 illustrated in FIG. 2.

FIG. 21A is a diagram that illustrates an example of the appearance of photographing a subject by using a plurality of cameras.

In FIG. 21A, 16 cameras are arranged to be equally spaced so as to surround a subject, and the subject is photographed.

FIG. 21B, as illustrated in FIG. 21A, is a diagram that illustrates a display example of a position sequence image in which 16 captured images acquired in a case where the subject is photographed using 16 cameras are displayed as a group.

In other words, FIG. 21B illustrates a display example of a position sequence image that is displayed when the reproduction of captured images is requested by the user by operating the operation unit 18.

As display modes for displaying the position sequence image, for example, there are thinning mode and a non-thinning mode. For example, switching between the thinning mode and the non-thinning mode can be performed by a user's operation of the operation unit 18 or the like.

In the thinning mode, the image thinning unit 36 performs an image thinning process, and accordingly, captured images (the reproduction screens or symbols thereof) displayed in the position sequence image are thinned out as is necessary.

In the non-thinning mode, all the captured images (the reproduction screens or symbols thereof) of the group are displayed in the position sequence image.

For example, as illustrated in FIG. 21A, in case where the subject is photographed by using 16 cameras, and 16 captured images acquired as a result thereof are regarded as a group, in the display control unit 14, 16 captured images (the reproduction screens or symbols thereof) are arranged, for example, in an arrangement pattern of 4×4 in the order of the position sequence and are displayed on the display unit 15 in the non-thinning mode.

On the other hand, in the thinning mode, the image thinning unit 36 requests the display control unit 14 to display a granularity icon operated by the user for determining the number of captured images (the reproduction screens thereof) to be displayed in the position sequence image, displays the granularity icon on the display unit 15 in accordance with the request, and performs the image thinning process.

FIG. 21B illustrates a display example of the display unit 15 in the thinning mode.

As illustrated in FIG. 21B, in the thinning mode, the granularity icon is displayed together with the position sequence image.

The granularity icon includes a slider, and, by moving (sliding) the slider, the granularity (hereinafter, also referred to as display granularity) of the captured images to be displayed as the position sequence image can be adjusted.

In other words, the image thinning unit 36 sets a display target image number that is the number of captured images (the reproduction screens or symbols thereof) to be displayed on the display unit 15 in accordance with the position of the slider of the granularity icon.

In addition, the image thinning unit 36 selects cameras corresponding to the display target image number as selection cameras such that the positions of the selection cameras are equally spaced as possibly as can based on the camera positional relation acquired by the camera positional relation acquiring unit 31.

Then, by setting captured images captured by the selection cameras corresponding to the display target image number as display targets (the reproduction screens or symbols thereof) to be displayed on the display unit 15, the image thinning unit 36 thins the captured images to be displayed on the display unit 15.

In other words, the image thinning unit 36 supplies control information that represents captured images set as the display targets out of 16 captured images of the group to the display control unit 14.

The display control unit 14 recognizes the captured images set as the display targets out of the 16 captured images of the group based on the control information supplied from the image thinning unit 36, generates a position sequence image in which only the captured images (the reproduction screens or symbols thereof) set as the display targets are arranged in the order of the position sequence, and, as illustrated in FIG. 21B, displays the position sequence image on the display unit 15.

For example, in a case where the slider of the granularity icon is moved to a position for which the display granularity is at a low level, the image thinning unit 36 sets the display target image number, for example, to 16 that is the same as the number of captured images of the group and selects 16 cameras corresponding to the display target image number as the selection cameras such that the positions of the selection cameras are equally spaced as possibly as can.

In other words, in a case where the display target image number is 16, all the 16 cameras capturing 16 captured images of the group are selected as the selection cameras.

Then, the image thinning unit 36 sets the 16 captured images captured by the 16 cameras that are the selection cameras as display targets and supplies control information that represents the captured images set as the display targets to the display control unit 14.

The display control unit 14 recognizes the 16 captured images of the group as the display targets based on the control information supplied from the image thinning unit 36, generates a position sequence image in which the 16 captured images (in the case illustrated in FIG. 21, the reproduction screens of the captured images) that are the display targets, for example, are arranged in an arrangement pattern of 4×4 in the order of the position sequence, and, as illustrated in FIG. 21B, displays the generated position sequence image on the display unit 15.

On the other hand, for example, in a case where the slider of the granularity icon is moved to a position for which the display granularity is at a middle level, the image thinning unit 36 sets the display target image number, for example, to eight that is a half of the number of captured images of the group and selects eight cameras corresponding to the display target image number as the selection cameras such that the positions of the selection cameras are equally spaced as possibly as can.

In other words, in a case where the display target image number is eight, as illustrated in FIG. 21A, when a subject is photographed with 16 cameras being arranged to be equally spaced so as to surround the subject, eight cameras that are every other cameras out of the 16 cameras capturing 16 captured images of the group are selected as the selection cameras.

Then, the image thinning unit 36 sets the eight captured images captured by the eight cameras that are the selection cameras as display targets and supplies control information that represents the captured images set as the display targets to the display control unit 14.

The display control unit 14 recognizes eight captured images out of the 16 captured images of the group that are captured by the eight selection cameras as the display targets based on the control information supplied from the image thinning unit 36, generates a position sequence image in which the eight captured images (in the case illustrated in FIG. 21, the reproduction screens of the captured images) that are the display targets, for example, are arranged in an arrangement pattern of 3×3 in the order of the position sequence, and, as illustrated in FIG. 21B, displays the generated position sequence image on the display unit 15.

In the case where the eight captured images are arranged in the arrangement pattern of 3×3, while one place of the arrangement pattern is a place (hereinafter, referred to as an unused place) in which a captured image is not arranged, in the case illustrated in FIG. 21, the center (2nd from the left side and 2nd from the upper side) of the arrangement pattern of 3×3 is set as the unused place.

In addition, for example, in a case where the slider of the granularity icon is moved to a position for which the display granularity is at a high level, the image thinning unit 36 sets the display target image number, for example, to four that is a quarter of the number of captured images of the group and selects four cameras corresponding to the display target image number as the selection cameras such that the positions of the selection cameras are equally spaced as possibly as can.

In other words, in a case where the display target image number is four, as illustrated in FIG. 21A, when a subject is photographed with 16 cameras being arranged to be equally spaced so as to surround the subject, four cameras that are every third cameras out of the 16 cameras capturing 16 captured images of the group are selected as the selection cameras.

Then, the image thinning unit 36 sets the four captured images captured by the four cameras that are the selection cameras as display targets and supplies control information that represents the captured images set as the display targets to the display control unit 14.

The display control unit 14 recognizes four captured images out of the 16 captured images of the group that are captured by the four selection cameras as the display targets based on the control information supplied from the image thinning unit 36, generates a position sequence image in which the four captured images (in the case illustrated in FIG. 21, the reproduction screens of the captured images) that are the display targets, for example, are arranged in an arrangement pattern of 2×2 in the order of the position sequence, and, as illustrated in FIG. 21B, displays the generated position sequence image on the display unit 15.

In the thinning mode, since the image thinning unit 36 performs the image thinning process as described above, in a case where the number of captured images of a group is large, the user can thin out the number of captured images (the reproduction screens or symbols thereof) to be displayed as the position sequence image to a number desired by the user by operating the slider of the granularity icon.

In addition, in the image thinning process, cameras corresponding to the display target image number that are positioned to be equally spaced as possibly as can out of a plurality of cameras capturing a plurality of captured images of a group are selected as the selection cameras. Accordingly, for example, it can be prevented that captured images acquired by photographing the subject only in specific directions are unevenly distributed and are displayed as the position sequence image.

In addition, in a case where the display target image number is less than the number of captured images (cameras capturing the captured images) of the group, for example, cameras selected as the selection cameras may be changed in accordance with a user's operation of the operation unit 18. In such a case, the captured images to be displayed as the position sequence image, for example, may be changed to captured images acquired by photographing the subject in directions different from each other or the like.

Figure 22:
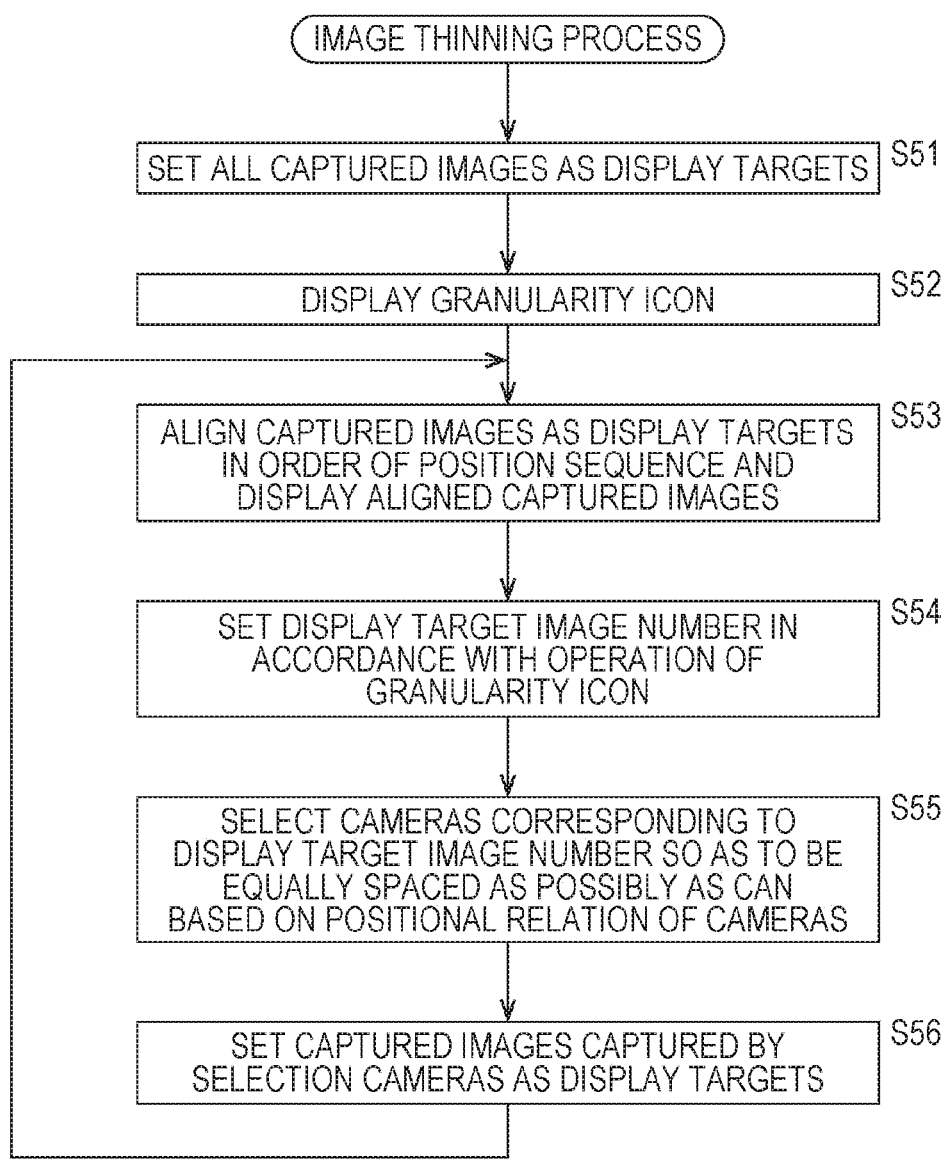
FIG. 22 is a flowchart that illustrates an example of the image thinning process performed by the display control unit 14 and the image thinning unit 36.

FIG. 22 is a flowchart that illustrates an example of the image thinning process performed by the display control unit 14 and the image thinning unit 36 illustrated in FIG. 2.

For example, when the user requests the reproduction of a group (the captured images thereof) stored in the storage 12 by operating the operation unit 18, in Step S51, the image thinning unit 36 sets all the plurality of captured images of the group requested to be reproduced as display targets and supplies control information that represents the captured images set as the display targets to the display control unit 14, and the process proceeds to Step S52.

In Step S52, the image thinning unit 36 requests the display control unit 14 to display the granularity icon, the display control unit 14 displays the granularity icon on the display unit 15 in accordance with the request, and the process proceeds to Step S53.

In Step S53, the display control unit 14 recognizes the captured images set as the display targets based on the control information supplied from the image thinning unit 36, generates a position sequence image that includes only the captured images (the reproduction screens thereof) set as the display targets, and displays the generated position sequence image on the display unit 15, and the process proceeds to Step S54.

In this case, the position sequence image that includes all the captured images of the group requested to be reproduced is displayed.

In Step S54, the process waits for the user to operate the slider of the granularity icon, and the image thinning unit 36 sets the display target image number in accordance with the position of the slider of the granularity icon, and the process proceeds to Step S55.

In Step S55, the image thinning unit 36 selects cameras corresponding to the display target image number as selection cameras such that the positions of the selection cameras are equally spaced as possibly as can based on the camera positional relation acquired by the camera positional relation acquiring unit 31, and the process proceeds to Step S56.

In Step S56, the image thinning unit 36 sets captured images captured by the selection cameras corresponding to the display target image number as display targets and supplies control information that represents the captured images set as the display targets to the display control unit 14.

Thereafter, the process is returned to Step S53 from Step S56, as described above, the display control unit 14 recognizes the captured images set as the display targets based on the control information supplied from the image thinning unit 36, generates a position sequence image that includes only the captured images set as the display targets, and displays the generated position sequence image on the display unit 15, and thereafter, the same process is repeated.

According to the image thinning process described above, the captured images are thinned in accordance with an operation of the slider of the granularity icon, and the position sequence image of which the display granularity is adjusted is displayed.

<Reproduction Target Setting Process>

Figure 23:
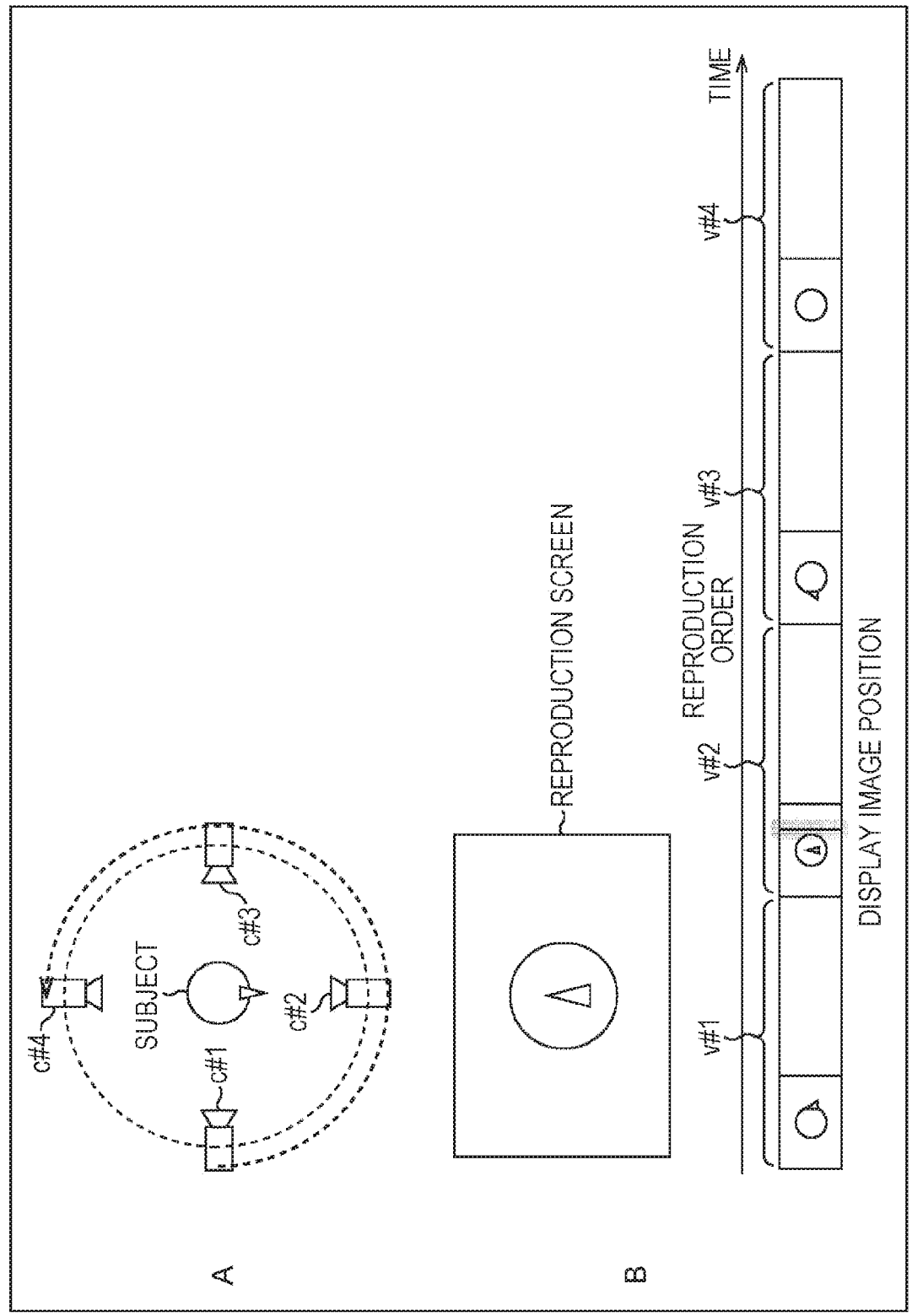
FIG. 23 is a diagram that illustrates an example of a reproduction target setting process performed by a reproduction target setting unit 37.

FIG. 23 is a diagram that illustrates an example of a reproduction target setting process performed by the reproduction target setting unit 37 illustrated in FIG. 2.

When the user requests the reproduction of a group of which captured images are stored in the storage 12 by operating the operation unit 18, the reproduction unit 17 reproduces a plurality of the captured images of the group requested to be reproduced from the storage 12 so as to be supplied to the display control unit 14.

The display control unit 14 arranges the reproduction screens of the plurality of captured images supplied from the reproduction unit 17 in the order of the position sequence and displays the arranged reproduction screens on the display unit 15.

Accordingly, in this case, while the reproduction screens corresponding to the number of captured images of the group requested to be reproduced are displayed, the reproduction target setting unit 37 performs a reproduction target setting process in which one captured image is set as a reproduction target from among the captured images of the group, and the reproduction screen of only the captured image set as the reproduction target is displayed, for example, in accordance with a user's operation.

In other words, for example, in a case where one reproduction screen is requested to be set by the user operating the operation unit 18, the reproduction target setting unit 37 sets the reproduction target by performing the reproduction target setting process and displays the reproduction screen of only the captured image set as the reproduction target.

FIG. 23A is a diagram that illustrates an example of the appearance of capturing captured images that form a group.

In the case illustrated in FIG. 23A, similar to the case illustrated in FIG. 7A, a subject is photographed by using four cameras c #1 to c #4 with a person set as the subject and a front position, a front position, a left position, a right position, and a rear position of the subject set as capture locations.

FIG. 23B is a diagram that illustrates an example of the reproduction target setting process for a group of four captured images v #1 to v #4 acquired by photographing the subject using four cameras c #1 to c #4 as illustrated in FIG. 23A as targets.

Here, as setting modes in which the reproduction target setting unit 37 sets one captured image as the reproduction target, for example, there are a sequential mode, a real-time mode, and a manual mode.

In the manual mode, one captured image is set as the reproduction target in accordance with a user's operation of the operation unit 18.

FIG. 23B illustrates an example of the reproduction target setting process in the sequential mode.

In the sequential mode, the reproduction target setting unit 37 sequentially sets four captured images v #1 to v #4 of the group, for example, in a predetermined order such as the order of the position sequence or the like and supplies control information that illustrates the reproduction target to the reproduction unit 17.

The reproduction unit 17 sets the whole section of the captured image set as the reproduction target represented by the control information supplied from the reproduction target setting unit 37 as a reproduction section and reproduces the captured image set as the reproduction target so as to be supplied to the display control unit 14.

Accordingly, in a case where, for example, the position sequences of four captured images v #1 to v #4 of the group are "1st" to "4th", and the reproduction target setting unit 37 sequentially sets one of the four captured images v #1 to v #4 in order of the position sequence as the reproduction target, in the reproduction unit 17, the whole section of the captured image v #1 is reproduced, and thereafter, the entire section of each one of the captured images v #2 to v #4 is sequentially reproduced.

In this case, one reproduction screen on which the entire section of each one of the four captured images v #1 to v #4 having mutually-different capture locations is sequentially reproduced is displayed on the display unit 15 by the display control unit 14.

Figure 24:
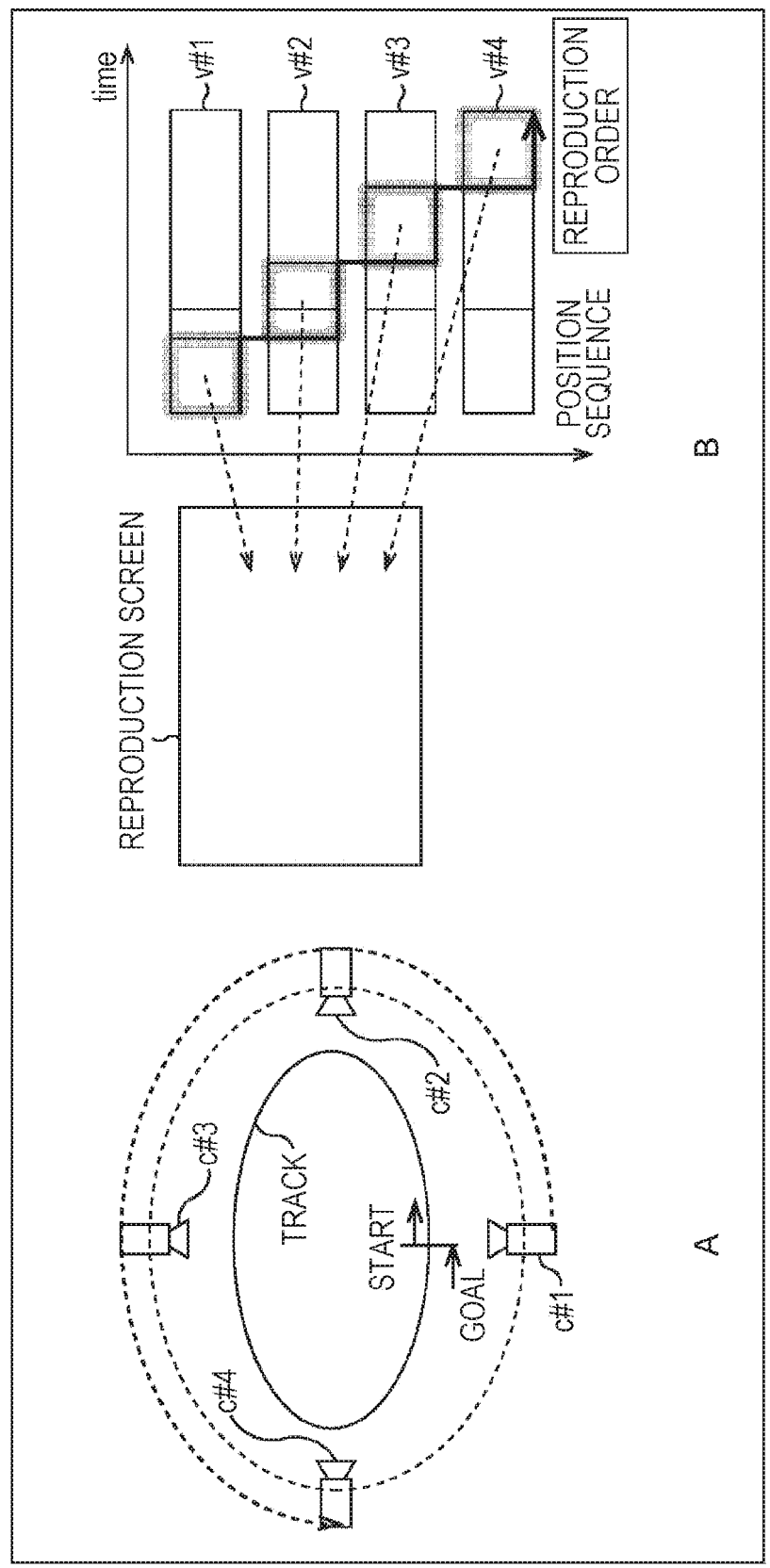
FIG. 24 is a diagram that illustrates another example of the reproduction target setting process performed by the reproduction target setting unit 37.

FIG. 24 is a diagram that illustrates another example of the reproduction target setting process performed by the reproduction target setting unit 37 illustrated in FIG. 2.

FIG. 24A is a diagram that illustrates an example of the appearance of capturing captured images that form a group.

In the case illustrated in FIG. 24A, a track-and-field event is photographed with four cameras c #1 to c #4 facing a track and four points located on the circumference of an oval surrounding the periphery of the track of the track-and-field event set as capture locations.

FIG. 24B is a diagram that illustrates an example of the reproduction target setting process for a group of four captured images v #1 to v #4 acquired through a capturing process using four cameras c #1 to c #4 as illustrated in FIG. 24A as targets.

In other words, FIG. 24B illustrates an example of the reproduction target setting process in the real-time mode.

In the real-time mode, the reproduction target setting unit 37 synchronizes the times of four captured images v #1 to v #4 of the group and selects one captured image that is reproduced at one of the reproduction times (hereinafter, also referred to as real-time reproduction times) from the four captured images v #1 to v #4 in a case where the four captured images v #1 to v #4 that are in the state in which the times are synchronized are reproduced in real time (normal speed) and sets the selected captured image as a capture target.

In other words, the reproduction target setting unit 37, for example, performs division for equally dividing the real-time reproduction time into four sections corresponding to the number of the captured images v #1 to v #4 of the group or the like and, for the i-th section out of the four sections, sets one captured image (for example, a captured image v #i, a captured image of which the position sequence is "i-th", or the like) out of the four captured images v #1 to v #4 as a reproduction target.

Now, when a section acquired by dividing the real-time reproduction time is referred to as a division section, the reproduction unit 17, for each division section acquired by dividing the real-time reproduction time, sets a section of the captured image set as the reproduction target for the division section that corresponds to the division section as a reproduction section and reproduces the captured image set as the reproduction target so as to be supplied to the display control unit 14.

Accordingly, for example, in a case where the four captured images v #1 to v #4 are images captured for the same capture time from the same start time, and the reproduction target setting unit 37, for the i-th division section out of four division sections acquired by equally dividing the real-time reproduction time, sets a captured image v #i out of the four captured images v #1 to v #4 as the reproduction target, in the reproduction unit 17, as illustrated in FIG. 24B, the first ¼ section of the captured image v #1 is reproduced in the first (initial) division section of the real-time reproduction time, and a section of ¼ to 2/4 of the captured image v #2 is reproduced in the second division section of the real-time reproduction time. Then, a section of 2/4 to 3/4 of the captured image v #3 is reproduced in the third division section of the real-time reproduction time, and a section of 3/4 to the end of the captured image v #4 is reproduced in the fourth (final) division section of the real-time reproduction time.

In this case, one reproduction screen out of four reproduction screens acquired by reproducing four captured images v #1 to v #4 having mutually-different capture locations with the times thereof being synchronized to each other is displayed on the display unit 15 by the display control unit 14.

In addition, in the real-time mode, the reproduction target setting unit 37, for example, can set one captured image having a section (hereinafter, referred to as a condition satisfying section) satisfying a predetermined condition out of the captured images v #1 to v #4 of which times are synchronized as a reproduction target for the section of the real-time reproduction time that corresponds to the condition satisfying section.

Here, the condition satisfying section may be a section that satisfies a predetermined condition over the entire condition satisfying section, or only a part of the condition satisfying section may be a section that satisfies a predetermined condition.

In addition, no condition satisfying section or a plurality of condition satisfying sections may be present in one captured image.

However, the condition satisfying section needs not to overlap the other condition satisfying section, and each time of the real-time reproduction time needs to be included in one of the condition satisfying sections.

In each section of the real-time reproduction time that corresponds to each condition satisfying section, the reproduction unit 17 reproduces a captured image set as the reproduction target for the section by using the condition satisfying section as a reproduction section so as to be supplied to the display control unit 14.

Also in this case, similar to the case where the real-time reproduction time is divided into division sections, the display control unit 14 displays one reproduction screen out of four reproduction screens that are reproduced with the times of the four captured images v #1 to v #4 having mutually-different capture locations being synchronized on the display unit 15.

Here, as the predetermined condition satisfied in the condition satisfying section, for example, a specific subject being shown up in the captured images may be used. It can be determined whether or not a specific subject is shown up in the captured image, for example, by performing subject recognition for the captured image as a target.

In addition, as the predetermined condition satisfied in the condition satisfying section, for example, the camera capturing the captured image being a camera close to a specific subject may be used. It can be determined whether or not the camera capturing the captured image is a camera that is close to a specific subject, for example, by allowing the specific subject to carry a GPS and detecting the position of the specific subject.

In a case where, as the predetermined condition satisfied in the condition satisfying section, for example, a specific subject being shown up in the captured image or the camera capturing the captured image being close to a specific subject is used, the user can view only an image in which the specific subject is shown up or an image in which the specific subject is closely present as the reproduction screen.

Figure 25:
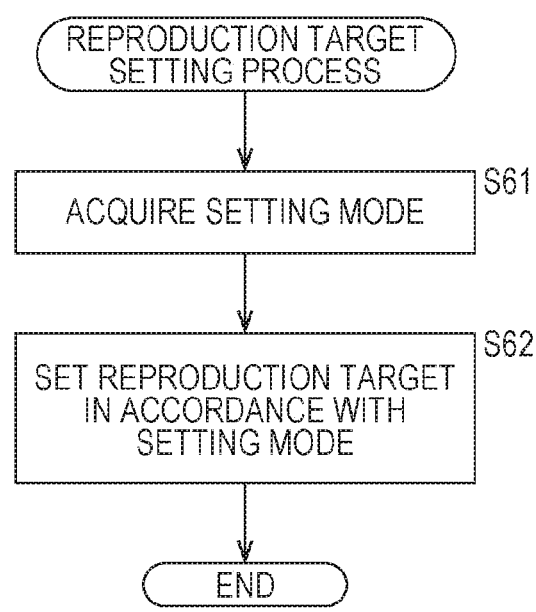
FIG. 25 is a flowchart that illustrates an example of the reproduction target setting process performed by the reproduction target setting unit 37.

FIG. 25 is a flowchart that illustrates an example of the reproduction target setting process performed by the reproduction target setting unit 37 illustrated in FIG. 2.

When the reproduction of a group of which captured images are stored in the storage 12 is requested, in Step S61, the reproduction target setting unit 37 acquires a setting mode (the sequential mode, the real-time mode, or the manual mode) set by the user operating the operation unit 18, and the process proceeds to Step S62.

In Step S62, the reproduction target setting unit 37 sets a reproduction target from among captured images of the group requested to be reproduced in accordance with the setting mode and supplies control information that represents the reproduction target to the reproduction unit 17, and the reproduction target setting process ends.

<Loop Connection Determining Process>

A loop connection determining process will be described with reference to FIGS. 26 to 29.

In the above-described case, while the position sequence is set as a sequence for connecting a plurality of captured images of a group in a loop shape, and, in the position sequence attaching process illustrated in FIG. 4, such a position sequence (hereinafter, also referred to as a loop position sequence) is attached to each one of the plurality of captured images of the group, the position sequence may be set as a sequence for connecting a plurality of captured images of the group not in a loop shape but in a series, and, the position sequence attaching unit 32 (FIG. 2) may perform the position sequence attaching process in which such a position sequence (hereinafter, also referred to a series position sequence) is attached to each one of the plurality of captured images of the group.

Whether to attach the loop position sequence or the series position sequence to a captured image, for example, can be set in accordance with a user's operation.

In addition, it may be configured such that the position sequence attaching unit 32 determines a loop connection determining process in which a loop connection determination for determining whether or not a plurality of captured images of a group are connected in the loop shape is made, and the loop position sequence or the series position sequence is attached to the plurality of captured images of the group in accordance with the result of the loop connection determination.

Here, in the loop connection determination, for example, it may be determined such that the plurality of captured images of the group are connected in the loop shape when there is an advantage in a case where the plurality of captured images of the group are connected in the loop shape, and the plurality of captured images of the group are not connected in the loop shape when there is no advantage in a case where the plurality of captured images of the group are connected in the loop shape.

Figure 26:
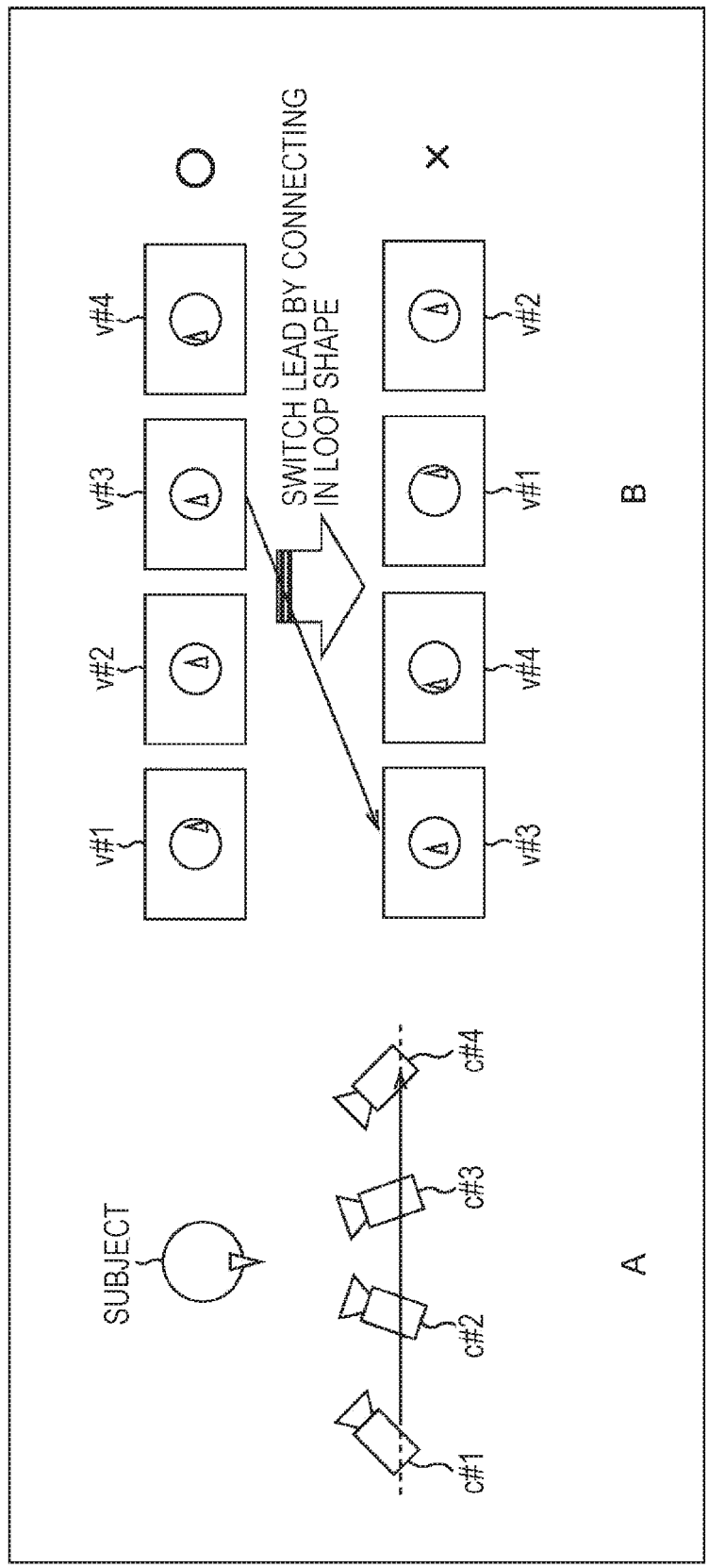
FIG. 26 is a diagram that illustrates an example of a case where there is no advantage in a case where a plurality of captured images of a group are connected in a loop shape.

FIG. 26 is a diagram that illustrates an example of a case where there is no advantage in a case where the plurality of captured images of the group are connected in the loop shape.

FIG. 26A, similar to FIG. 7B, illustrates a capture state in which a subject is photographed by using four cameras c #1 to c #4 with a person set as the subject and four points on a straight line on the front side of the subject set as capture locations.

In this case, regarding captured images v #1 to v #4 captured by cameras c #1 to c #4 of which the capture locations are located on a straight line, for example, as illustrated in FIG. 7B, the position sequence attaching unit 32 attaches a position sequence of "1st" to the captured image v #1 captured by the camera c #1, attaches a position sequence of "2nd" to the captured image v #2 captured by the camera c #2, attaches a position sequence of "3rd" to the captured image v #3 captured by the camera c #3, and attaches a position sequence of "4th" to the captured image v #4 captured by the camera c #4.

FIG. 26B, as described in FIG. 26A, illustrates a display example of the captured images v #1 to v #4 (the reproduction screens thereof) to which the position sequences are attached.

For example, when the user requests the reproduction of the group configured by four captured images v #1 to v #4 by operating the operation unit 18, for example, as described with reference to FIG. 9, the display control unit 14 arranges the reproduction screens of the captured images v #1 to v #4 to be aligned from the left side, for example, in the order of the position sequence and displays the arranged reproduction screens on the display unit 15.

In a case where the position sequences attached to the captured images v #1 to v #4 are the loop position sequences, when the user designates one of the captured images v #1 to v #4, for example, the captured image v #3 as being the first, in the rearrangement process performed by the rearrangement unit 33, for example as in the case described with reference to FIG. 9, the captured images v #1 to v #4 are rearranged such that the captured image v #3 designated by the user is positioned first with the connection of the loop shape according to the loop position sequence being maintained.

In other words, as illustrated in FIG. 26B, the captured images are rearranged in the order of the captured images v #4, v #1, and v #2 such that the captured image v #3 is positioned first, and thereafter, the connection (v #1→v #2→v #3→v #4→v #1) of the loop shape according to the loop position sequence is maintained.

As above, in a case where the loop position sequences are attached to the captured images v #1 to v #4, when the user designates a captured image, the captured images v #1 to v #4 are rearranged such that the captured image designated by the user is positioned first, and the connection of the loop shape according to the loop position sequence is maintained.

However, as illustrated in FIG. 26A, in a case where the captured images v #1 to v #4 are images captured by cameras c #1 to c #4 of which the capture locations are located on a straight line, for example, as illustrated in FIG. 26B, when the captured images are rearranged in the order of the captured images v #4, v #1, and v #2 such that the captured image v #3 designated by the user is positioned first, and the connection of the loop shape according to the loop position sequence is maintained, there are cases where the user may feel it difficult to view the captured images v #1 to v #4 depending on the user. Accordingly, it is difficult to state that there is an advantage of attaching the loop position sequences and connecting the plurality of captured images v #1 to v #4 of the group in the loop shape.

Accordingly, the position sequence attaching unit 32 performs a loop connection determining process in which a loop connection determination for determining whether or not the plurality of captured images of the group are connected in the loop shape is made based on whether or not there is an advantage of connecting the plurality of captured images of the group in the loop shape, and, in accordance with the result of the loop connection determination, either the loop position sequences or the series position sequences can be attached to the plurality of captured images of the group.

In addition, in the file name of the captured image, in addition to the position sequence, information that represents whether the position sequence attached to the captured image is either the loop position sequence or the series position sequence may be included.

In addition, as a case where there is an advantage of connecting the plurality of captured images of the group in the loop shape, for example, a case that satisfies all the three Conditions (1) to (3) described as below or the like may be used.

Condition (1): The plurality of captured images of the group are images that are captured by three or more cameras.
Condition (2): A connection line (hereinafter, also referred to as a camera connection line) connecting the capture locations of a plurality of cameras is a locus approximating the contour of a figure (primitive figure) having a simple shape such as a circle, an oval, or a rectangle.
Condition (3): An angle formed by lines joining the center of the figure approximated by the camera connection line and both ends of the camera connection line on the camera connection line side (a side on which multiple cameras are arranged) exceeds 180 degrees.

For example, among the capture states illustrated in FIGS. 5 to 8, a plurality of captured images captured in the capture states illustrated in FIGS. 6B, 7A, 8A, and 8B satisfy all the three Conditions (1) to (3), and accordingly, a result of the determination indicating the connection in the loop shape is acquired in the loop connection determining process.

On the other hand, a plurality of captured images captured in the capture states illustrated in FIGS. 5A to 5C, 6A, 6C, 7B, and 8C do not satisfy at least one of the three Conditions (1) to (3), and accordingly, a result of the determination indicating no connection in the loop shape is acquired in the loop connection determining process.

Figure 27:
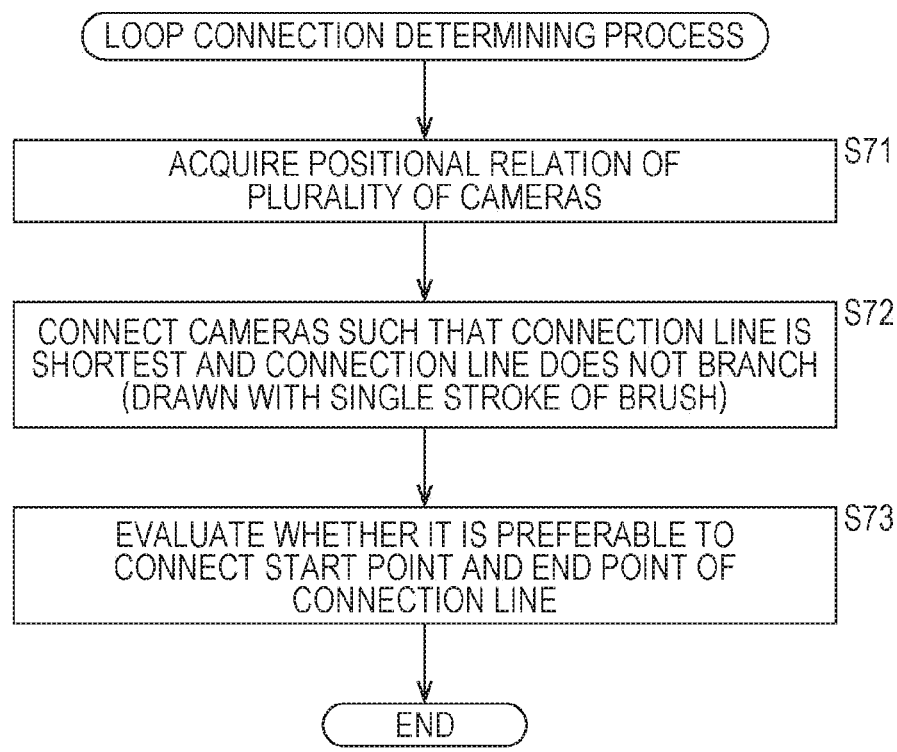
FIG. 27 is a flowchart that illustrates an example of a loop connection determining process performed by the position sequence attaching unit 32.

FIG. 27 is a flowchart that illustrates an example of the loop connection determining process performed by the position sequence attaching unit 32.

In Step S71, the position sequence attaching unit 32 acquires the camera positional relation of a plurality of cameras capturing a plurality of captured images of a group as targets (hereinafter, also referred to as sequence attaching targets) for attaching the position sequences from the camera positional relation acquiring unit 31, and the process proceeds to Step S72.

In Step S72, the position sequence attaching unit 32 acquires (draws) a camera connection line for the plurality of captured images as the sequence attaching targets by connecting the capture locations of the plurality of cameras such that the camera connection line is shortest and does not branch (drawn with a single stroke of the brush) based on the camera positional relation of the plurality of cameras capturing the plurality of captured images as the sequence attaching targets, and the process proceeds to Step S73.

In Step S73, the position sequence attaching unit 32 evaluates whether or not it is preferable to connect the start point and the end point (the start point and the end point of the camera connection line are determined along the sequence attaching direction) that are both ends of the camera connection line, in other words, determines whether or not the plurality of captured images as the sequence attaching targets are connected in a loop shape along the camera connection line, for example, by determining whether or not the three Conditions (1) to (3) described above are satisfied.

In a case where the plurality of captured images as the sequence attaching targets satisfy all the Conditions (1) to (3) described below, in other words, in a case where the plurality of captured images as the sequence attaching targets are images that are captured by three or more cameras (Condition (1)), a camera connection line of the plurality of captured images as the sequence attaching targets is a locus approximating the contour of a primitive figure (Condition (2)), and an angle formed by lines joining the center of a figure approximated by the camera connection line of the plurality of captured images as the sequence attaching targets and both ends of the camera connection line on the camera connection line side exceeds 180 degrees (Condition (3)), the position sequence attaching unit 32 determines to connect the plurality of captured images as the sequence attaching targets in the loop shape, and the loop connection determining process ends.

In this case, the position sequence attaching unit 32 attaches the loop position sequences to the plurality of captured images as the sequence attaching targets, as described with reference to FIG. 4, in the position sequence attaching process.

On the other hand, in a case where the plurality of captured images as the sequence attaching targets do not satisfy any one of Conditions (1) to (3), the position sequence attaching unit 32 determines not to connect the plurality of captured images as the sequence attaching targets in the loop shape, and the loop connection determining process ends.

In this case, the position sequence attaching unit 32 attaches the series position sequences to the plurality of captured images as the sequence attaching targets in the position sequence attaching process.

Figure 28:
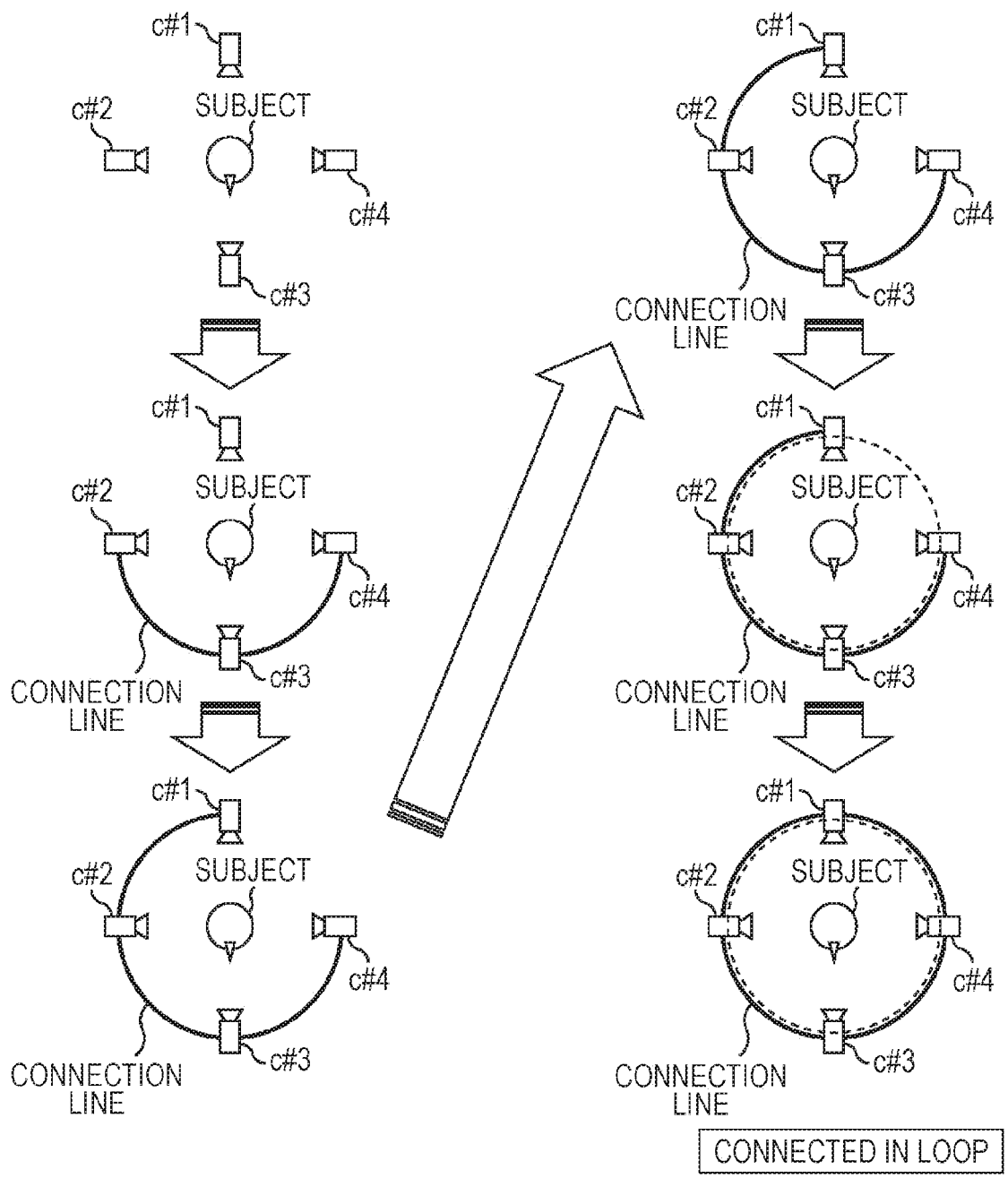
FIG. 28 is a diagram that illustrates the loop connection determining process.

FIG. 28 is a diagram that illustrates the loop connection determining process in a case where four captured images acquired by photographing a subject by using four cameras c #1 to c #4 with a person set as the subject and a front position, a front position, a left position, a right position, and a rear position of the subject set as capture locations are sequence attaching targets.

In FIG. 28, the capture locations of the cameras c #2 and c #3 are connected to each other, the capture locations of the cameras c #3 and c #4 are connected to each other, and the capture locations of the cameras c #1 and c #2 are connected to each other, whereby the camera connection line of the captured images captured by the cameras c #1 to c #4 as the sequence attaching targets is shortest, and the camera connection line approximating the contour of a circle is drawn as a camera connection line that can be drawn with a single stroke of the brush.

In the case illustrated in FIG. 28, since the captured images captured by the cameras c #1 to c #4 as the sequence attaching targets satisfy all the Conditions (1) to (3), the captured images captured by the cameras c #1 to c #4 as the sequence attaching targets are determined to be connected in a loop shape along the camera connection line (there is an evaluation that the start point and the end point that are both ends of the camera connection line may be suitably connected).

Figure 29:
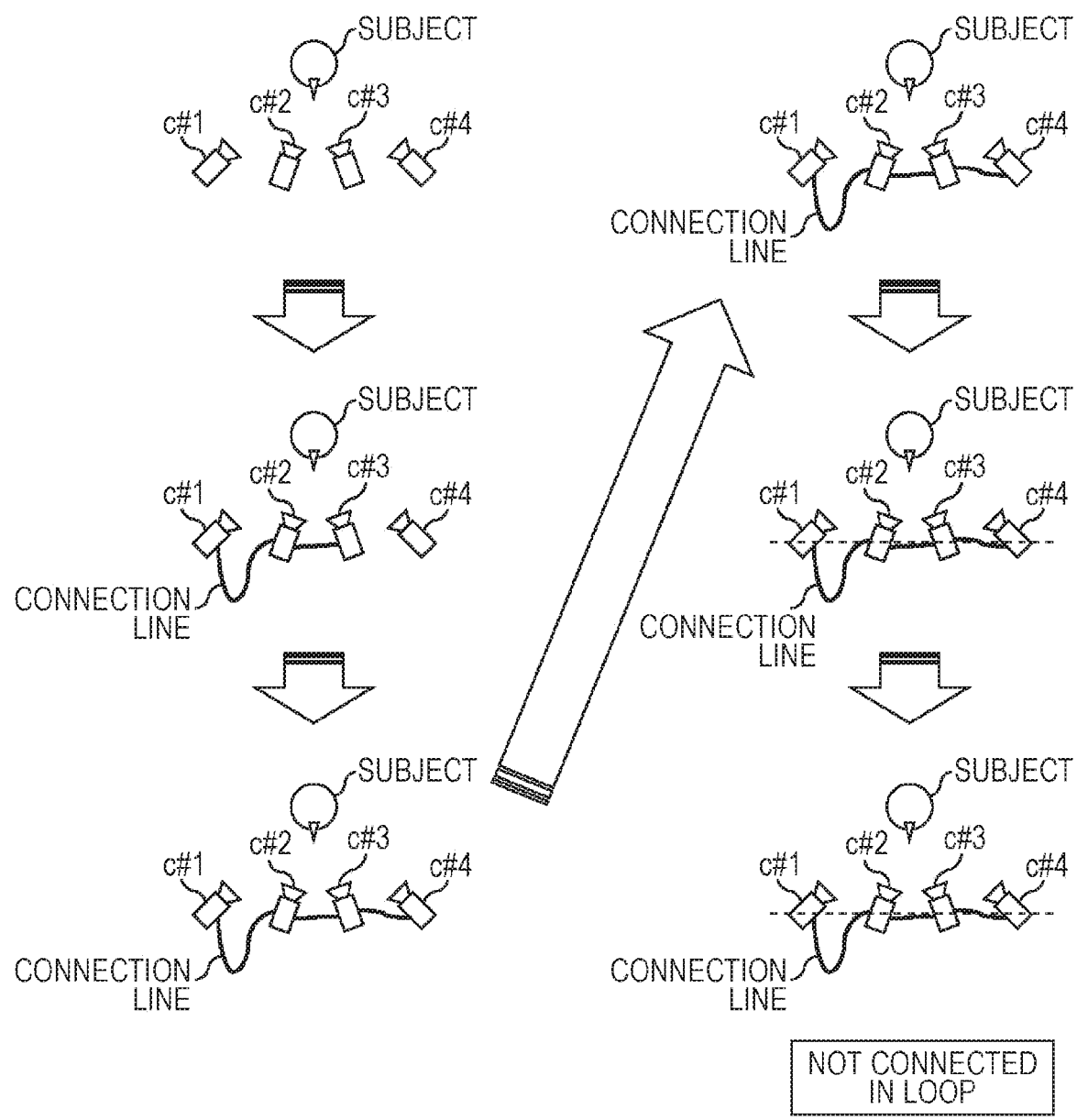
FIG. 29 is a diagram that illustrates the loop connection determining process.

FIG. 29 is a diagram that illustrates the loop connection determining process in a case where four captured images acquired by photographing a subject by using four cameras c #1 to c #4 with a person set as the subject and four points on a straight line on the front side of the subject set as capture locations are sequence attaching targets.

In FIG. 29, the capture locations of the cameras c #1 and c #2 are connected to each other, the capture locations of the cameras c #2 and c #3 are connected to each other, and the capture locations of the cameras c #3 and c #4 are connected to each other, whereby the camera connection line of the captured images captured by the cameras c #1 to c #4 as the sequence attaching targets is shortest, and the camera connection line approximating a straight line is drawn as a camera connection line that can be drawn with a single stroke of the brush.

In the case illustrated in FIG. 29, since the captured images captured by the cameras c #1 to c #4 as the sequence attaching targets do not satisfy Conditions (2) and (3) out of Conditions (1) to (3), the captured images captured by the cameras c #1 to c #4 as the sequence attaching targets are determined not to be connected in a loop shape along the camera connection line (there is an evaluation that the start point and the end point that are both ends of the camera connection line are not to be connected).

In addition, in the loop connection determining process, in a case where the plurality of captured images as the sequence attaching targets are determined not to be connected in a loop shape, and series position sequences are attached to the plurality of captured images as the sequence attaching targets in the position sequence attaching process, in the rearrangement process performed by the rearrangement unit 33, for example, among the plurality of captured images of the group, only the captured image designated to be the first by the user and captured images having series sequences lower than that of the designated captured image may be arranged to be aligned in the order of the series sequence.

Alternatively, the rearrangement process may be configured not to be performed.

<Description of Computer to which Present Technology is Applied>

The above-described series of processes may be performed either by hardware or by software. In a case where the series of processes are performed by the software, a program configuring the software is installed to a general-purpose computer or the like.

Figure 30:
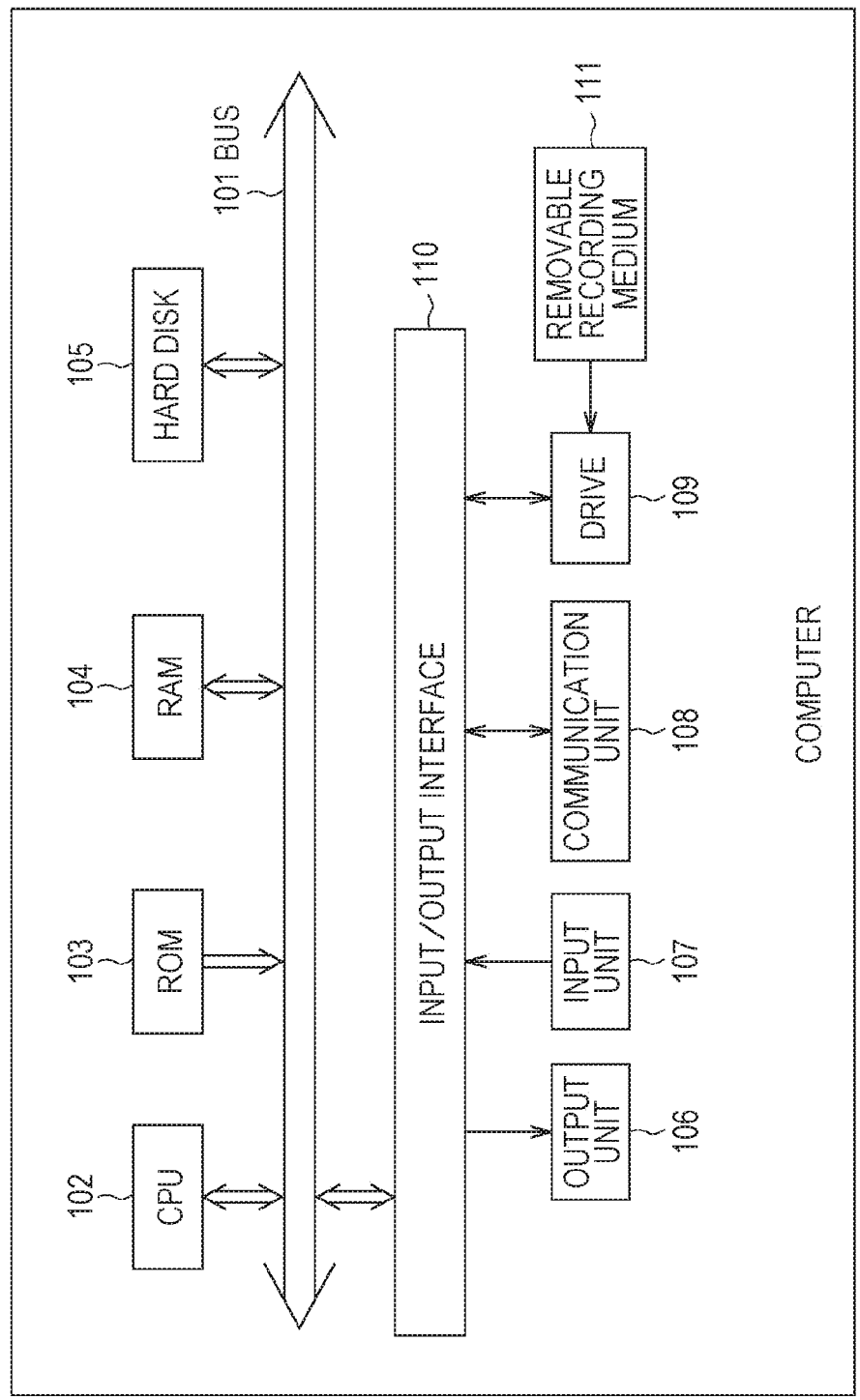
FIG. 30 is a block diagram that illustrates an example of the configuration of a computer according to an embodiment to which the present technology is applied.

FIG. 30 illustrates an example of the configuration of a computer according to an embodiment to which a program performing the above-described series of processes is installed.

The program may be recorded in advance in a hard disk 105 or a ROM 103 as a recording medium that is built in the computer.

Alternatively or additionally, the program may be stored (recorded) in a removable recording medium 111. Such a removable recording medium 111 may be provided as so-called package software. Here, as examples of the removable recording medium 111, there are a flexible disc, a CD-ROM (Compact Disc Read Only Memory), a MO (Magneto Optical) disk, a DVD (Digital Versatile Disc), a magnetic disk, a semiconductor memory, and the like.

Instead of installing the program from the removable recording medium 111 as described above to the computer, the program may be installed to the built-in hard disk 105 by being downloaded to the computer through a communication network or a broadcasting network. In other words, the program may be transmitted in a wireless manner to the computer from a download site through a digital satellite broadcasting satellite or may be transmitted in a wired manner to the computer through a network such as a LAN (Local Area Network) or the Internet.

The computer has a built-in CPU (Central Processing Unit) 102, and an input/output interface 110 is connected to the CPU 102 through a bus 101.

When an instruction is input through the input/output interface 110 by a user's operation of an input unit 107, the CPU 102 executes a program stored in the ROM (Read Only Memory) 103 in accordance with the instruction. Alternatively, the CPU 102 loads a program stored in the hard disk 105 into a RAM (Random Access Memory) 104 and executes the loaded program.

Accordingly, the CPU 102 performs the process according to the above-described flowchart or the process performed by the configuration of the block diagram described above. Then, for example, as is necessary, the CPU 102 outputs the processing result from an output unit 106 through the input/output interface 110, transmits the processing result from a communication unit 108, or records the processing result in the hard disk 105.

The input unit 107 is configured by a keyboard, a mouse, a microphone, or the like. In addition, the output unit 106 is configured by an LCD (Liquid Crystal Display), a speaker, or the like.

In this specification, the process performed by the computer in accordance with the program does not necessarily need to be performed in a time series along the sequence described in the flowchart. In other words, the process performed by the computer in accordance with the program includes a process (for example, a parallel process or a process according to an object) that is performed in a parallel or individual manner.

In addition, the program may be processed by one computer (processor) or may be processed by a plurality of computers in a distributed manner. Furthermore, the program may be transmitted to a remote computer and executed therein.

In addition, in this specification, a system represents a set of a plurality of constituent elements (apparatuses, modules (components), and the like) regardless whether all the constituent elements are included in the same casing. Accordingly, a plurality of apparatuses that are housed in separate casings and are connected through a network or one apparatus having a plurality of modules housed in one casing is a system.

An embodiment of the present technology is not limited to the above-described embodiments, and various changes can be made therein in a range not departing from the concept of the present technology.

In other word, for example, the present technology may be applied to either a moving image or a still image.

In addition, the present technology may have a configuration of cloud computing in which one function is distributed in a plurality of apparatuses through the network and is performed in a cooperative manner.

Furthermore, each step described in the above-described flowcharts may be performed either by one apparatus or by a plurality of apparatuses in a distributed manner.

In addition, in a case where a plurality of processes are included in one step, the plurality of processes included in the one step may be performed either by one apparatus or by a plurality of apparatuses in a distributed manner.

Furthermore, the advantages described in this specification are merely examples, and the advantages are not limited thereto but there may be other advantages.

Additionally, the present technology may include the following configurations.

<1>

A method for processing image information, the method comprising:
  accessing position information that are associated with images, the position information identifying locations that respectively correspond to perspective positions of each of the images;
  identifying a position sequence that provides a series of the locations along a pathway corresponding to a subject; and
  processing the images according to the position sequence.

<2>

The method according to <1>, wherein the perspective positions of each of the images is determined with respect to the subject.

<3>

The method according to <1> or <2>, wherein the position information contains a relationship between the locations.

<4>

The method according to <1> to <3>, wherein each of the perspective positions is respectively corresponding to a camera capturing the images of the subject.

<5>

The method according to <1> to <4>, wherein the position sequence is adjusted based on movement of the subject.

<6>

The method according to <1> to <5>, further comprising synthesizing the images according to the position sequence.

<7>
The method according to <6> to <6>, wherein the synthesizing is performed by time slicing.
<8>
The method according to <1> to <7>, wherein the pathway comprises at least a portion of a perimeter surrounding the subject.
<9>
The method according to <8>, wherein the perimeter is rectangular.
<10>
The method according to <8> or <9>, wherein the perimeter is curved.
<11>
The method according to <1> to <10>, wherein the pathway comprises a plurality of segments that respectively correspond to a plurality of subject locations.
<12>
The method according to <8> to <11>, further comprising: displaying the images in an order of the position sequence.
<13>
The method according to <12>, wherein the displaying comprises aligning the images row by row.
<14>
The method according to <12> or <13>, further comprising changing a top image of the images to change an order of the images.
<15>
The method according to <14>, the changing further comprises reversing the order of the images to be displayed.
<16>
The method according to <14> or <15>, the displaying comprises displaying a selected number of the images and adjacent two of the selected number of the images in the order of the position sequence is separated by equal number of unselected images.
<17>
The method according to <15>, the display further comprises sequentially reproducing the images on a reproduction screen in the order of the position sequence.
<18>
An apparatus for processing image information, the apparatus comprising:
a circuitry configured to access position information that are associated with images,
configured to identify locations that respectively correspond to perspective positions of each of the images, and
configured to process the images according to the position sequence.
<19>
An apparatus for processing image information, the apparatus comprising:
a processor; and
a memory, the memory storing program code executable by the processor to perform operations comprising:
accessing position information that are associated with images, the position information identifying locations that respectively correspond to perspective positions of each of the images;
identifying a position sequence that provides a series of the locations along a pathway corresponding to a subject; and
processing the images according to the position sequence.

<1>
An image processing apparatus including:
a camera positional relation acquiring unit that acquires a positional relation of a plurality of cameras; and
a position sequence attaching unit that attaches position sequences used for connecting a plurality of captured images to the plurality of captured images captured by the plurality of cameras based on the positional relation of the plurality of cameras.
<2>
The image processing apparatus according to <1>, wherein the position sequence attaching unit attaches position sequences used for connecting the plurality of captured images in a loop shape to the plurality of captured images.
<3>
The image processing apparatus according to <1>, further including a display control unit that aligns the plurality of captured images in accordance with the position sequences of the captured images and displays the aligned captured images on the display unit.
<4>
The image processing apparatus according to <3>, further including a rearrangement unit that rearranges the plurality of captured images such that a specific image out of the plurality of captured images is arranged at a predetermined position with the alignment order according to the position sequence being maintained.
<5>
The image processing apparatus according to <3> or <4>, further including a reverse rearrangement unit that rearranges the plurality of captured images according to the position sequences of the captured images in a reverse order.
<6>
The image processing apparatus according to any of <3> to <5>, further including a capture state image generating unit that generates a capture state image representing a capture state according to the plurality of cameras based on the positional relation of the plurality of cameras,
wherein the display control unit also displays the capture state image.
<7>
The image processing apparatus according to any of <3> to <6>, further including an image thinning unit that thins out the captured images to be displayed on the display unit.
<8>
The image processing apparatus according to <7>,
wherein the image thinning unit thins out the captured images to be displayed on the display unit by
setting a display target image number that is the number of the captured images to be displayed on the display unit,
selecting cameras corresponding to the display target image number as selection cameras such that the positions of the selection cameras are equally spaced based on the positional relation of the plurality of cameras, and
setting the captured images captured by the selection cameras corresponding to the display target image number as display targets to be displayed on the display unit.
<9>
The image processing apparatus according to any of <3> to <8>, further including:
a reproduction target setting unit that sets a captured image that is a reproduction target from among the plurality of captured images; and a reproduction unit that reproduces the captured image that is the reproduction target.

<10>

The image processing apparatus according to <9>, wherein the reproduction target setting unit sequentially sets the plurality of captured images as the reproduction target, and wherein the reproduction unit reproduces the captured image that is the reproduction target with an entire section of the captured image that is the reproduction target being set as a reproduction section.

<11>

The image processing apparatus according to <9>, wherein the reproduction target setting unit sets a captured image having a section satisfying a predetermined condition out of the plurality of captured images of which times are synchronized as a reproduction target, and wherein the reproduction unit reproduces the captured image that is the reproduction target with a section, which satisfies the predetermined condition, of the captured image that is the reproduction target being set as a reproduction section.

<12>

The image processing apparatus according to any of <1> to <11>, wherein the position sequence attaching unit additionally changes file names of the plurality of captured images in accordance with the position sequences.

<13>

An image processing method including: acquiring a positional relation of a plurality of cameras; and attaching position sequences used for connecting a plurality of captured images to the plurality of captured images captured by the plurality of cameras based on the positional relation of the plurality of cameras.

<14>

A program that causes a computer to serve as: a camera positional relation acquiring unit that acquires a positional relation of a plurality of cameras; and a position sequence attaching unit that attaches position sequences used for connecting a plurality of captured images to the plurality of captured images captured by the plurality of cameras based on the positional relation of the plurality of cameras.

It should be understood by those skilled in the art that various modifications, combinations, sub-combinations, and alterations may occur depending on design requirements and other factors insofar as they are within the scope of the appended claims or the equivalents thereof.

REFERENCE SIGNS LIST

11 Image acquiring unit
12 Storage
13 Time synchronizing unit
14 Display control unit
15 Display unit
16 Image arrangement control unit
17 Reproduction unit
18 Operation unit
19 Control unit
31 Camera positional relation acquiring unit
32 Position sequence attaching unit
33 Rearrangement unit
34 Reverse rearrangement unit
35 Capture state image generating unit
36 Image thinning unit
37 Reproduction target setting unit
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A method for processing image information, the method comprising:
   acquiring a positional relation of a plurality of cameras capturing a plurality of images of a subject;
   attaching a position sequence to each image of the plurality of images captured by the plurality of cameras based on the positional relation, the plurality of images being connectable in a loop shape based on the attached position sequence;
   controlling a display to display the plurality of images in the attached position sequence;
   controlling the display to change a display position of a specific image; and
   rearranging one or more images of the plurality of images with an alignment order according to the attached position sequence being maintained.

2. The method according to claim 1, wherein the positional relation is output by respective GPS sensors included in the plurality of cameras.

3. The method according to claim 1, further comprising:
   identifying the position sequence that provides a series of locations along a pathway relative to the subject by adjusting the position sequence based on movement of the subject.

4. The method according to claim 1, further comprising synthesizing two or more images based on the attached position sequence.

5. The method according to claim 4, wherein synthesizing the two or more images based on the attached position sequence further includes performing time slicing.

6. The method according to claim 3, wherein the pathway comprises at least a portion of a perimeter surrounding the subject.

7. The method according to claim 6, wherein the perimeter is rectangular.

8. The method according to claim 6, wherein the perimeter is curved.

9. The method according to claim 3, wherein the pathway comprises a plurality of segments that respectively correspond to a plurality of subject locations.

10. The method according to claim 1, wherein controlling the display to display the plurality of images in the attached position sequence further includes generating a graphical user interface including an array of the plurality of images of the subject by aligning two or more images in a first direction of the array of the plurality of images of the subject based on the attached position sequence and in a second direction of the array of the plurality of images of the subject based on a capture time of the two or more images.

11. The method according to claim 10, further comprising changing a top image of the two or more images to change an order of the two or more images in the array of the plurality of images of the subject.

12. The method according to claim 11, wherein changing the top image of the two or more images to change the order of the two or more images in the array of the plurality of images of the subject further includes reversing the order of the plurality of images in the array of the plurality of images of the subject.

13. The method according to claim 11, wherein the graphical user interface includes a granularity icon, and wherein the graphical user interface further includes a section displaying a selected number of the two or more images based on a position of the granularity icon.

14. The method according to claim 12, wherein the graphical user interface includes a reproduction screen section, and wherein generating the graphical user interface including the array of the plurality of images of the subject further includes sequentially reproducing the two or more images on the reproduction screen section in an order of positions of the two or more images in the array of the plurality of images of the subject.

15. A system comprising:
a plurality of cameras, each camera of the plurality of cameras configured to generate an image of a subject; and
an image processing device including
a circuitry configured to
acquire a positional relation of the plurality of cameras capturing a plurality of images of the subject,
attach a position sequence to each image of the plurality of images captured by the plurality of cameras based on the positional relation, the plurality of images being connectable in a loop shape based on the attached position sequence,
control a display to display the plurality of images in the attached position sequence,
control the display to change a display position of a specific image, and
rearrange one or more images of the plurality of images with an alignment order according to the attached position sequence being maintained.

16. An image processing apparatus comprising:
an electronic processor; and
a memory storing program code executable by the electronic processor to perform a set of operations comprising:
acquiring a positional relation of a plurality of cameras capturing a plurality of images of a subject;
attaching a position sequence to each image of the plurality of images captured by the plurality of cameras based on the positional relation, the plurality of images being connectable in a loop shape based on the attached position sequence;
controlling a display to display the plurality of images in the attached position sequence; and
controlling the display to change a display position of a specific image; and
rearranging one or more images of the plurality of images with an alignment order according to the attached position sequence being maintained.

17. The image processing apparatus according to claim 16, wherein the positional relation is output by respective GPS sensors included in the plurality of cameras.

18. The method according to claim 10, wherein some or all of the two or more images share a common start capture time.

19. The method according to claim 10, wherein generating the graphical user interface including the array of the plurality of images of the subject further includes arranging the array of the plurality of images of the subject to display the plurality of images of the subject in the attached position sequence
wherein controlling the display to change the display position of the specific image further includes receiving a display position change input of the specific image of the plurality of images of the subject, and
wherein rearranging the one or more images of the plurality of images with the alignment order according to the attached position sequence being maintained further includes updating the graphical user interface to re-arrange a next image directly adjacent to the specific image in the array of the plurality of images of the subject to maintain the attached position sequence in response to receiving the display position change input of the specific image of the plurality of images of the subject.

20. The system according to claim 15, wherein, to control the display to display the plurality of images in the attached position sequence, the circuitry is further configured to generate a graphical user interface including an array of the plurality of images of the subject by arranging the array of the plurality of images of the subject to display the plurality of images of the subject in the attached position sequence
wherein, to control the display to change the display position of the specific image, the circuitry is further configured to receive a display position change input of the specific image of the plurality of images of the subject, and
wherein, to rearrange the one or more images of the plurality of images with the alignment order according to the attached position sequence being maintained, the circuitry is further configured to update the graphical user interface to re-arrange a next image directly adjacent to the specific image in the array of the plurality of images of the subject to maintain the attached position sequence in response to receiving the display position change input of the specific image of the plurality of images of the subject.

21. The image processing apparatus according to claim 16, wherein the set of operations further includes generating a graphical user interface including an array of the plurality of images of the subject by arranging the array of the plurality of images of the subject to display the plurality of images of the subject in the attached position sequence,
wherein controlling the display to change the display position of the specific image further includes receiving a display position change input of the specific image of the plurality of images of the subject, and
wherein rearranging the one or more images of the plurality of images with the alignment order according to the attached position sequence being maintained further includes updating the graphical user interface to re-arrange a next image directly adjacent to the specific image in the array of the plurality of images of the subject to maintain the attached position sequence in response to receiving the display position change input of the specific image of the plurality of images of the subject.

22. The method according to claim 10, wherein positions of the two or more images of the plurality of images of the subject in the array are based only on the attached position sequence.

* * * * *